US012202535B2

(12) United States Patent
Yamashita et al.

(10) Patent No.: US 12,202,535 B2
(45) Date of Patent: Jan. 21, 2025

(54) ELECTRODE STRUCTURE, STEERING WHEEL, AND METHOD FOR MANUFACTURING STEERING WHEEL

(71) Applicant: Panasonic Intellectual Property Management Co., Ltd., Osaka (JP)

(72) Inventors: Yasuhiro Yamashita, Osaka (JP); Takumi Yamada, Osaka (JP); Takateru Sawada, Osaka (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 174 days.

(21) Appl. No.: 17/971,352

(22) Filed: Oct. 21, 2022

(65) Prior Publication Data

US 2023/0126096 A1 Apr. 27, 2023

(30) Foreign Application Priority Data

Oct. 26, 2021 (JP) ................................ 2021-174669
Oct. 26, 2021 (JP) ................................ 2021-174694
Oct. 26, 2021 (JP) ................................ 2021-174727
Apr. 8, 2022 (JP) ................................ 2022-064195
Jul. 29, 2022 (JP) ................................ 2022-121560

(51) Int. Cl.
*B62D 1/04* (2006.01)
*B32B 3/08* (2006.01)
(Continued)

(52) U.S. Cl.
CPC .............. *B62D 1/046* (2013.01); *B32B 3/085* (2013.01); *B32B 5/18* (2013.01); *B32B 15/08* (2013.01);
(Continued)

(58) Field of Classification Search
CPC .......... B62D 1/046; B62D 1/06; B32B 3/085; B32B 5/18; B32B 15/08; B32B 27/065;
(Continued)

(56) References Cited

U.S. PATENT DOCUMENTS

| | | | |
|---|---|---|---|
| 2002/0036191 A1* | 3/2002 | Bonn | H05B 3/34 219/204 |
| 2011/0048163 A1* | 3/2011 | Song | B62D 1/06 74/552 |

(Continued)

FOREIGN PATENT DOCUMENTS

| | | | | |
|---|---|---|---|---|
| KR | 2017074138 A | * | 6/2017 | ......... B60H 1/00292 |
| WO | WO 2018145868 A1 | | 8/2018 | |
| WO | WO 20181458681 A1 | | 8/2018 | |

OTHER PUBLICATIONS

Translation of KR 2017074138 A, Choi, Jun. 29, 2017 (Year: 2017).*

*Primary Examiner* — Vinh Luong
(74) *Attorney, Agent, or Firm* — Seed IP Law Group LLP

(57) ABSTRACT

An electrode structure disposed on the outer circumference of a core metal of a steering wheel provided in a vehicle includes an insulator and a first electrode disposed on a first surface of the insulator that is on an opposite side of the insulator relative to a surface of the insulator that faces the core metal of the steering wheel. The insulator includes an engagement portion that engages a first engagement-target portion included in the core metal.

21 Claims, 49 Drawing Sheets

(51) Int. Cl.
  *B32B 5/18*    (2006.01)
  *B32B 15/08*   (2006.01)
  *B32B 27/06*   (2006.01)
  *B32B 27/08*   (2006.01)
  *B32B 27/36*   (2006.01)
  *B62D 1/06*    (2006.01)

(52) U.S. Cl.
  CPC ............ *B32B 27/065* (2013.01); *B32B 27/08* (2013.01); *B32B 27/36* (2013.01); *B32B 27/365* (2013.01); *B62D 1/06* (2013.01); *B32B 2266/0278* (2013.01); *B32B 2307/206* (2013.01); *B32B 2605/003* (2013.01)

(58) Field of Classification Search
  CPC ....... B32B 27/08; B32B 27/36; B32B 27/365; B32B 2266/0278; B32B 2307/206; B32B 2605/003; B32B 15/046; B32B 15/09; B32B 15/20

USPC .......................................................... 74/552
  See application file for complete search history.

(56) References Cited

U.S. PATENT DOCUMENTS

| | | | |
|---|---|---|---|
| 2018/0043920 A1* | 2/2018 | Fujii | H05B 3/16 |
| 2020/0017136 A1 | 1/2020 | Lammers et al. | |
| 2021/0291229 A1* | 9/2021 | Hasegawa | G01L 1/2287 |
| 2023/0067577 A1* | 3/2023 | Yamada | B62D 1/06 |
| 2023/0126096 A1* | 4/2023 | Yamashita | B32B 5/18 |
| | | | 74/558 |
| 2023/0271641 A1* | 8/2023 | Yamashita | B62D 1/065 |
| | | | 219/204 |
| 2024/0337512 A1* | 10/2024 | Yamashita | G01D 5/24 |

\* cited by examiner

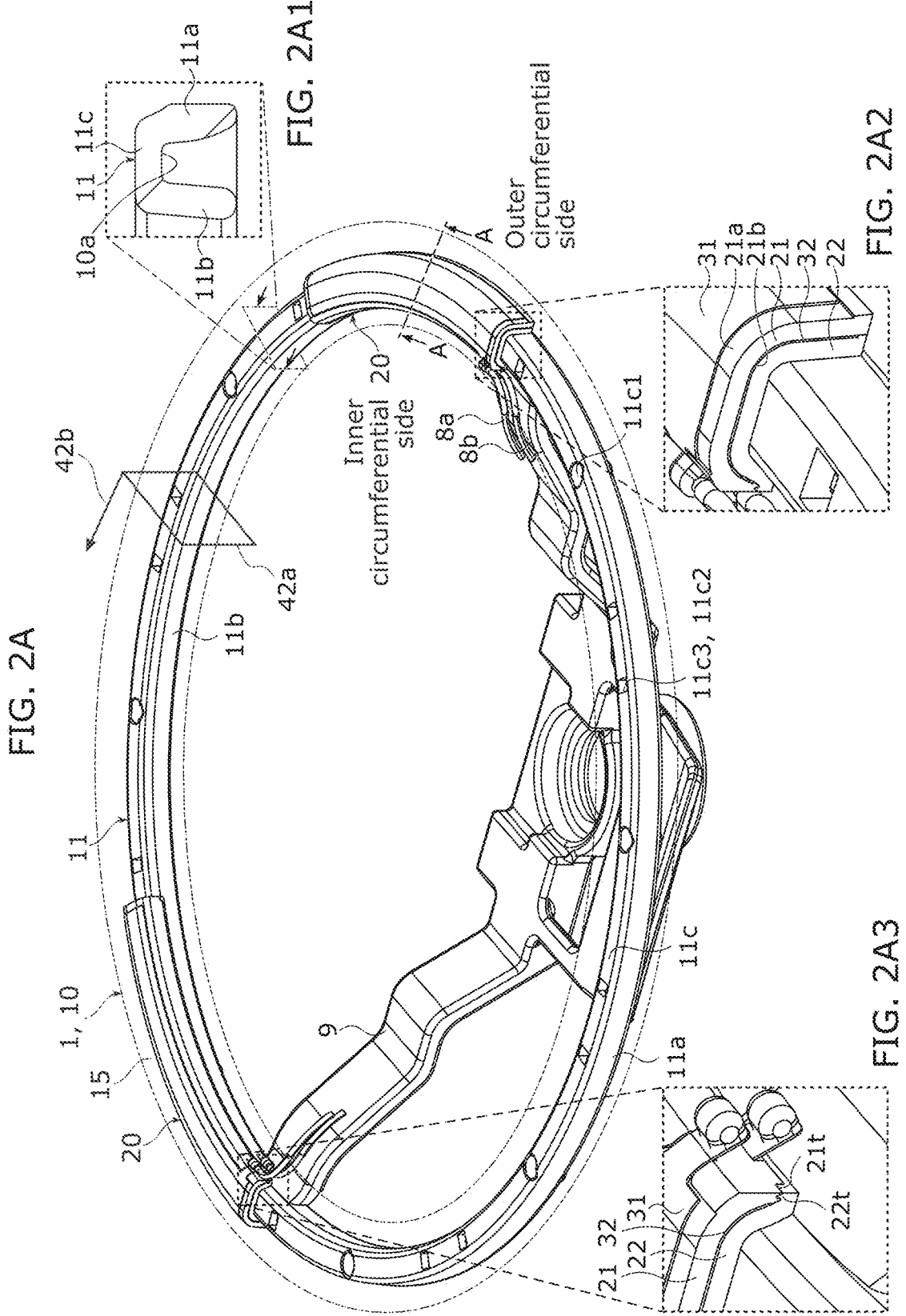

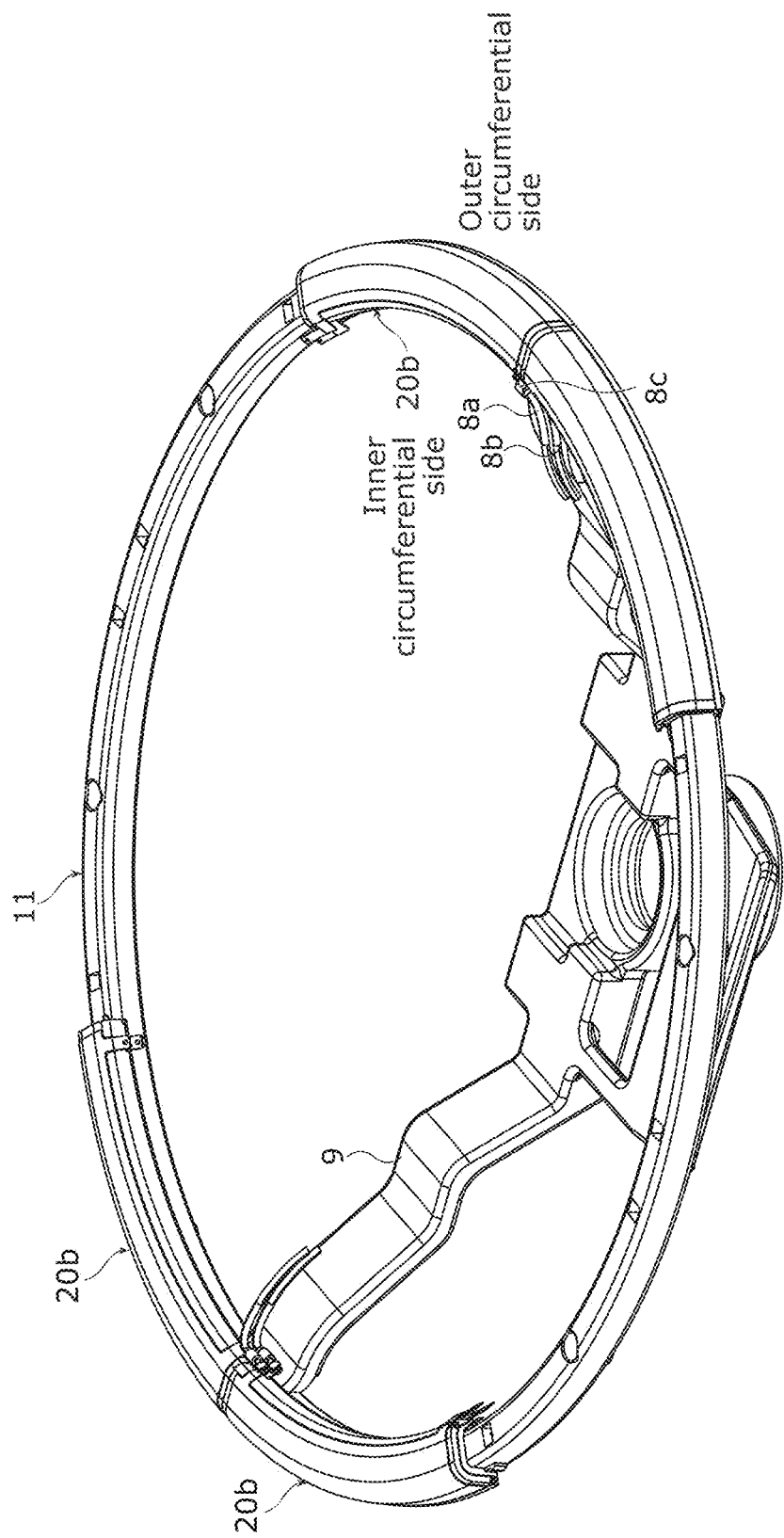

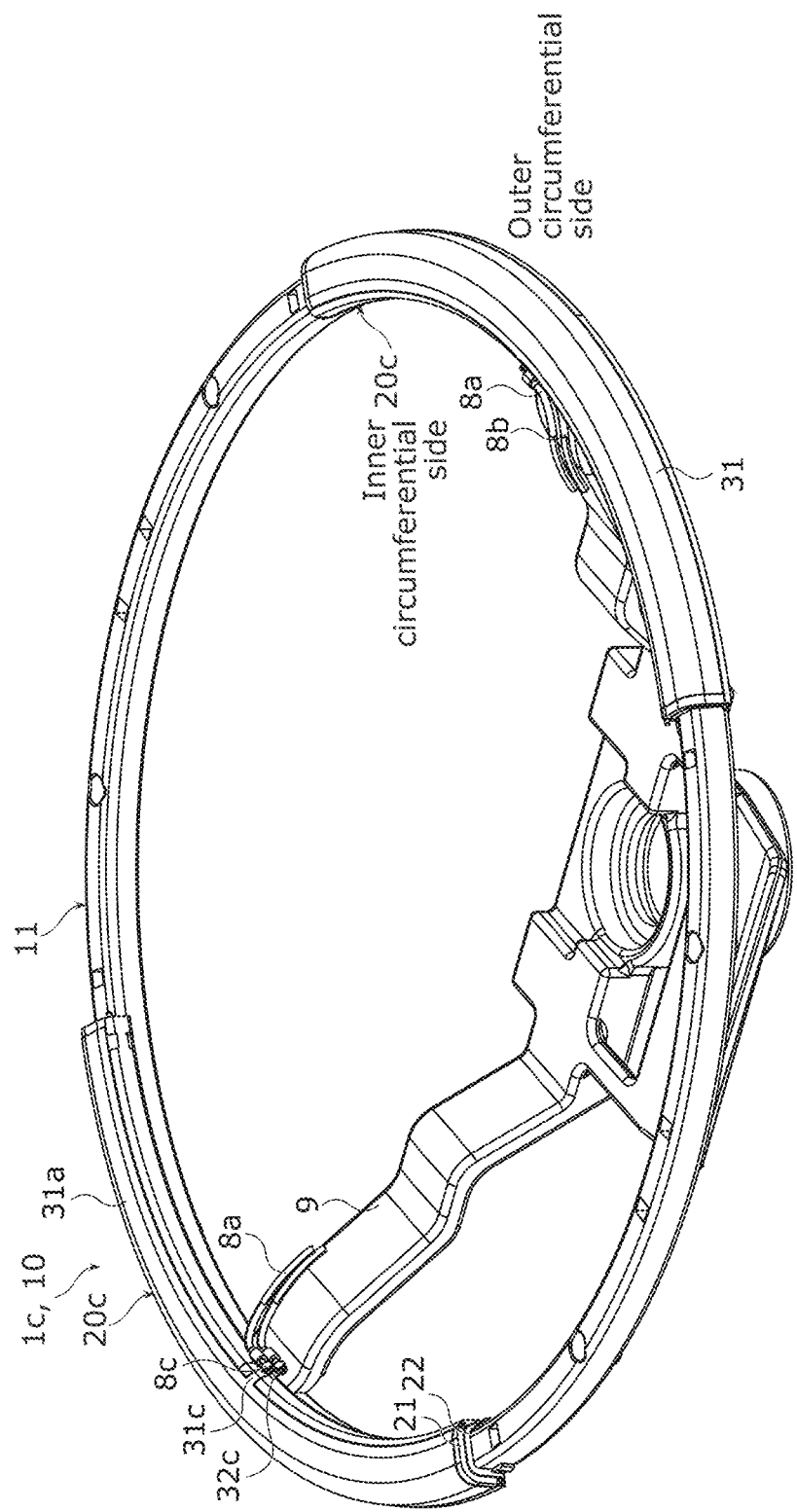

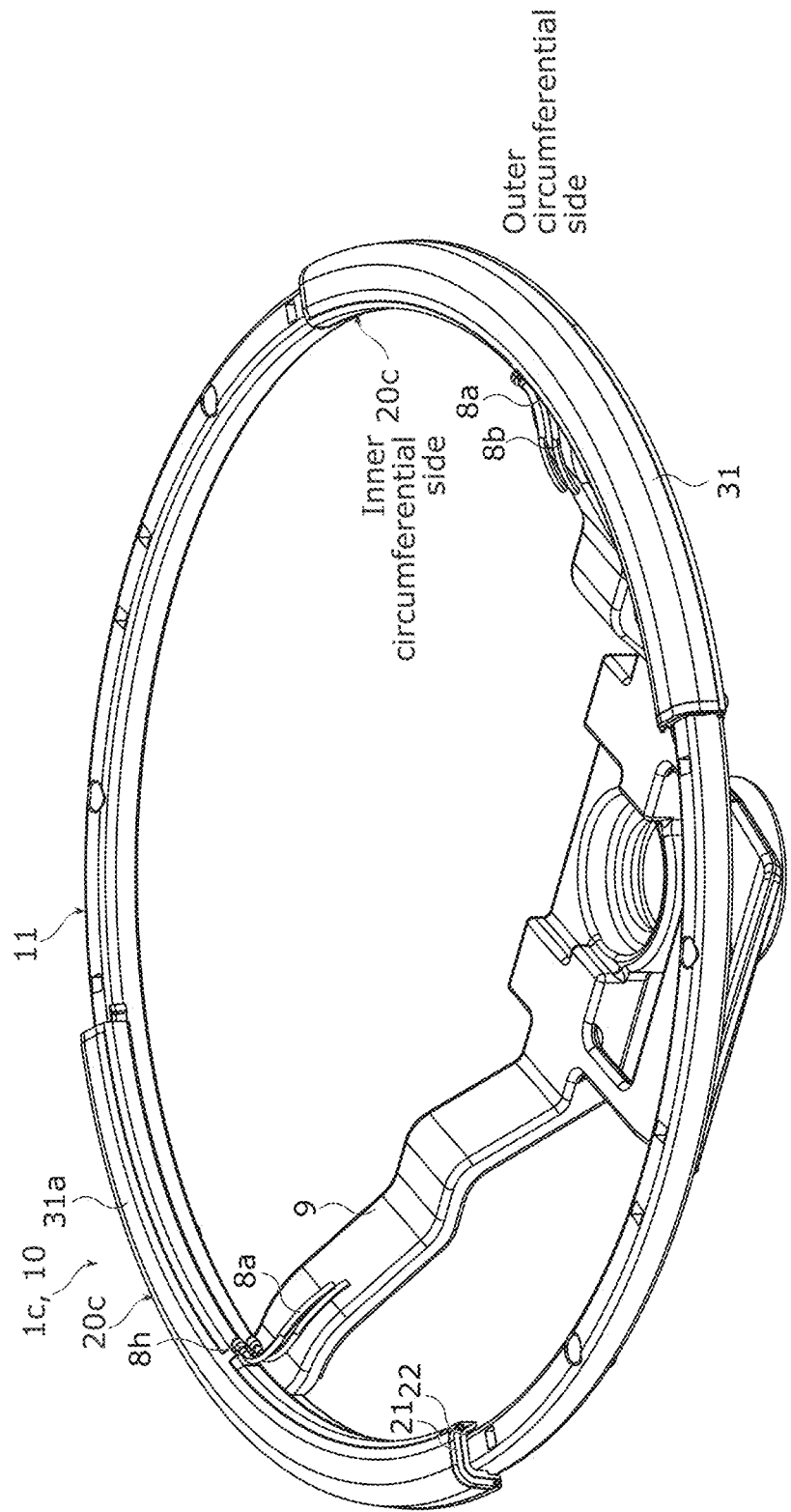

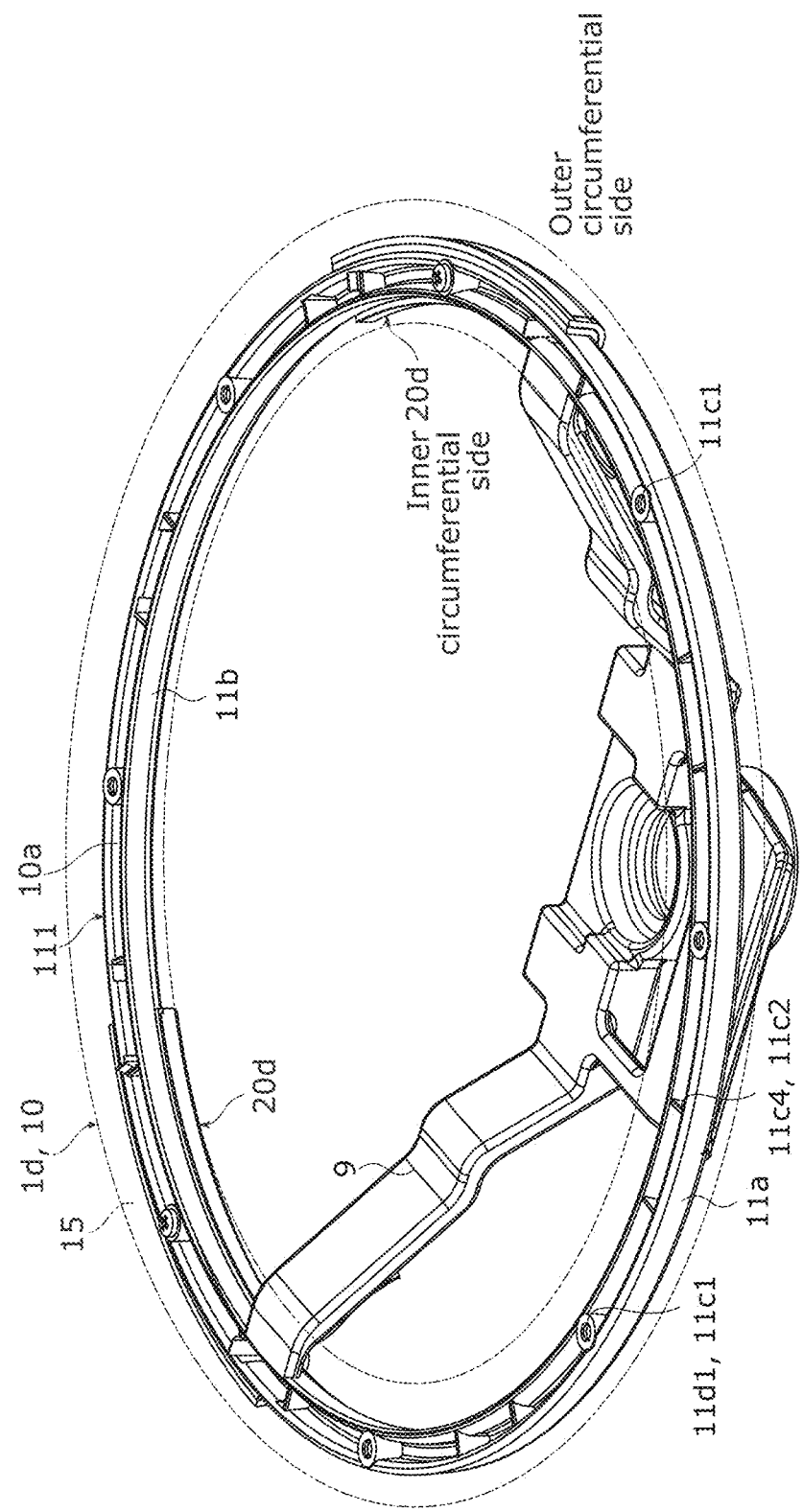

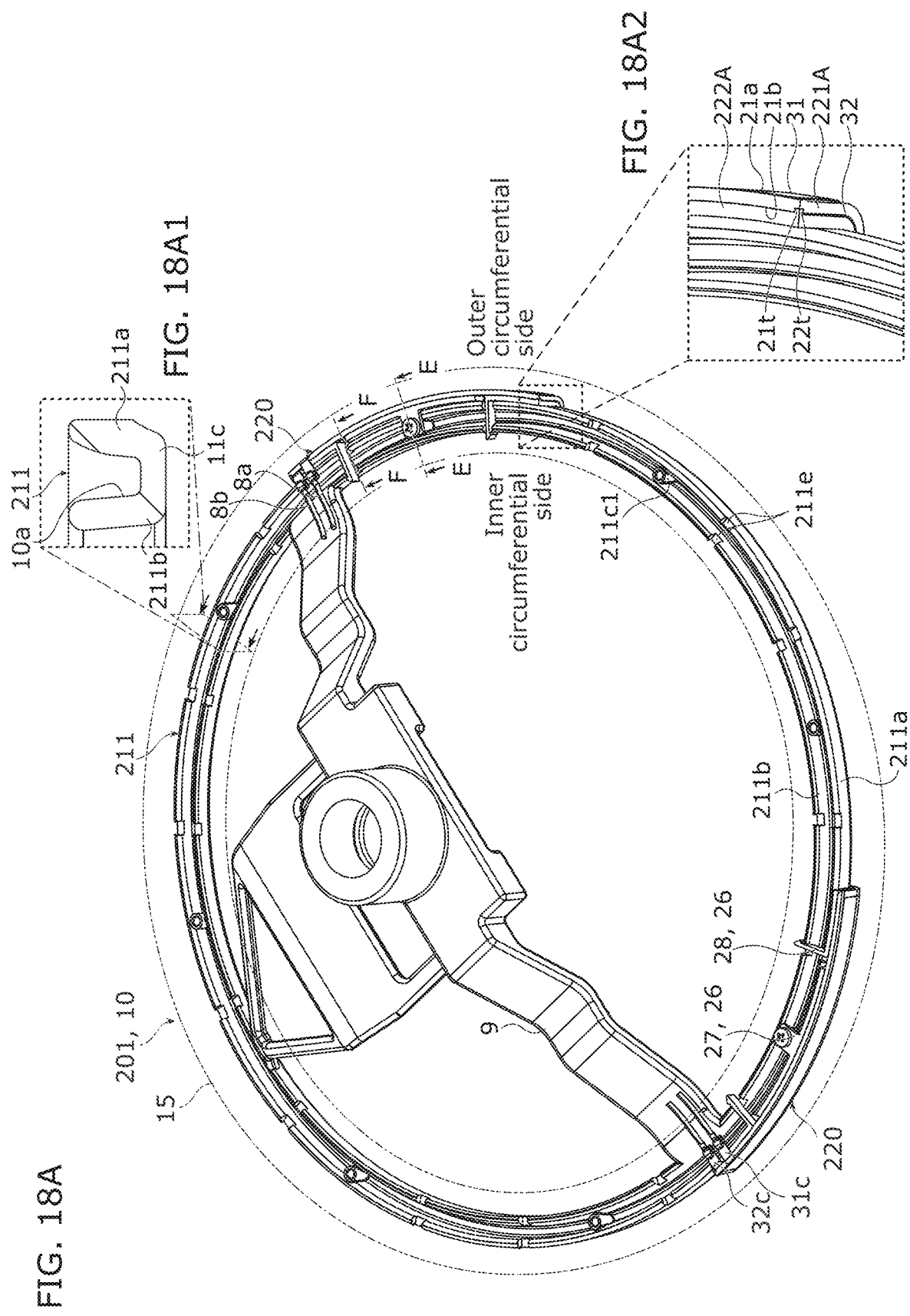

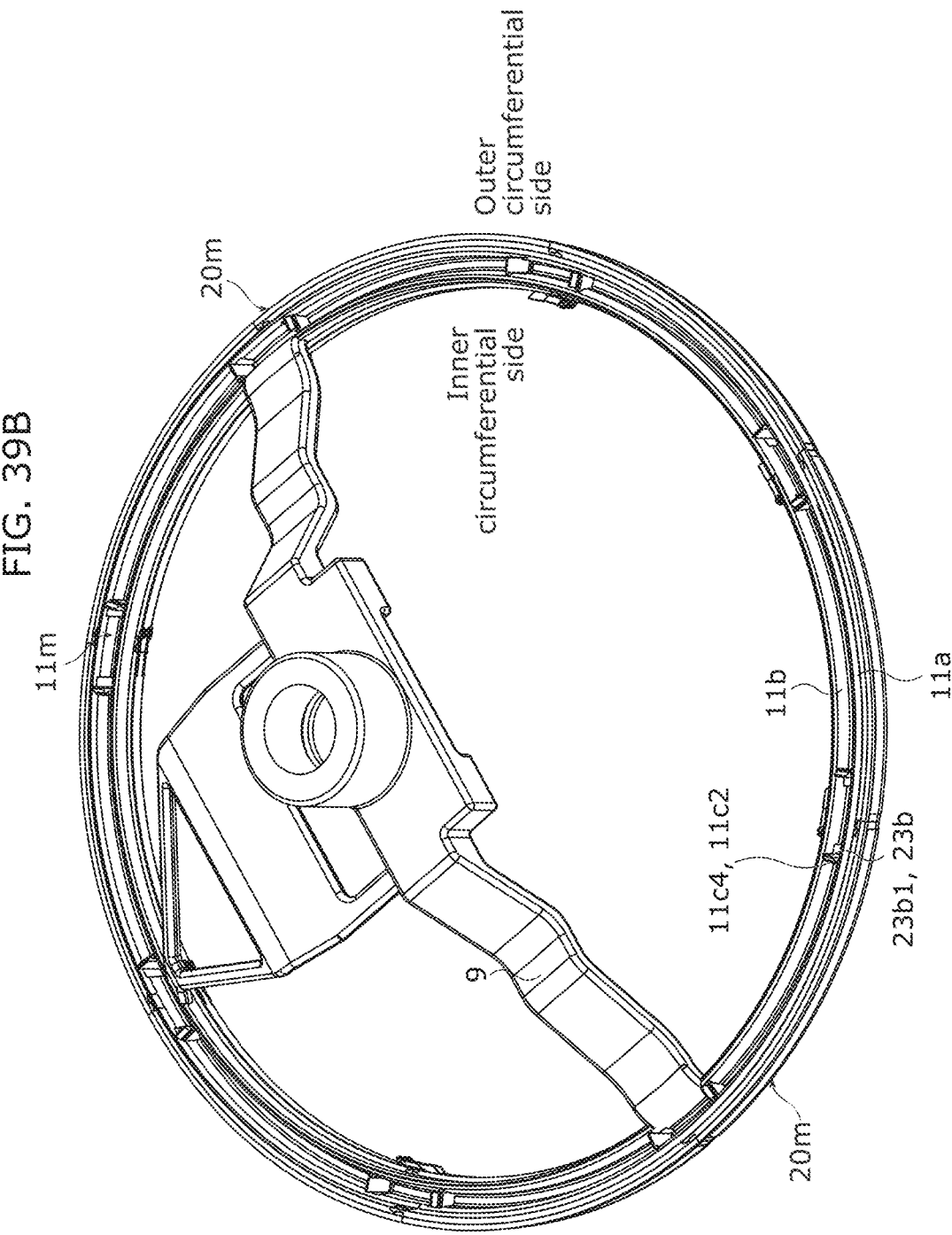

ELECTRODE STRUCTURE, STEERING WHEEL, AND METHOD FOR MANUFACTURING STEERING WHEEL

CROSS REFERENCE TO RELATED APPLICATIONS

The present application is based on and claims priority of Japanese Patent Application No. 2021-174669 filed on Oct. 26, 2021, Japanese Patent Application No. 2021-174694 filed on Oct. 26, 2021, Japanese Patent Application No. 2021-174727 filed on Oct. 26, 2021, Japanese Patent Application No. 2022-064195 filed on Apr. 8, 2022, and Japanese Patent Application No. 2022-121560 filed on Jul. 29, 2022.

FIELD

The present disclosure relates to an electrode structure, a steering wheel, and a method for manufacturing the steering wheel.

BACKGROUND

A conventional method for making a notch in a foam of a steering wheel using a cutting tool and inserting a conductor of a sensor into each of the first layer and the second layer of the notch has been disclosed (for example, see Patent Literature (PTL) 1).

CITATION LIST

Patent Literature

PTL 1: WO 2018/145868

SUMMARY

The method according to PTL 1 can be improved upon.

In view of this, the electrode structure, the steering wheel, and the method for manufacturing the steering wheel of the present disclosure are capable of improving upon the above related art.

An electrode structure according to one aspect of the present disclosure is disposed on an outer circumference of a core metal of a steering wheel provided in a vehicle, and includes an insulator and a first electrode disposed on a first surface of the insulator. The first surface is on the opposite side of the insulator relative to a surface of the insulator that faces the core metal of the steering wheel. The insulator includes an engagement portion that engages an engagement-target portion included in the core metal.

These generic or specific aspects may be realized by a system, a device or apparatus, a method, a recording medium, a computer program, or any combination thereof.

The electrode structure and the like according to the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2A includes a perspective view of a steering wheel according to Embodiment 1.

FIG. 2A1 shows a cross-sectional view of a core metal taken at the dotted and dashed line in FIG. 2A.

FIG. 2A2 shows a partial enlarged view of an electrode structure.

FIG. 2A3 shows a partial enlarged view of a first positioning portion of a first insulator and a second positioning portion of a second insulator.

FIG. 3 is a cross-sectional view illustrating a first engagement-target portion and a first engagement portion of the steering wheel taken at line A-A in FIG. 2A.

FIG. 8A shows a partial enlarged view of an electrode structure according to Variation 1 of Embodiment 1.

FIG. 14C is another perspective view of an electrode structure and a core metal according to Variation 3 of Embodiment 1.

FIG. 17A is a perspective view of when a first electrode and harness are electrically connected by being crimped together with a rivet, when one first electrode is provided for a plurality of first insulators in other variations.

FIG. 17B is a perspective view of when a first electrode and harness are electrically connected by solder, when one first electrode is provided for a plurality of first insulators in other variations.

FIG. 17C is a perspective view of a steering wheel according to another variation.

FIG. 18A includes a perspective view of a steering wheel according to Embodiment 2, a partial enlarged view of an electrode structure according to Embodiment 2, and a cross-sectional view of a core metal taken at the dotted and dashed line in FIG. 18A.

FIG. 18A1 shows a cross-sectional view of a core metal taken at the dotted and dashed line in FIG. 18A.

FIG. 18A shows a partial enlarged view of an electrode structure according to Embodiment 2.

FIG. 22A shows a partial enlarged view of an electrode structure according to Variation 1 of Embodiment 2.

FIG. 28A shows a partial enlarged view of an electrode structure according to Variation 3 of Embodiment 2.

FIG. 30A shows a partial enlarged view of an electrode structure according to Variation 5 of Embodiment 2.

FIG. 39B is a perspective view of an electrode structure that does not include a first engagement portion, and a core metal that does not include a first engagement-target portion.

FIG. 45A shows a partial enlarged perspective view of an electrode structure according to Variation 2 of Embodiment 3.

DESCRIPTION OF EMBODIMENTS

Hereinafter, embodiments will be described in detail with reference to the drawings.

The embodiments described below each present a general or specific example. The numerical values, shapes, materials, elements, the arrangement and connection of the elements, steps, order of the steps, etc., described in the following embodiments are mere examples, and therefore are not intended to limit the present disclosure. Accordingly, among elements in the following embodiments, those not appearing in any of the independent claims are described as optional elements.

The figures are schematic diagrams and are not necessarily precise illustrations. In the figures, like elements share like reference numbers.

In the following embodiments, expressions such as "approximately equal intervals" and "T-shaped" are used. For example, "approximately equal intervals" and "T-shaped" not only mean exactly equal intervals and exactly T-shaped, but also includes substantially equal intervals and substantially T-shaped, i.e., includes an error of approximately several percent. In addition, "approximately equal intervals" and "T-shaped" mean equal intervals or T-shaped to an extent that the advantageous effects of the present disclosure can be achieved. The same applies to other expressions using "approximately" and "shaped".

Embodiment 1

<Configuration: Steering Wheel 1>

Figure 1:
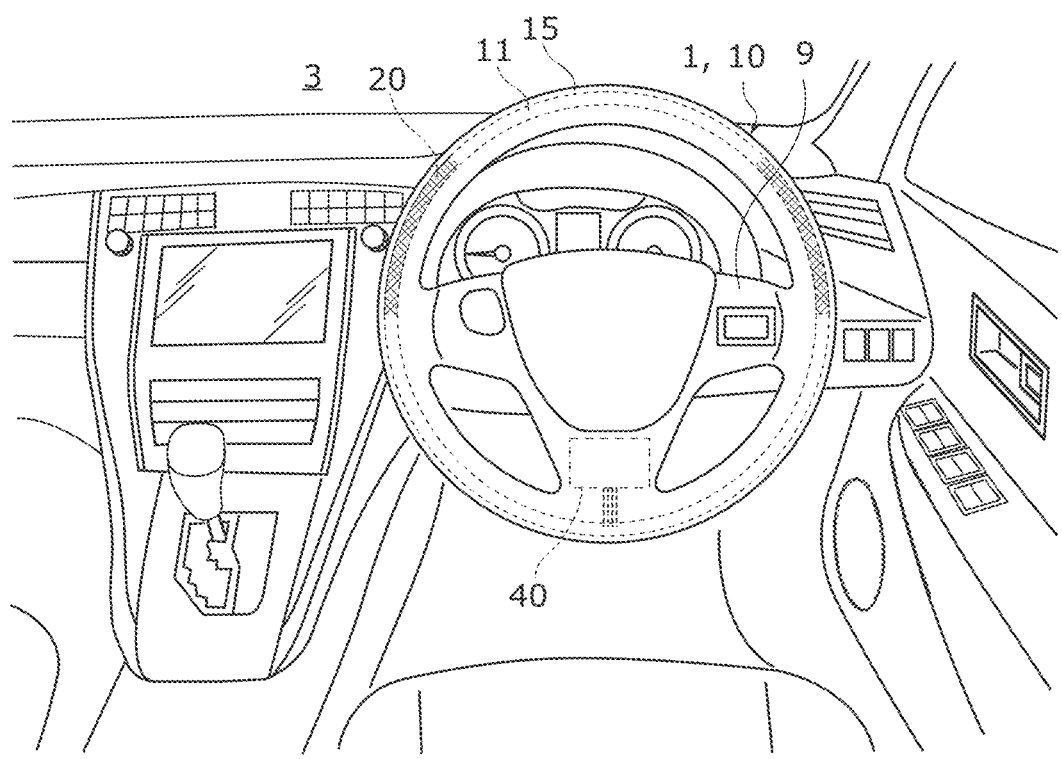
FIG. 1 illustrates a passenger compartment of a vehicle in which a steering wheel according to Embodiment 1 is disposed.
Figure 2B:
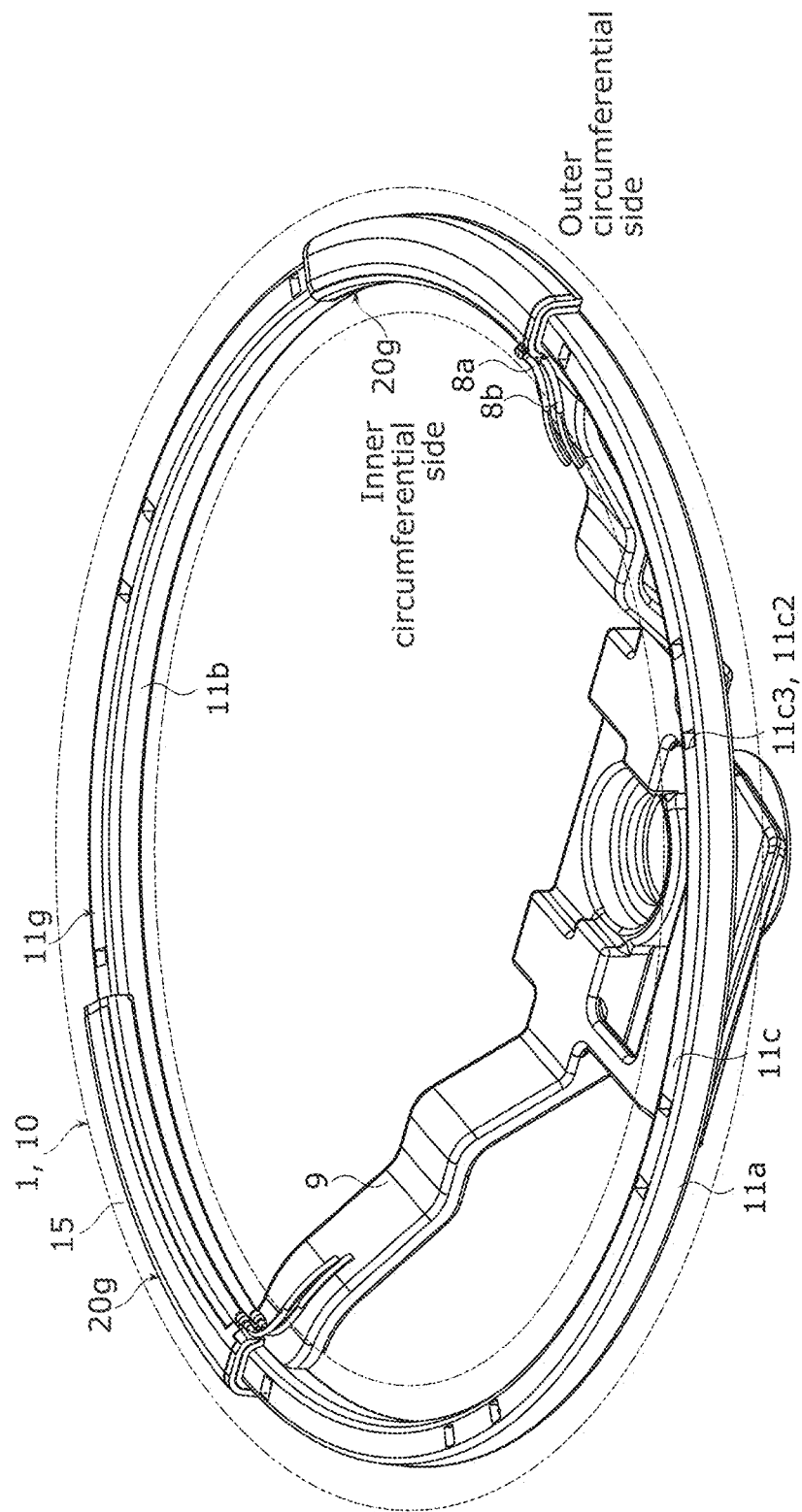
FIG. 2B is a perspective view of an electrode structure that does not include a first engagement portion, and a core metal that does not include a first engagement-target portion.
Figure 3:
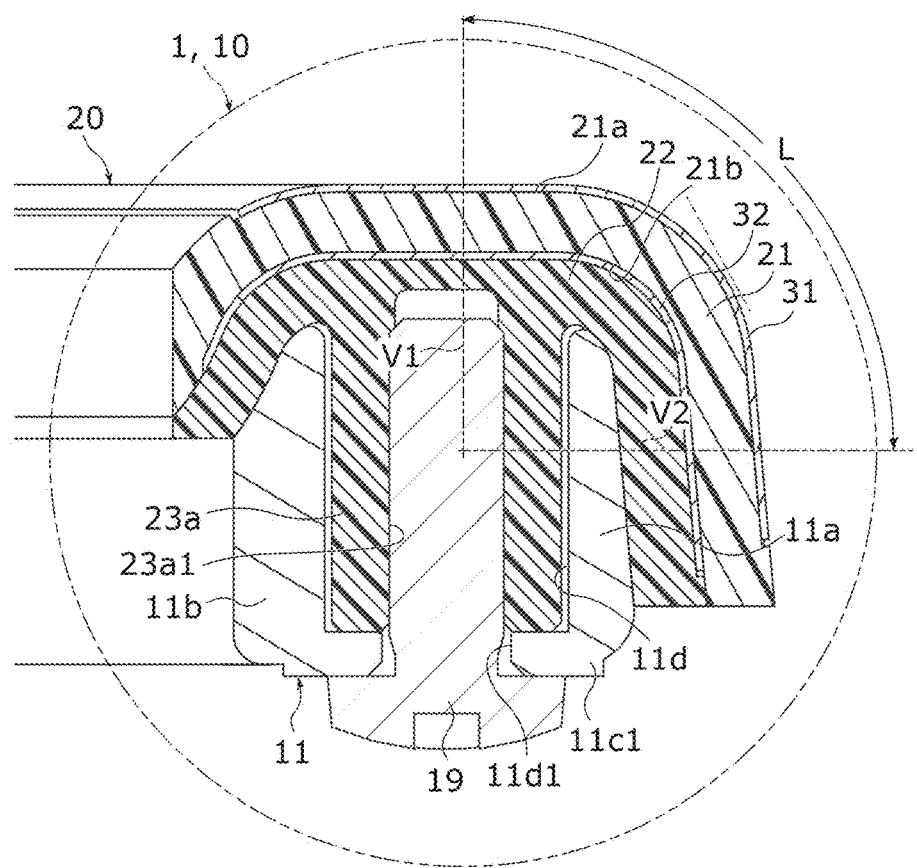

FIG. 1 illustrates a passenger compartment of vehicle 3 in which steering wheel 1 according to Embodiment 1 is disposed. FIG. 2A includes a perspective view of steering wheel 1 according to Embodiment 1. FIG. 2A2 shows a partial enlarged view of electrode structure 20. FIG. 2A1 shows a cross-sectional view of core metal 11 taken at the dotted and dashed line in FIG. 2A. FIG. 2A3 shows a partial enlarged view of first positioning portion 21$t$ of first insulator 21 and second positioning portion 22$t$ of second insulator 22. Illustration of harnesses 8$a$ and 8$b$ have been omitted in the partial enlarged view of first positioning portion 21$t$ of first insulator 21 and second positioning portion 22$t$ of second insulator 22 illustrated in FIG. 2A3.

As illustrated in FIG. 1 and FIG. 2A, steering wheel 1 imparts a steering angle to, for example, the steering of vehicle 3.

Steering wheel 1 includes rim 10. Rim 10 is integrally formed with T-shaped spoke 9 arranged on the inner circumferential surface of rim 10.

Rim 10 includes core metal 11, electrode structure 20, and foam 15 that covers electrode structure 20.

[Core Metal 11]

FIG. 3 is a cross-sectional view illustrating first engagement-target portion 11$c$1 and first engagement portion 23$a$ of steering wheel 1 taken at line A-A in FIG. 2A.

As illustrated in FIG. 2A and FIG. 3, core metal 11 is a metal annular core. More specifically, core metal 11 includes annular first portion 11$a$, annular second portion 11$b$ arranged on the inner circumferential side of first portion 11$a$, and curved portion 11$c$ that is curved and couples first portion 11$a$ and second portion 11$b$. One end edge of first portion 11$a$ is coupled to one end edge of curved portion 11$c$, and one end edge of second portion 11$b$ is coupled to the other end edge of curved portion 11$c$. Stated differently, in a cross section of core metal 11 taken in a plane perpendicular to the circumferential direction of core metal 11 (hereinafter also referred to as the cross section of core metal 11), curved portion 11$c$ is disposed between first portion 11$a$ and second portion 11$b$. A cross section of core metal 11 taken in this manner is, for example, U-shaped, V-shaped, J-shaped, or C-shaped. In FIG. 2A, core metal 11 is exemplified as having a U-shaped cross section. In the present embodiment, in a cross section of core metal 11, first portion 11$a$ and second portion 11$b$ are in the shape of a straight line.

Since core metal 11 has, for example, a U-shaped, V-shaped, J-shaped, or C-shaped cross section, first portion 11$a$, second portion 11$b$, and curved portion 11$c$ form recessed portion 10$a$ in core metal 11. Recessed portion 10$a$ is formed in an annular shape. In the present embodiment, the opening of recessed portion 10$a$ is formed in rim 10 so as to open toward the front of vehicle 3 (formed so as to open on the side of rim 10 opposite the side that faces the seats).

Figure 4:
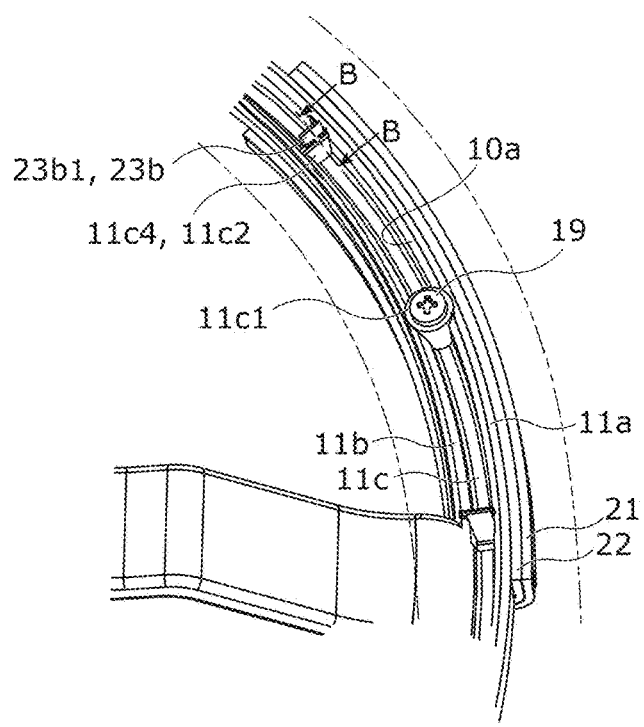
FIG. 4 is a perspective view of a first engagement-target portion, a second engagement-target portion, and a second engagement portion of a steering wheel according to Embodiment 1.

FIG. 4 is a perspective view of first engagement-target portion 11$c$1, second engagement-target portion 11$c$2, and second engagement portion 23$b$ of steering wheel 1 according to Embodiment 1.

As illustrated in FIG. 3 and FIG. 4, first engagement-target portion 11$c$1 and second engagement-target portion 11$c$2 are formed in recessed portion 10$a$.

First engagement-target portion 11$c$1 is formed on a rear surface of curved portion 11$c$, which is on the recessed portion 10$a$ side, and is a cylindrical or round tubular projection that stands upright from the rear surface. Insertion hole 11$d$, in which fastener 19, such as a screw, and first engagement portion 23$a$ of second insulator 22 are insertable, is formed on the inside of first engagement-target portion 11$c$1. Screw hole 11$d$1, in which fastener 19 is insertable, is formed on the bottom of first engagement-target portion 11$c$1, stated differently, the leading end of first engagement-target portion 11$c$1. First engagement-target portion 11$c$1 is one example of the engagement-target portion.

Figure 5:
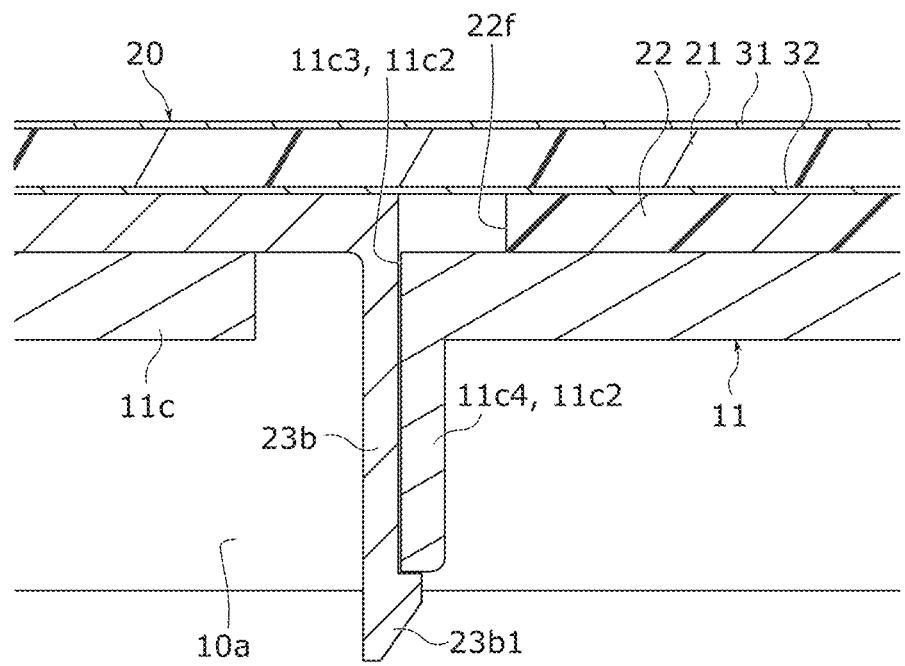
FIG. 5 is a cross-sectional view illustrating a second engagement-target portion and a second engagement portion of the steering wheel taken at line B-B in FIG. 4.

FIG. 5 is a cross-sectional view of second engagement-target portion 11$c$2 and second engagement portion 23$b$ of steering wheel 1 taken at line B-B in FIG. 4.

As illustrated in FIG. 4 and FIG. 5, second engagement-target portion 11$c$2 includes insertion through-hole 11$c$3 and upright wall 11$c$4 formed in recessed portion 10$a$. Second insulator 22 and second engagement portion 23$b$ are insertable inside insertion through-hole 11$c$3. Upright wall 11$c$4 is formed on the rear surface of curved portion 11$c$, which is on the recessed portion 10$a$ side, and is a plate-shaped projection that stands upright from the rear surface. Upright wall 11$c$4 is capable of engaging with second engagement portion 23$b$ inserted in insertion through-hole 11$c$3. Second engagement-target portion 11$c$2 is one example of the engagement-target portion.

Core metal 11 according to the present embodiment is exemplified as, but not limited to, including first engagement-target portion 11$c$1 and second engagement-target portion 11$c$2. FIG. 2B is a perspective view of electrode structure 20$g$ that does not include a first engagement portion, and core metal 11$g$ that does not include a first engagement-target portion. For example, as illustrated in FIG. 2B, core metal 11$g$ may include second engagement-target portion 11$c$2 without including a first engagement-target portion. In such cases, although not illustrated, electrode structure 20$g$ may include second engagement portion 23$b$ without including a first engagement portion. Moreover, core metal 11$g$ may include first engagement-target portion 11$c$1 without including a second engagement-target portion. In such cases, electrode structure 20 may include first engagement portion 23$a$ without including a second engagement portion.

[Electrode Structure 20]

As illustrated in FIG. 1 and FIG. 2A, electrode structure 20 is used in a device that detects the driver's hand gripping steering wheel 1. More specifically, to facilitate detection of the driver's grip on steering wheel 1, electrode structure 20 is disposed on the outer circumference of core metal 11 of steering wheel 1 provided in vehicle 3. Even more specifically, electrode structure 20 is provided on core metal 11 so as to cover a region from the outer circumferential side to the inner circumferential side of core metal 11, spanning from first portion 11$a$ to second portion 11$b$ through curved portion 11$c$ of core metal 11. Stated differently, a plurality of electrode structures 20 are provided on core metal 11 so as to cover core metal 11, excluding recessed portion 10$a$ of core metal 11.

Control circuit 40, which is capable of detecting the driver's hand gripping steering wheel 1, is connected to electrode structure 20. When rim 10 is gripped by the driver's hand, the capacitance between the electrode of electrode structure 20 and the hand changes. Control circuit 40 detects the grip from the electrode of electrode structure 20 based on an output signal in which the capacitance has changed. More specifically, control circuit 40 measures the capacitance of the electrode or a value (amount of change)

corresponding to the capacitance, and detects the driver's hand gripping rim 10 based on the value. Control circuit 40 is configured of a dedicated circuit or a general-purpose processor. Control circuit 40 is embedded in spoke 9 of FIG. 1, for example.

Electrode structure 20 is disposed on steering wheel 1 provided in vehicle 3. In the present embodiment, electrode structure 20 is embedded in rim 10 of steering wheel 1. In FIG. 1 for example, electrode structure 20 is exemplified as being provided on both the left and right sides of rim 10. In FIG. 1 for example, a pair of electrode structures 20 are exemplified as being provided on a portion of rim 10, but this example is non-limiting. For example, three or more electrode structures 20 may be provided on rim 10, and, alternatively, one electrode structure 20 may be provided on rim 10.

Figure 6:
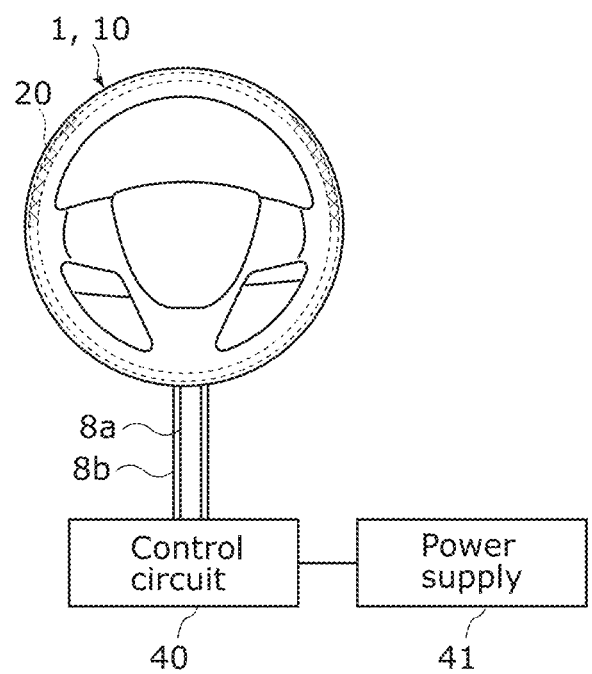
FIG. 6 is a block diagram of a steering wheel according to Embodiment 1.

FIG. 6 is a block diagram of steering wheel 1 according to Embodiment 1.

More specifically, as illustrated in FIG. 2A and FIG. 3, electrode structure 20 includes first insulator 21, second insulator 22, first electrode 31, and second electrode 32.

First insulator 21 is arranged along the outer circumferential side surface of core metal 11, and is spaced apart from the surface of core metal 11. Here, the outer circumferential side surface of core metal 11 is, in a view of the whole annular core metal 11, the surface on the opposite side of core metal 11 relative to the inner circumferential side surface of core metal 11 on which spoke 9 is disposed.

First insulator 21 includes first surface 21a and second surface 21b on opposite sides. Second surface 21b is the surface facing core metal 11. First electrode 31 is disposed on first surface 21a, and second electrode 32 is disposed on second surface 21b. Stated differently, first insulator 21 is sandwiched between first electrode 31 and second electrode 32. First insulator 21 can thus arrange first electrode 31 and second electrode 32 so as to be spaced apart from one another and to overlap one another. In other words, first insulator 21 can arrange first electrode 31 and second electrode 32 so that first electrode 31 and second electrode 32 are not electrically connected.

In the present embodiment, to fill in the space between first electrode 31 and second electrode 32, first insulator 21 extends along the lengthwise direction of first electrode 31 and second electrode 32 so as to have a length equivalent to that of first electrode 31 and second electrode 32, but first insulator 21 may be arranged between a portion of first electrode 31 and second electrode 32.

First insulator 21 is made of a resin material such as a hard plastic such as polycarbonate, polybutylene terephthalate, or the like.

First insulator 21 has a certain thickness. A "certain thickness" means, for example, that first insulator 21 has a thickness of approximately a few millimeters. Since first insulator 21 has a certain thickness, first insulator 21 is rigid.

First insulator 21 and second electrode 32 are supported by second insulator 22 and are disposed spaced apart from core metal 11 by a predetermined distance. Stated differently, second electrode 32, which is disposed between first insulator 21 and second insulator 22, is disposed spaced apart from core metal 11 by a predetermined distance by second insulator 22. In other words, second insulator 22 is disposed between first insulator 21 and second electrode 32 on one side and core metal 11 on the other.

Second insulator 22 is disposed between second electrode 32 and core metal 11, overlaps with first insulator 21, first electrode 31, and second electrode 32, and is covered by first insulator 21, first electrode 31 and second electrode 32.

Second insulator 22 is disposed along the surface on the outer circumferential side of core metal 11, in contact with the surface on the outer circumferential side of core metal 11. In other words, second insulator 22 can arrange second electrode 32 so that second electrode 32 and core metal 11 are not electrically connected. First insulator 21 and/or second insulator 22 are collectively referred to as the insulator, stated differently, first insulator 21 and/or second insulator 22 are included in the insulator.

In the present embodiment, to fill in the space between second electrode 32 and core metal 11, second insulator 22 extends along the lengthwise direction of second electrode 32 so as to have a length equivalent to that of second electrode 32, but second insulator 22 may be arranged between a portion of second electrode 32 and core metal 11.

As illustrated in FIG. 3, FIG. 4, and FIG. 5, in a cross section of steering wheel 1 taken in a plane perpendicular to the circumferential direction of steering wheel 1 (hereinafter also referred to as the cross section of steering wheel 1), second insulator 22 includes first engagement portion 23a that engages first engagement-target portion 11c1 included in core metal 11, and second engagement portion 23b that engages second engagement-target portion 11c2 included in core metal 11. First engagement portion 23a and second engagement portion 23b are included in the engagement portion.

First engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of second insulator 22 facing core metal 11, and is fixed to first engagement-target portion 11c1 by being fitted inside first engagement-target portion 11c1.

First engagement portion 23a is a cylindrical or round tubular portion, but includes fastener hole 23a1 that corresponds to screw hole 11d1 of first engagement-target portion 11c1. In other words, first engagement portion 23a can be fastened with fastener 19 by inserting fastener 19 inserted through screw hole 11d1 of first engagement-target portion 11c1 into fastener hole 23a1 of first engagement portion 23a.

Second engagement portion 23b includes engagement claw 23b1 that engages second engagement-target portion 11c2 of core metal 11. More specifically, second engagement portion 23b includes engagement claw 23b1 that is inserted in insertion through-hole 11c3 of second engagement-target portion 11c2 and can engage upright wall 11c4 of second engagement-target portion 11c2. In other words, second engagement portion 23b is a rod-shaped or plate-shaped portion that stands upright from the surface of second insulator 22 facing core metal 11, and when inserted in insertion through-hole 11c3 of second engagement-target portion 11c2, engagement claw 23b1 of second engagement portion 23b hooks onto upright wall 11c4 of second engagement-target portion 11c2. In the present embodiment, engagement claw 23b1 protrudes along the circumferential direction of core metal 11, but may protrude in a direction intersecting the circumferential direction of core metal 11. Upright wall 11c4 of core metal 11 according to the present embodiment is disposed orthogonal to the circumferential direction of core metal 11, but when engagement claw 23b1 protrudes in a direction intersecting the circumferential direction of core metal 11, upright wall 11c4 may be disposed along the circumferential direction of core metal 11.

One or more first engagement portions 23a and one or more second engagement portions 23b are disposed on second insulator 22. A plurality of first engagement-target portions 11c1 and a plurality of second engagement-target portions 11c2 may be formed on core metal 11 in accordance with the number of first engagement portions 23a and second engagement portions 23b. First engagement portion 23a, second engagement portion 23b, first engagement-target portion 11c1, and second engagement-target portion 11c2 may be disposed at approximately equal intervals on rim 10.

Second insulator 22 is made of a resin material such as a hard plastic such as polycarbonate, polybutylene terephthalate, or the like.

Second insulator 22 has a certain thickness. A "certain thickness" means, for example, that second insulator 22 has a thickness of approximately a few millimeters. Since second insulator 22 has a certain thickness, second insulator 22 is rigid.

As illustrated in FIG. 2A3, first insulator 21 includes first positioning portion 21t, and second insulator 22 includes second positioning portion 22t. First positioning portion 21t is formed at the corner portions of both end portions of first insulator 21 that extends in the circumferential direction of core metal 11. Second positioning portion 22t is formed at the corner portions of both end portions of second insulator 22 that extends in the circumferential direction of core metal 11. In the present embodiment, first positioning portion 21t is exemplified as a recessed portion that interlocks with second positioning portion 22t, but first positioning portion 21t may be a protruding portion that interlocks with second positioning portion 22t. Second positioning portion 22t is exemplified as a protruding portion that interlocks with first positioning portion 21t, but second positioning portion 22t may be a recessed portion that interlocks with first positioning portion 21t. When assembling first insulator 21 to second insulator 22 while sandwiching second electrode 32 between first insulator 21 and second insulator 22, first positioning portion 21t is interlocked with second positioning portion 22t. Since this positions first insulator 21 and second insulator 22, misalignment of first insulator 21 and second insulator 22 in the circumferential direction can be inhibited, making it possible to easily and properly assemble first insulator 21 and second insulator 22.

Although first positioning portion 21t is exemplified as being formed at corner portions of first insulator 21, first positioning portion 21t may be formed at any location. Moreover, a plurality of first positioning portions 21t may be formed in first insulator 21. Although second positioning portion 22t is exemplified as being formed at corner portions of second insulator 22, second positioning portion 22t may be formed at any location. Moreover, a plurality of second positioning portions 22t may be formed in second insulator 22. For example, first positioning portions 21t may be formed at the four corner portions at both end portions of first insulator 21, and second positioning portions 22t may be formed at the four corner portions at both ends of second insulator 22.

First electrode 31, second electrode 32, first insulator 21, and second insulator 22 may be integrally formed, and, alternatively, may be formed as individual separable elements.

First electrode 31 includes metal plating, a metal sheet, or a metal plate. When first electrode 31 is a metal sheet or a metal plate, the metal sheet or the metal plate is attached to first surface 21a of first insulator 21 by an adhesive or the like. First electrode 31 is, for example, a metal containing copper or aluminum or the like.

First electrode 31 is disposed on first surface 21a of first insulator 21. First surface 21a is the surface on the opposite side of first insulator 21 relative to the surface of first insulator 21 that faces core metal 11 of steering wheel 1. Here, the surface of first insulator 21 that faces core metal 11 is second surface 21b, which faces core metal 11 with second insulator 22 and second electrode 32 disposed therebetween. In other words, first electrode 31 is disposed spaced apart from core metal 11 and second electrode 32.

As illustrated in FIG. 6, an AC voltage is applied to first electrode 31. The AC voltage applied to first electrode 31 is generated in control circuit 40 by power supplied from power supply 41 illustrated in FIG. 6. Here, since first electrode 31 is disposed on first surface 21a of first insulator 21, when the part of rim 10 where first electrode 31 is disposed is gripped by the driver's hand, a capacitance is formed between first electrode 31 and the driver's hand. Control circuit 40 can therefore detect the driver's hand gripping rim 10 based on the change in capacitance.

First electrode 31 and second electrode 32 are electrically connected to harnesses 8a and 8b.

As illustrated in FIG. 2A, harness 8a is electrically connected to each first electrode 31 of electrode structure 20. Harness 8a may be electrically connected to first electrode 31 by being soldered to first electrode 31. Harness 8a may be electrically connected to first electrode 31 by being crimped with a rivet to first electrode 31.

Harness 8b is electrically connected to each second electrode 32 of electrode structure 20. Harness 8b may be electrically connected to second electrode 32 by being soldered to second electrode 32. Harness 8b may be electrically connected to second electrode 32 by being crimped with a rivet to second electrode 32.

Here, control circuit 40 in FIG. 6 can apply AC voltage to first electrode 31 and second electrode 32 via harnesses 8a and 8b.

The capacitance between first electrode 31 and core metal 11 can be canceled out or reduced by applying an AC voltage having the same phase to first electrode 31 and second electrode 32. Accordingly, control circuit 40 can accurately detect the capacitance formed between first electrode 31 and the driver's hand.

Second electrode 32 includes metal plating, a metal sheet, or a metal plate. When second electrode 32 is a metal sheet or a metal plate, the metal sheet or the metal plate is attached to second surface 21b of first insulator 21 by an adhesive or the like. Second electrode 32 is, for example, a metal containing copper or aluminum or the like.

When first electrode 31 and second electrode 32 are formed using metal plating, as illustrated in FIG. 5, since hole 22f is formed in the base of second engagement portion 23b in second insulator 22, hole 22f of second insulator 22 may be masked and the area of first surface 21a of first insulator 21 corresponding to hole 22f may be masked as well. With this, except for hole 22f, second electrode 32 can be formed on the surface of second insulator 22 on the first insulator 21 side, and except for the area corresponding to hole 22f, first electrode 31 can be formed on first surface 21a of first insulator 21. Stated differently, second electrode 32 is not formed on hole 22f of second insulator 22, and first electrode 31 is not formed on the area of first surface 21a of first insulator 21 that corresponds to hole 22f. As another method, first electrode 31 may be formed by metal plating first surface 21a of first insulator 21, and second electrode 32 may be formed by metal plating second surface 21b of first insulator 21.

Second electrode 32 is disposed on second surface 21b of first insulator 21. Second surface 21b is on the opposite side of first insulator 21 relative to first surface 21a. More specifically, second electrode 32 is disposed along second surface 21b of first insulator 21 so as to sandwich first insulator 21 with first electrode 31. Since second electrode 32 is sandwiched by first insulator 21 and second insulator 22, second electrode 32 can be said to be disposed on the surface of second insulator 22 that faces first insulator 21. In other words, second electrode 32 is disposed spaced apart from core metal 11 and first electrode 31. For this reason, second electrode 32 is not electrically connected to core metal 11 or first electrode 31.

An AC voltage having the same phase as the AC voltage applied to first electrode 31 is applied to second electrode 32. The AC voltage applied to second electrode 32 is generated in control circuit 40 by power supplied from power supply 41 illustrated in FIG. 6.

As illustrated in FIG. 2A2, in first electrode 31 and second electrode 32, when first electrode 31 and second electrode 32 are viewed so as to overlap, first electrode 31 is covered by the whole of second electrode 32, and the surface area of coverage of second surface 21b by second electrode 32 is greater than the surface area of coverage of first surface 21a by first electrode 31. For this reason, second electrode 32 can inhibit the formation of capacitance between first electrode 31 and core metal 11.

In a cross section of steering wheel 1 taken in a plane perpendicular to the circumferential direction of rim 10 of steering wheel 1 (hereinafter also referred to as the cross section of rim 10), first insulator 21, second insulator 22, first electrode 31, and second electrode 32 are disposed at least in the range from the outer circumferential side portion of rim 10 of steering wheel 1 to the portion of rim 10 facing the rear of vehicle 3.

In the present embodiment, first insulator 21, second insulator 22, first electrode 31, and second electrode 32 are disposed along the circumferential direction of the cross section of rim 10 over a range of at least ¼th of the circumference. As illustrated in FIG. 3, first insulator 21, first electrode 31, and second electrode 32 are disposed over a range greater than range L between the two straight lines V1 and V2 made of long dashes broken by two short dashes. More specifically, first insulator 21, second insulator 22, first electrode 31, and second electrode 32 are disposed spanning from first portion 11a to second portion 11b through curved portion 11c of rim 10. In this way, first insulator 21, first electrode 31, and second electrode 32 are disposed in locations easily contacted by the driver's hand when the driver's hand grips rim 10, whereby the driver's grip on steering wheel 1 can be accurately detected by electrode structure 20.

[Foam 15]

As illustrated in FIG. 2A, foam 15 is the portion that the driver grips with their hand, and forms the outer shell of rim 10 on steering wheel 1. Foam 15 is made of a resin material such as a urethane resin such as polyurethane, and covers electrode structure 20. First insulator 21, second insulator 22, first electrode 31, second electrode 32, and core metal 11 are embedded in foam 15. In other words, first insulator 21, second insulator 22, first electrode 31, second electrode 32, and core metal 11 are covered by foam 15 so as not to be exposed.

<Method for Manufacturing Steering Wheel 1>

Figure 7:
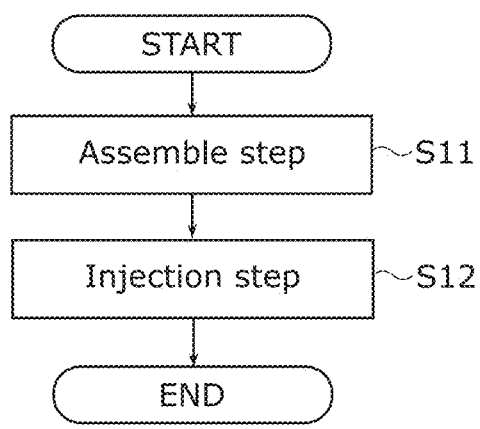
FIG. 7 is a flowchart showing a method for manufacturing a steering wheel according to Embodiment 1.

FIG. 7 is a flowchart showing a method for manufacturing steering wheel 1 according to Embodiment 1.

First, as illustrated in FIG. 7, a worker prepares core metal 11 and electrode structure 20. The engagement portion included in electrode structure 20 is caused to engage the engagement-target portion included in core metal 11, fastener 19 is inserted in fastener hole 23a1, and the engagement portion is fastened to core metal 11. With this, electrode structure 20 is assembled to core metal 11 (S11: assemble step). More specifically, first engagement-target portion 11c1 of core metal 11 engages first engagement portion 23a of second insulator 22. In other words, first engagement portion 23a is caused to engage first engagement-target portion 11c1, and first engagement portion 23a and first engagement-target portion 11c1 are fastened together by fastener 19 inserted in screw hole 11d1 of first engagement-target portion 11c1 and fastener hole 23a1 of first engagement portion 23a. Second engagement-target portion 11c2 of core metal 11 engages second engagement portion 23b of second insulator 22. In other words, engagement claw 23b1 of second engagement portion 23b included in electrode structure 20 is caused to engage second engagement-target portion 11c2 provided on core metal 11. This yields a structure in which electrode structure 20 is fastened to core metal 11.

Next, the structure is fixed in the cavity of a mold and the mold is clamped. In other words, the structure is covered using foam 15 while electrode structure 20 and core metal 11 are fastened together. In other words, injection molding resin is poured into the cavity in the mold through a gate formed in the mold to form foam 15 that covers the structure (S12: injection step). For example, the injection molding resin is a urethane resin material such as polyurethane.

In this way, foam 15 can cover electrode structure 20 and core metal 11 while electrode structure 20 is engaged with core metal 11. This yields steering wheel 1.

Advantageous Effects

Next, the advantageous effects of electrode structure 20, steering wheel 1, and the method for manufacturing steering wheel 1 according to the present embodiment will be described.

The conventional technique disclosed in PTL 1 can be improved upon in regard to the appearance of the steering wheel since there is a notch in the foam of the steering wheel. Moreover, making the notch and inserting the conductor of the sensor increases man-hours, so the conventional technique can be improved upon in terms of steering wheel manufacturing cost.

Electrode structure 20 according to the present embodiment is disposed on the outer circumference of core metal 11 of steering wheel 1 provided in vehicle 3, and includes an insulator (first insulator 21 and/or second insulator 22) and first electrode 31 disposed on first surface 21a of the insulator, which is the surface on the opposite side of the insulator relative to the surface of the insulator that faces core metal 11 of steering wheel 1. The insulator includes an engagement portion (first engagement portion 23a) that engages an engagement-target portion (first engagement-target portion 11c1) included in core metal 11.

According to this configuration, electrode structure 20 can be attached to core metal 11 in advance. Electrode structure 20 can therefore be disposed inside steering wheel 1 when forming steering wheel 1. For this reason, unlike the conventional technique, it is not necessary to make a notch in steering wheel 1 after forming steering wheel 1 to dispose first electrode 31 and second electrode 32.

Therefore, owing to electrode structure 20, an increase in processes related to the manufacturing of steering wheel 1 can be inhibited, and an increase in the manufacturing cost of steering wheel 1 can be inhibited without compromising the appearance of steering wheel 1.

In particular, with electrode structure 20, the engagement between the engagement portion and the engagement-target portion both secures a distance between first electrode 31 and the insulator and maintains the posture of first electrode 31 and the insulator. For this reason, when steering wheel 1 is resin-molded, electrode structure 20 can be assembled to steering wheel 1 with certainty.

Electrode structure 20 can be firmly fastened to core metal 11 by the engagement of the engagement-target portion and the engagement portion. For this reason, it is possible to inhibit the insulator from being displaced with respect to core metal 11 or being rotationally displaced with respect to the circumferential direction of steering wheel 1 due to pressure at the time of resin molding steering wheel 1. This consequently inhibits an increase in the processes related to the manufacturing of steering wheel 1 and inhibits an increase in manufacturing cost.

Steering wheel 1 according to the present embodiment includes electrode structure 20, core metal 11, and foam 15 that covers electrode structure 20.

Steering wheel 1 configured in this manner also has the same advantageous effects as described above.

A method for manufacturing steering wheel 1 according to the present embodiment includes fastening an engagement portion to core metal 11 by inserting fastener 19 into fastener hole 23a1 included in electrode structure 20, and covering electrode structure 20 using foam 15 while the engagement portion is fastened to core metal 11.

With this, electrode structure 20 and core metal 11 can be firmly fastened together by fastening the engagement portion to core metal 11. For this reason, it is possible to inhibit the insulator from being displaced with respect to core metal 11 or being rotationally displaced with respect to the circumferential direction of steering wheel 1 due to pressure at the time of resin molding steering wheel 1. This method for manufacturing steering wheel 1 also has the same advantageous effects as described above.

A method for manufacturing steering wheel 1 according to the present embodiment includes engaging engagement claw 23b1 included in electrode structure 20 with second engagement-target portion 11c2 included in core metal 11, and covering electrode structure 20 using foam 15 while engagement claw 23b1 is engaged with second engagement-target portion 11c2 included in core metal 11.

With this, electrode structure 20 and core metal 11 can be firmly fastened together by connecting the engagement portion to core metal 11. For this reason, it is possible to inhibit the insulator from being displaced with respect to core metal 11 or being rotationally displaced with respect to the circumferential direction of steering wheel 1 due to pressure at the time of resin molding steering wheel 1. This method for manufacturing steering wheel 1 also has the same advantageous effects as described above.

In electrode structure 20 according to the present embodiment, the insulator includes first insulator 21 and second insulator 22. First electrode 31 is disposed on first surface 21a of first insulator 21. Electrode structure 20 further includes: second electrode 32 disposed on second surface 21b of first insulator 21, which is on the opposite side of first insulator 21 relative to first surface 21a; and second insulator 22, which is disposed between second electrode 32 and core metal 11. Second insulator 22 includes an engagement portion that engages an engagement-target portion included in core metal 11.

This allows first insulator 21 to position first electrode 31 away from second electrode 32 and core metal 11, by second insulator 22 positioning second electrode 32 away from core metal 11. With this, since first electrode 31 and second electrode 32 can be disposed on first insulator 21, the member in which first insulator 21, first electrode 31, and second electrode 32 are integrated can be easily assembled to core metal 11. Here, first insulator 21 may be integral with first electrode 31, and second insulator 22 may be integral with second electrode 32.

In electrode structure 20 according to the present embodiment, in a cross section of steering wheel 1 taken in a plane 42a perpendicular to a circumferential direction 42b of steering wheel 1, first insulator 21, second insulator 22, first electrode 31, and second electrode 32 are disposed at least in a range from an outer circumferential side of steering wheel 1 to an inner circumferential side of steering wheel 1.

With this, electrode structure 20 can be disposed at a position where the driver's hand easily comes into contact with the surface of steering wheel 1 when the driver grips steering wheel 1 with their hand. Accordingly, it is possible to detect the driver's hand gripping steering wheel 1.

In electrode structure 20 according to the present embodiment, first insulator 21 comprises a resin material. Second insulator 22 comprises a resin material. First electrode 31 includes metal plating, a metal sheet, or a metal plate. Second electrode 32 includes metal plating, a metal sheet, or a metal plate.

With this, since first electrode 31 and second electrode 32 can be disposed on first insulator 21, the member in which the insulator, first electrode 31, and second electrode 32 are integrated can be easily assembled to core metal 11. Furthermore, since second insulator 22 is disposed between first insulator 21 and second electrode 32 on one side and core metal 11 on the other, second insulator 22 can dispose first electrode 31 so as to be spaced apart from core metal 11.

In electrode structure 20 according to the present embodiment, an AC voltage having the same phase as the AC voltage applied to second electrode 32 is applied to first electrode 31.

According to this, the capacitance formed between first electrode 31 and core metal 11 can be canceled or reduced. Accordingly, if control circuit 40 for detecting the driver's hand gripping steering wheel 1 is used, control circuit 40 will be able to accurately detect the capacitance formed between first electrode 31 and the driver's hand that generates when the driver's hand grips steering wheel 1.

In electrode structure 20, first insulator 21 includes first positioning portion 21t. Second insulator 22 includes second positioning portion 22t that interlocks with first positioning portion 21t.

With this, when assembling first insulator 21 to second insulator 22, first positioning portion 21t and second positioning portion 22t can be interlocked. Since this positions first insulator 21 and second insulator 22, misalignment of first insulator 21 and second insulator 22 in the circumferential direction can be inhibited, making it possible to easily and properly assemble first insulator 21 and second insulator 22.

In electrode structure 20 according to the present embodiment, the engagement portion includes first engagement portion 23a, and first engagement portion 23a includes fastener hole 23a1 for fastening first engagement-target portion 11c1 included in the engagement-target portion.

With this, since first engagement-target portion 11c1 can be fastened to first engagement portion 23a, electrode structure 20 can be easily fastened to core metal 11.

In electrode structure 20 according to the present embodiment, the engagement portion includes second engagement portion 23b, and second engagement portion 23b includes engagement claw 23b1 that engages second engagement-target portion 11c2 included in the engagement-target portion.

With this, since engagement claw 23b1 can engage second engagement-target portion 11c2, electrode structure 20 can be easily fastened to core metal 11.

In electrode structure 20 according to the present embodiment, core metal 11 includes curved portion 11c having a curved shape in a cross section of steering wheel 1 taken in a plane perpendicular to the circumferential direction of steering wheel 1, and the engagement-target portion is formed on curved portion 11c.

With this, first engagement portion 23a can easily engage first engagement-target portion 11c1 formed on curved portion 11c of core metal 11.

Variation 1 of Embodiment 1

Electrode structure 120 and steering wheel 1a according to the present variation differ from the electrode structure and the steering wheel according to Embodiment 1 in that they include first insulator 21 and first electrode 31 but do not include second insulator 22 or second electrode 32. In the present variation, configurations and functions that are the same as the electrode structure and the steering wheel according to Embodiment 1 share the same reference signs, and detailed description related to these configurations and functions will be omitted.

Figure 8:
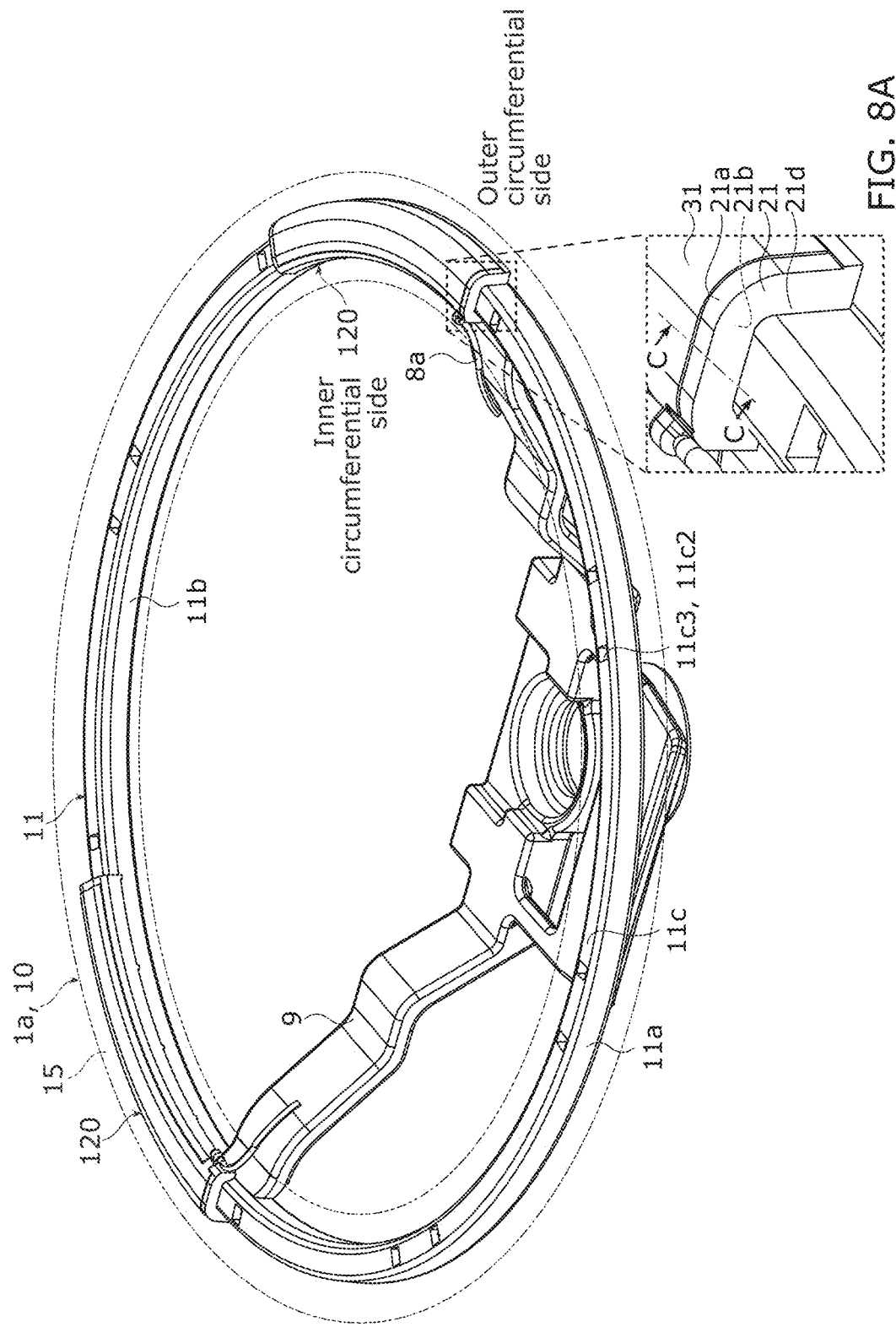
FIG. 8 includes a perspective view of a steering wheel according to Variation 1 of Embodiment 1.
Figure 9:
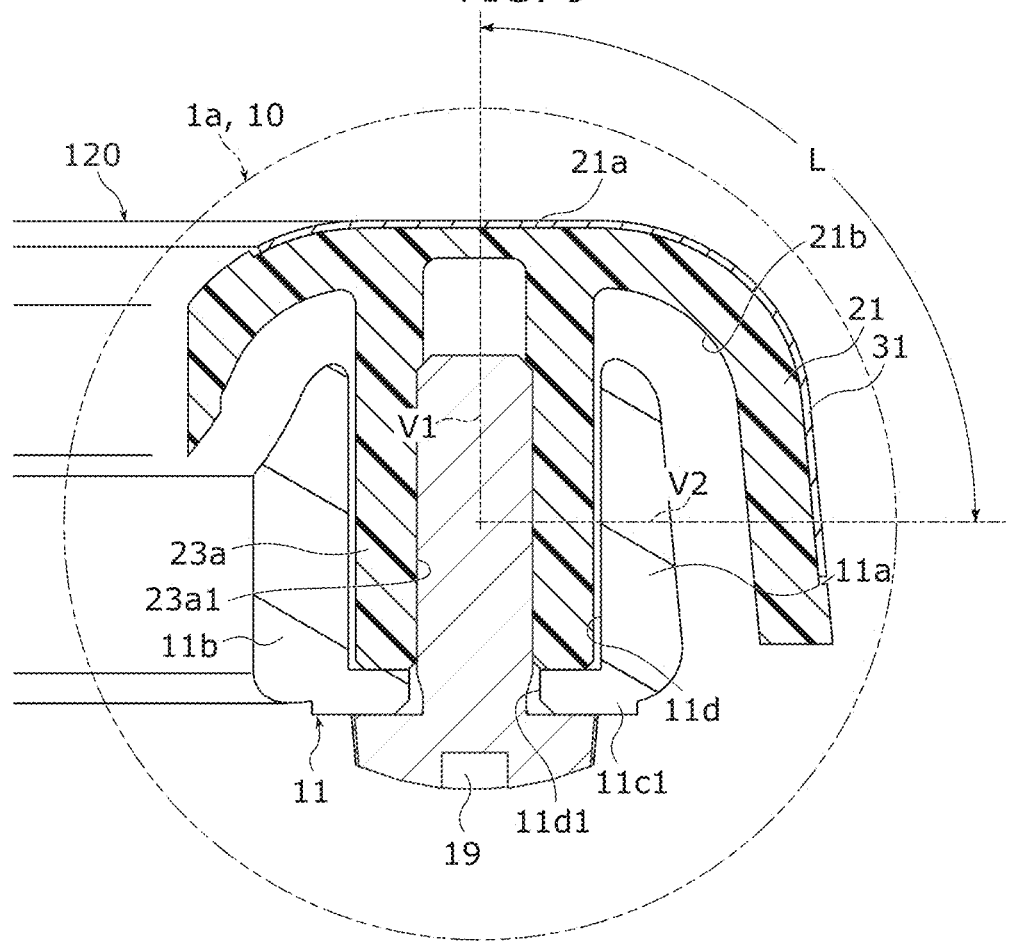
FIG. 9 is a cross-sectional view illustrating a first engagement-target portion and a first engagement portion of a steering wheel.
Figure 10:
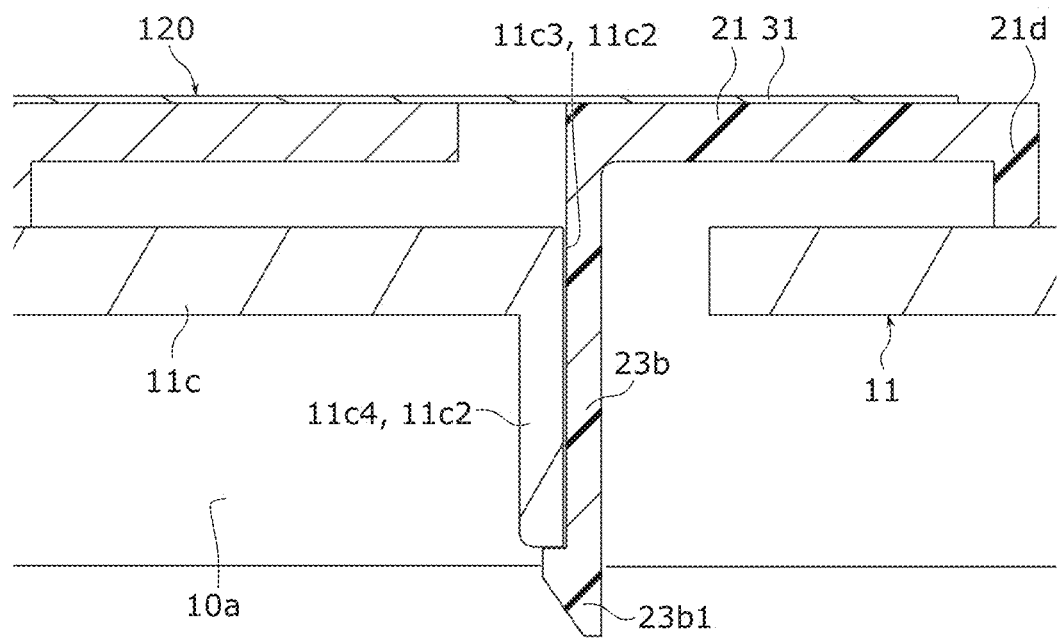
FIG. 10 is a cross-sectional view illustrating a second engagement-target portion and a second engagement portion of the steering wheel taken at line C-C in FIG. 8A.

FIG. 8 includes a perspective view of steering wheel 1a according to Variation 1 of Embodiment 1 and FIG. 8A shows a partial enlarged view of electrode structure 120 according to Variation 1 of Embodiment 1. FIG. 9 is a cross-sectional view illustrating first engagement-target portion 11c1 and first engagement portion 23a of steering wheel 1a. FIG. 10 is a cross-sectional view of second engagement-target portion 11c2 and second engagement portion 23b of steering wheel 1a taken at line C-C in FIG. 8A.

As illustrated in FIG. 8 through FIG. 10, electrode structure 120 according to the present variation includes first insulator 21, first electrode 31, and projecting portion 21d.

First insulator 21 is arranged along the outer circumferential side surface of core metal 11.

First insulator 21 includes first surface 21a and second surface 21b on opposite sides. Second surface 21b is the surface facing core metal 11. First electrode 31 is disposed on first surface 21a. First electrode 31 is electrically connected to harness 8a. Second surface 21b is separated a predetermined distance from core metal 11 by projecting portion 21d. First insulator 21 can arrange first electrode 31 so as to be spaced apart from core metal 11 so that first electrode 31 and core metal 11 are not electrically connected. Foam 15 may be disposed between first insulator 21 and core metal 11. Second surface 21b of first insulator 21 may contact core metal 11.

First electrode 31 is supported by first insulator 21 and is disposed spaced apart from core metal 11 by a predetermined distance. This makes it possible to ensure a distance between first electrode 31 and core metal 11.

In a cross section of steering wheel 1a taken in a plane perpendicular to the circumferential direction of steering wheel 1a, first insulator 21 includes first engagement portion 23a that engages first engagement-target portion 11c1 included in core metal 11, and second engagement portion 23b that engages second engagement-target portion 11c2 included in core metal 11.

First engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of second insulator 22 facing core metal 11, and is fixed to first engagement-target portion 11c1 by being fitted inside first engagement-target portion 11c1.

First engagement portion 23a is a cylindrical or round tubular portion, but includes fastener hole 23a1 that corresponds to screw hole 11d1 of first engagement-target portion 11c1. In other words, first engagement portion 23a can be fastened with fastener 19 by inserting fastener 19 inserted through screw hole 11d1 of first engagement-target portion 11c1 into fastener hole 23a1 of first engagement portion 23a.

Second engagement portion 23b includes engagement claw 23b1 that engages second engagement-target portion 11c2 of core metal 11. More specifically, second engagement portion 23b includes engagement claw 23b1 that is inserted in insertion through-hole 11c3 of second engagement-target portion 11c2 and can engage upright wall 11c4 of second engagement-target portion 11c2. In other words, second engagement portion 23b is a rod-shaped or plate-shaped portion that stands upright from the surface of second insulator 22 facing core metal 11, and when inserted in insertion through-hole 11c3 of second engagement-target portion 11c2, engagement claw 23b1 of second engagement portion 23b hooks onto upright wall 11c4 of second engagement-target portion 11c2.

First electrode 31 and first insulator 21 may be integrally formed, and, alternatively, may be formed as individual separable elements.

Projecting portion 21d is disposed at a position opposite core metal 11. Projecting portion 21d projects from first insulator 21 toward core metal 11. A portion of the tip of projecting portion 21d abuts core metal 11. In other words, projecting portion 21d is disposed between first insulator 21 and core metal 11. Accordingly, projecting portion 21d can ensure that first insulator 21 is distanced from core metal 11 and maintain the posture of first insulator 21 relative to core metal 11 so that first insulator 21 and first electrode 31 do not contact core metal 11.

Projecting portion 21d is integrally formed with first insulator 21. Projecting portion 21d and first insulator 21 may be formed as individual separable elements.

A plurality of projecting portions 21d are disposed between core metal 11 and first insulator 21. Projecting portions 21d may be disposed at approximately equal intervals on core metal 11 and first insulator 21.

First electrode 31 is disposed on first surface 21a of first insulator 21. First surface 21a is the surface on the opposite side of first insulator 21 relative to the surface of first insulator 21 that faces core metal 11 of steering wheel 1a. Here, the surface of first insulator 21 that faces core metal 11 is second surface 21b, which directly or indirectly faces core metal 11 with foam 15 disposed therebetween.

In electrode structure 120 according to the present variation, the insulator includes first insulator 21. First electrode 31 is disposed on first surface 21a of first insulator 21. First insulator 21 includes an engagement portion (first engagement portion 23a) that engages an engagement-target portion (first engagement-target portion 11c1) included in core metal 11.

This allows first insulator 21 to position first electrode 31 away from core metal 11. Since first electrode 31 can be disposed on first insulator 21, the member in which first insulator 21 and first electrode 31 are integrated can be easily assembled to core metal 11.

Variation 2 of Embodiment 1

The present variation differs from the electrode structure and the steering wheel according to Embodiment 1 and Variation 1 of Embodiment 1 in that a plurality of electrode structures 20 are coupled together and disposed along the circumferential direction of core metal 11. In the present variation, configurations and functions that are the same as the electrode structure and the steering wheel according to Embodiment 1 and Variation 1 of Embodiment 1 share the same reference signs, and detailed description related to these configurations and functions will be omitted.

Figure 11:
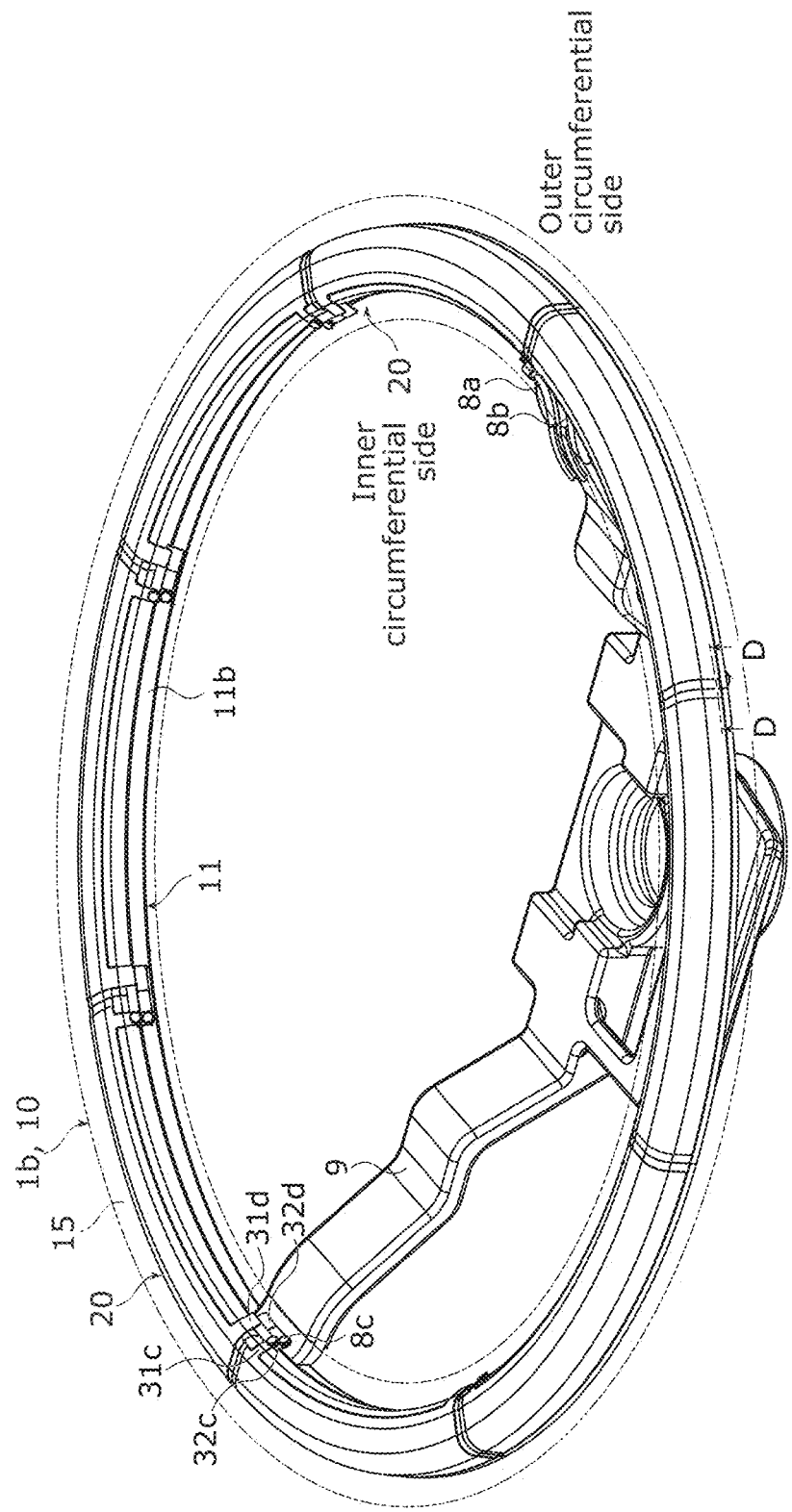
FIG. 11 is a perspective view of a steering wheel according to Variation 2 of Embodiment 1.
Figure 12:
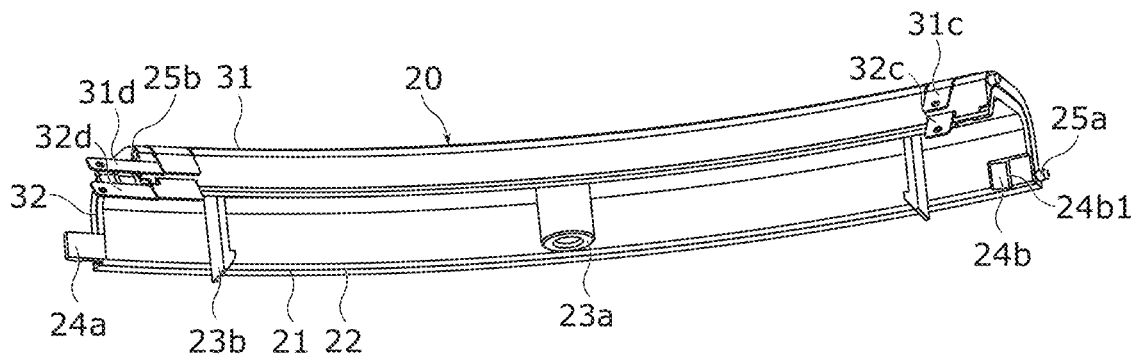
FIG. 12 is a perspective view of an electrode structure according to Variation 2 of Embodiment 1.
Figure 13:
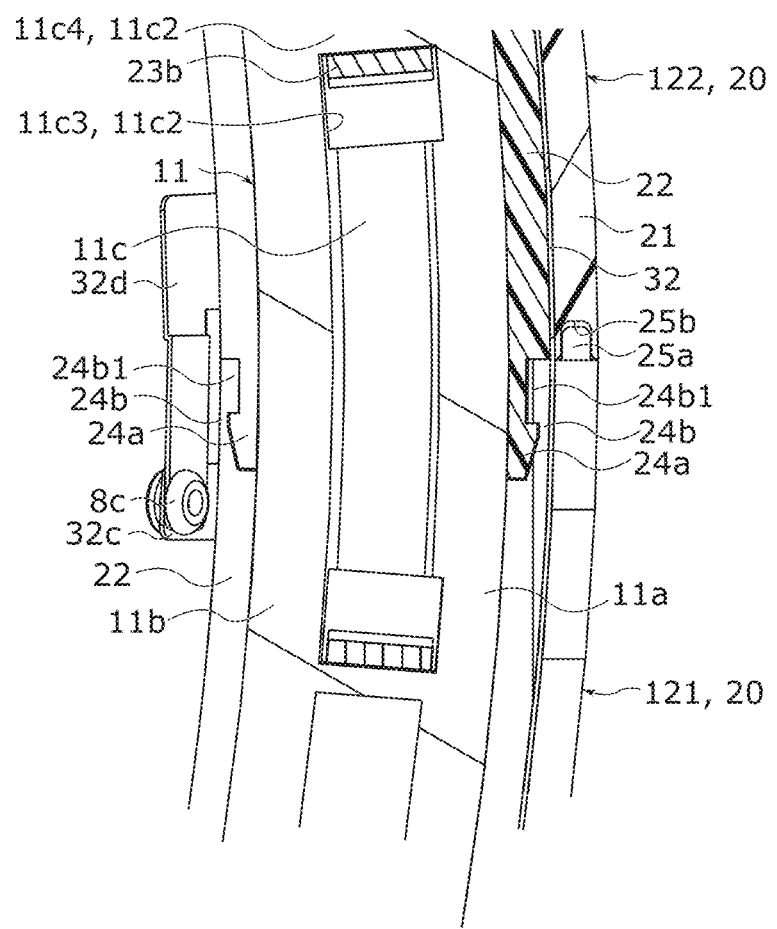
FIG. 13 is a cross-sectional view of an electrode structure and a core metal taken at line D-D in FIG. 11.

FIG. 11 is a perspective view of steering wheel 1b according to Variation 2 of Embodiment 1. FIG. 12 is a perspective view of electrode structure 20 according to Variation 2 of Embodiment 1. FIG. 13 is a cross-sectional view of electrode structure 20 and core metal 11 taken at line D-D in FIG. 11. The present variation presents an example in which first connecting portions 31c and 31d of two adjacent first electrodes 31 are fastened by, for example, rivet 8c, and second connecting portions 32c and 32d of two adjacent second electrodes 32 are fastened by, for example, rivet 8c.

In the present variation, as illustrated in FIG. 11, a plurality of electrode structures 20 are provided along the circumferential direction of core metal 11. Although eight electrode structures 20 are used in the present variation, seven or fewer, or nine or more electrode structures 20 may be used. Moreover, the entire circumference of core metal 11 need not be covered by electrode structures 20.

As illustrated in FIG. 12 and FIG. 13, first coupling portion 25a and first coupling-target portion 25b are formed on each first insulator 21 of the plurality of electrode structures 20. In FIG. 13 according to the present variation, among two adjacent electrode structures 20 included in the plurality of electrode structures 20, one electrode structure 20 is referred to as first electrode structure 121 and the other electrode structure 20 is referred to as second electrode structure 122. Each of first electrode structure 121 and second electrode structure 122 includes first coupling portion 25a and first coupling-target portion 25b.

First coupling portion 25a is formed on one end of first insulator 21 of first electrode structure 121 and, although omitted in the figure, formed on one end of first insulator 21 of second electrode structure 122. First coupling-target portion 25b is formed on the other end of first insulator 21 of first electrode structure 121 although omitted in the figure, and formed on the other end of first insulator 21 of second electrode structure 122.

First coupling portion 25a couples with first coupling-target portion 25b of first insulator 21 of second electrode structure 122, which is the electrode structure 20 adjacent to first electrode structure 121. First coupling portion 25a is a protruding portion that protrudes from the end edge at one end of first insulator 21 in the circumferential direction of first electrode structure 121. In FIG. 13, first coupling portion 25a is a pin-shaped protruding portion. First coupling portion 25a may be a claw-shaped protruding portion.

First coupling-target portion 25b of second electrode structure 122 couples with first coupling portion 25a of first insulator 21 in first electrode structure 121. First coupling-target portion 25b is a recessed portion that recedes from the end edge at the other end of first insulator 21 in the circumferential direction of second electrode structure 122. In FIG. 13, when first coupling portion 25a is a pin-shaped protruding portion, first coupling-target portion 25b is a recessed portion in which the pin-shaped protruding portion is insertable. First coupling-target portion 25b may be a recessed portion including a hooking part on which the claw-shaped first coupling portion 25a can hook.

As illustrated in FIG. 12 and FIG. 13, second coupling portion 24a is formed on the other end of second insulator 22 of first electrode structure 121 although omitted in the figure, and formed on the other end of second insulator 22 of second electrode structure 122. Second coupling-target portion 24b is formed on one end of second insulator 22 of first electrode structure 121 and, although omitted in the figure, formed on one end of second insulator 22 of second electrode structure 122.

Second coupling portion 24a of second electrode structure 122 couples with second coupling-target portion 24b of second insulator 22 of first electrode structure 121. Second coupling portion 24a is a protruding portion that protrudes from the end edge at the other end of second insulator 22 in the circumferential direction of second electrode structure 122. In FIG. 13, second coupling portion 24a is a claw-shaped protruding portion. Second coupling portion 24a may be a pin-shaped protruding portion.

Second coupling-target portion 24b of first electrode structure 121 couples with second coupling portion 24a of second insulator 22 of second electrode structure 122. Second coupling-target portion 24b is a recessed portion that recedes from the end edge at one end of second insulator 22 in the circumferential direction of first electrode structure 121. In FIG. 12, Second coupling-target portion 24b may be a recessed portion including hooking part 24b1 on which the claw-shaped second coupling portion 24a can hook. When second coupling portion 24a is a pin-shaped protruding portion, second coupling-target portion 24b may be a recessed portion in which the pin-shaped protruding portion is insertable.

In this way, first coupling portion 25a that couples with first coupling-target portion 25b of second electrode structure 122 is formed on the end portion at one end of first insulator 21 of first electrode structure 121, and first coupling-target portion 25b that couples with first coupling portion 25a of another, adjacent electrode structure 20 is formed on the end portion at the other end of first insulator 21 of first electrode structure 121. Second coupling-target portion 24b that couples with second coupling portion 24a of second electrode structure 122 is formed on the end portion at one end of second insulator 22 of first electrode structure 121, and second coupling portion 24a that couples with second coupling-target portion 24b of another, adjacent electrode structure 20 is formed on the end portion at the other end of second insulator 22 of first electrode structure 121. With this, by coupling second coupling-target portion 24b of first electrode structure 121 to second coupling portion 24a of second electrode structure 122, and coupling first coupling portion 25a of first electrode structure 121 to first coupling-target portion 25b of second electrode structure 122, a plurality of coupled electrode structures 20 can be attached to core metal 11 along the circumferential direction of core metal 11.

In the present variation, first coupling portion 25a, second coupling portion 24a, first coupling-target portion 25b, and second coupling-target portion 24b may be provided on one or the other end of electrode structure 20.

Variation 3 of Embodiment 1

The present variation differs from the electrode structure and the steering wheel according to Embodiment 1 and Variations 1 and 2 of Embodiment 1 in that in a plurality of electrode structures 20, harnesses 8a and 8b may be individually electrically connected to a plurality of first electrodes 31 and a plurality of second electrodes 32, and harnesses 8a and 8b may be electrically collected to one first electrode 31 among a plurality of first electrodes 31 and one second electrode 32 among a plurality of second electrodes 32. In the present variation, configurations and functions that are the same as the electrode structure and the steering wheel according to Embodiment 1 and Variations 1 and 2 of Embodiment 1 share the same reference signs, and detailed description related to these configurations and functions will be omitted.

First, the means for connecting two adjacent electrodes will be described.

Figure 14A:
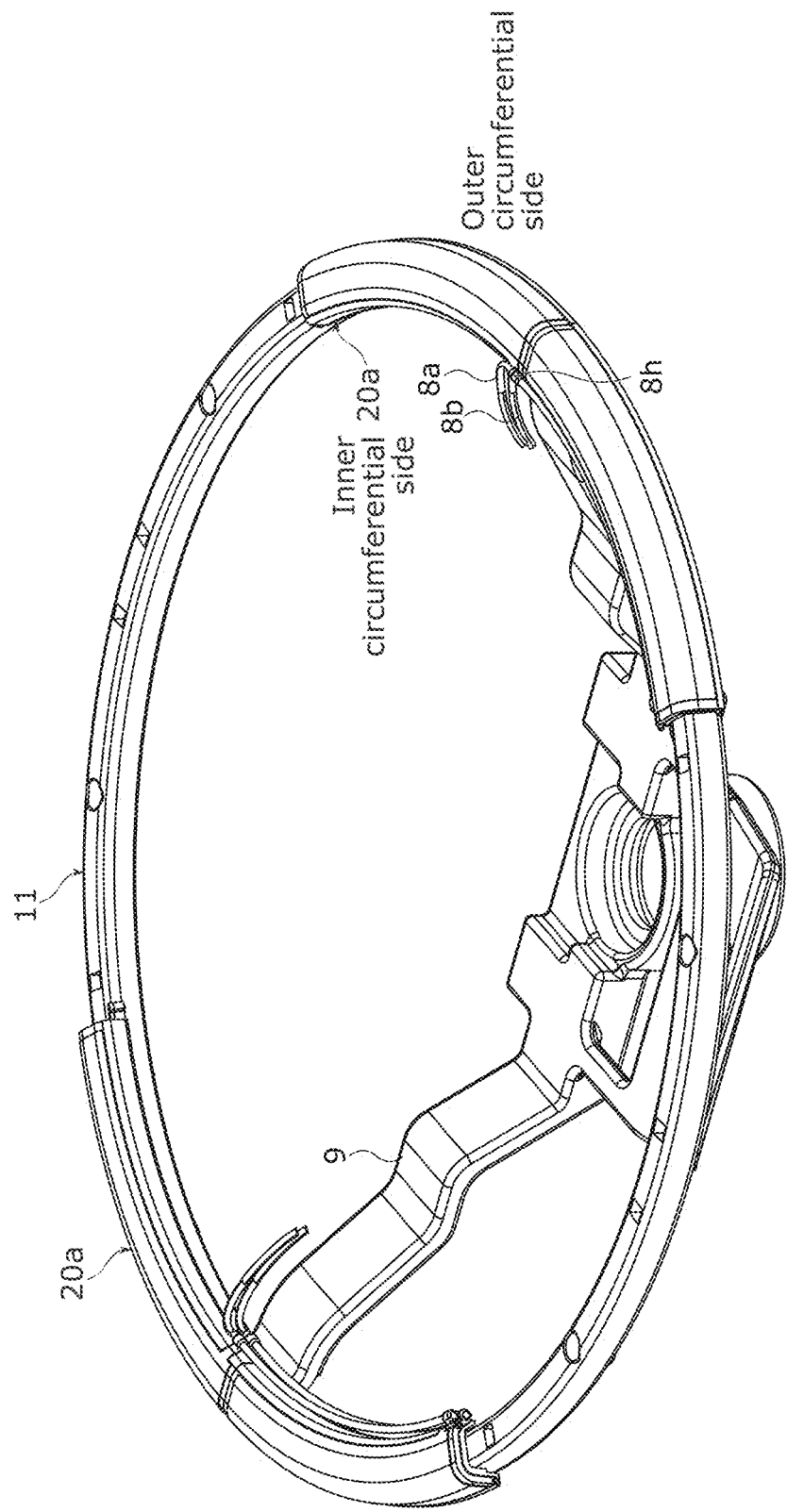
FIG. 14A is another perspective view of an electrode structure and a core metal according to Variation 3 of Embodiment 1.
Figure 14B:
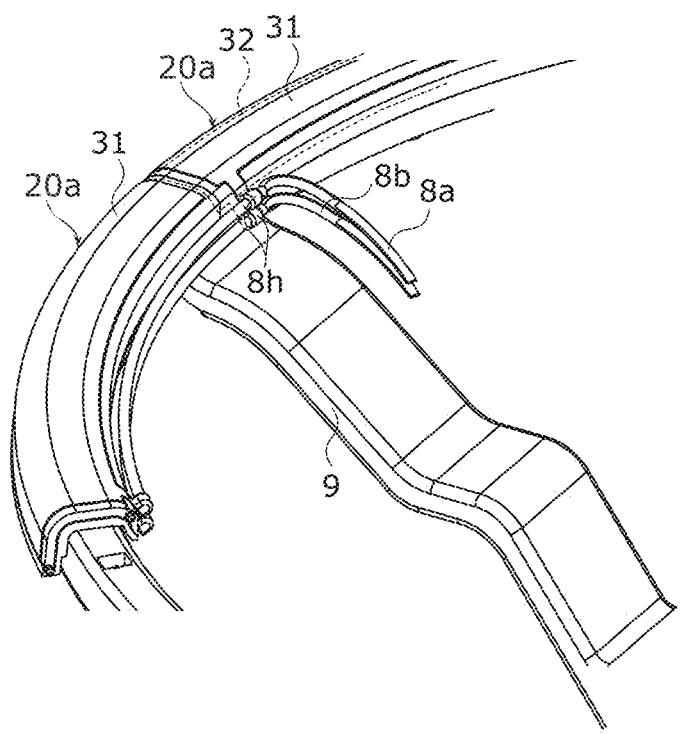
FIG. 14B is a partial enlarged perspective view of the electrical connection between harnesses and first and second electrodes according to Variation 3 of Embodiment 1.

FIG. 14A is another perspective view of electrode structure 20a and core metal 11 according to Variation 3 of Embodiment 1. FIG. 14B is a partial enlarged perspective view of the electrical connection between harnesses 8a and 8b and first and second electrodes 31 and 32 in FIG. 14A, according to Variation 3 of Embodiment 1.

In the present variation, as one example of the plurality of electrode structures 20a, two electrode structures 20a are arranged on each of the left and right sides.

When a plurality of electrode structures 20a are provided on core metal 11, harness 8a may be individually electrically connected to each of the plurality of first electrodes 31, and harness 8b may be individually electrically connected to each of the plurality of second electrodes 32. Harness 8a may be electrically connected to one first electrode 31 among the plurality of first electrodes 31 connected so as to electrically function as a single electrode, and harness 8b may be electrically connected to one second electrode 32 among the plurality of second electrodes 32 connected so as to electrically function as a single electrode.

As illustrated in FIG. 14A and FIG. 14B, harness 8a may be individually electrically connected to each of the plurality of first electrodes 31. Harness 8b may be individually electrically connected to each of the plurality of second electrodes 32. In other words, harness 8a may be electrically connected to each of the electrically independent plurality of first electrodes 31 via solder or crimping by rivet. In FIG. 14A and FIG. 14B, each of the plurality of first electrodes 31 and harness 8a are exemplified as electrically connected via solder 8h, and each of the plurality of second electrodes 32 and harness 8b are exemplified as electrically connected via solder 8h.

Harness 8b may be electrically connected to each of the electrically independent plurality of second electrodes 32 via solder or crimping by rivet.

Harnesses 8a and 8b are disposed along the circumferential direction of core metal 11 since the plurality of first electrodes 31 and the plurality of second electrodes 32 are aligned in the circumferential direction of core metal 11.

Figure 14D:
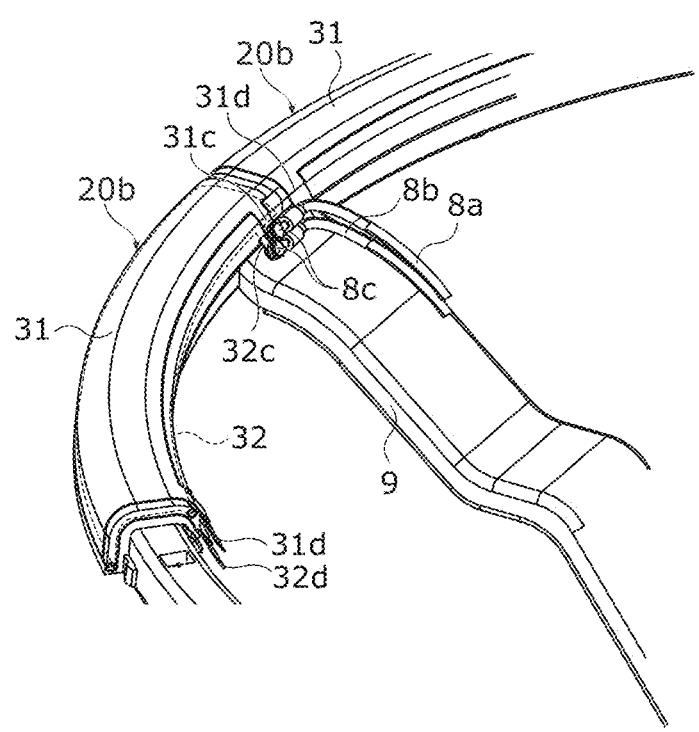
FIG. 14D is a partial enlarged perspective view of when harnesses and first and second electrodes are electrically connected by crimping with a rivet, according to Variation 3 of Embodiment 1.

FIG. 14C is another perspective view of electrode structure 20b and core metal 11 according to Variation 3 of Embodiment 1. FIG. 14D is a partial enlarged perspective view of when harnesses 8a and 8b and first and second electrodes 31 and 32 in FIG. 14C are electrically connected by crimping with rivet 8c, according to Variation 3 of Embodiment 1. FIG. 14C and FIG. 14D illustrate a configuration including two electrode structures 20b as one example of the plurality of electrode structures 20b.

As illustrated in FIG. 14C and FIG. 14D, each of the plurality of first electrodes 31 includes first connecting portions 31c and 31d for directly electrically connecting the plurality of first electrodes 31 together.

First connecting portion 31c is formed on one end in the circumferential direction of electrode structure 20b, and first connecting portion 31d is formed on the other end in the circumferential direction of electrode structure 20b. The plurality of first electrodes 31 may be electrically connected while arranged in a line along the circumferential direction of core metal 11 by overlapping first connecting portion 31c and first connecting portion 31d of two adjacent first electrodes 31 and fastening them with rivet 8c or the like. In such cases, harness 8a may be electrically connected to first connecting portion 31c via rivet 8c. In other words, harness 8a may be electrically connected to first connecting portions 31c and 31d at one location among the plurality of first electrodes 31 by being crimped via rivet 8c.

First connecting portion 31c and first connecting portion 31d are disposed protruding from first insulator 21, and second connecting portion 32c and second connecting portion 32d are disposed protruding from second insulator 22. First connecting portion 31c and first connecting portion 31d are spaced apart from second connecting portion 32c and second connecting portion 32d so as not to contact second connecting portion 32c and second connecting portion 32d.

Each of the plurality of second electrodes 32 includes second connecting portions 32c and 32d for directly electrically connecting the plurality of second electrodes 32 together. The plurality of second electrodes 32 may be electrically connected while arranged in a line along the circumferential direction of core metal 11 by overlapping second connecting portion 32c and second connecting portion 32d of two adjacent second electrodes 32 and fastening them with rivet 8c or the like. In such cases, harness 8b may be electrically connected to second connecting portions 32c and 32d via rivet 8c. In other words, harness 8b may be electrically connected to second connecting portions 32c and 32d at one location among the plurality of second electrodes 32 by being crimped via rivet 8c.

Variation 4 of Embodiment 1

The present variation differs from the electrode structure and the steering wheel according to Embodiment 1 and Variations 1 through 3 of Embodiment 1 in that in electrode structure 20e, first insulator 221 and second insulator 222 are partially provided in locations corresponding to first engagement-target portion 11c1 and second engagement-target portion 11c2. In the present variation, configurations and functions that are the same as the electrode structure and the steering wheel according to Embodiment 1 and Variations 1 through 3 of Embodiment 1 share the same reference signs, and detailed description related to these configurations and functions will be omitted.

Figures 15, 15A:
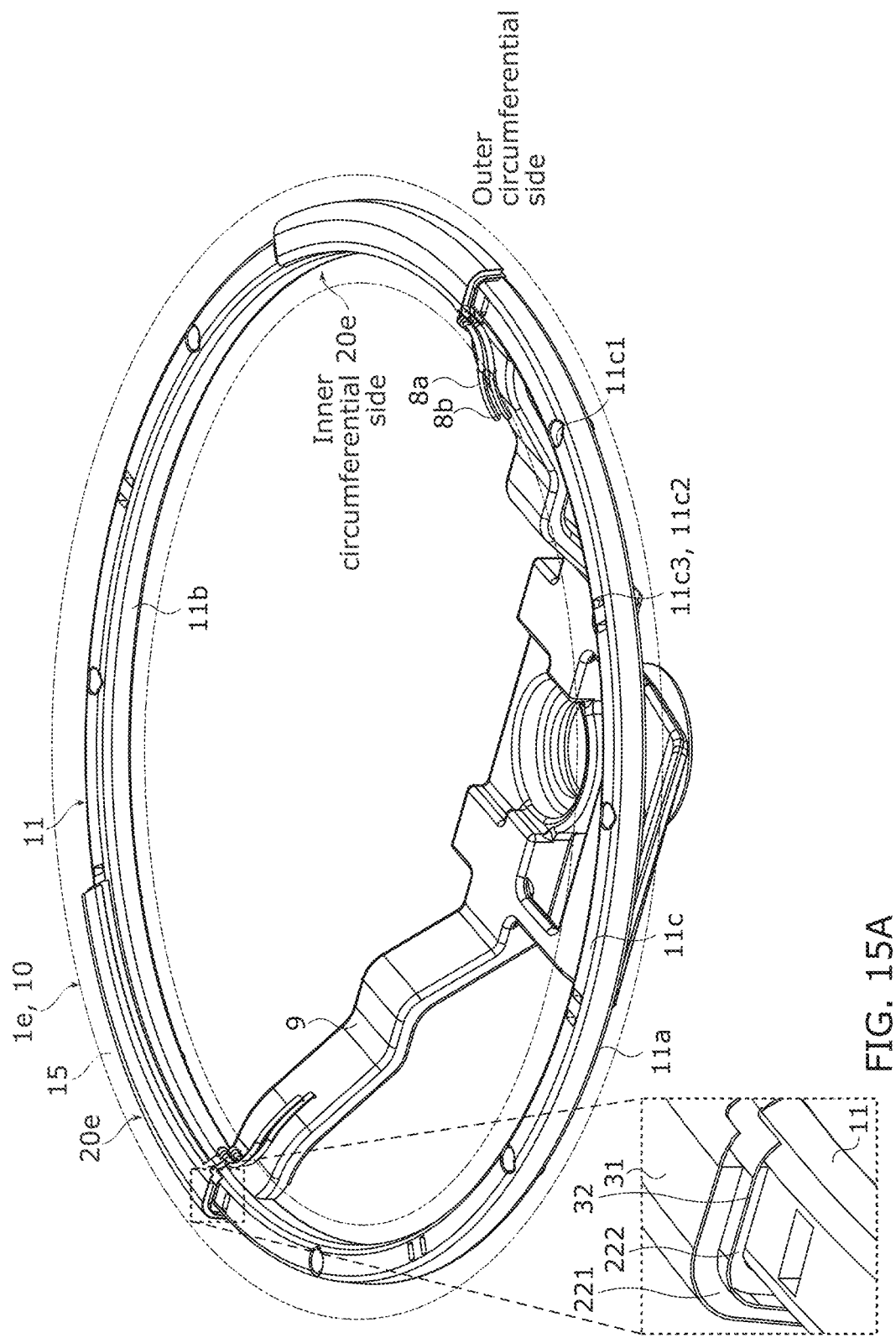
FIG. 15 is a perspective view of an electrode structure and a core metal according to Variation 4 of Embodiment 1.
FIG. 15A shows a a partial enlarged view of an electrode structure and a core metal according to Variation 4 of Embodiment 1.
Figure 16:
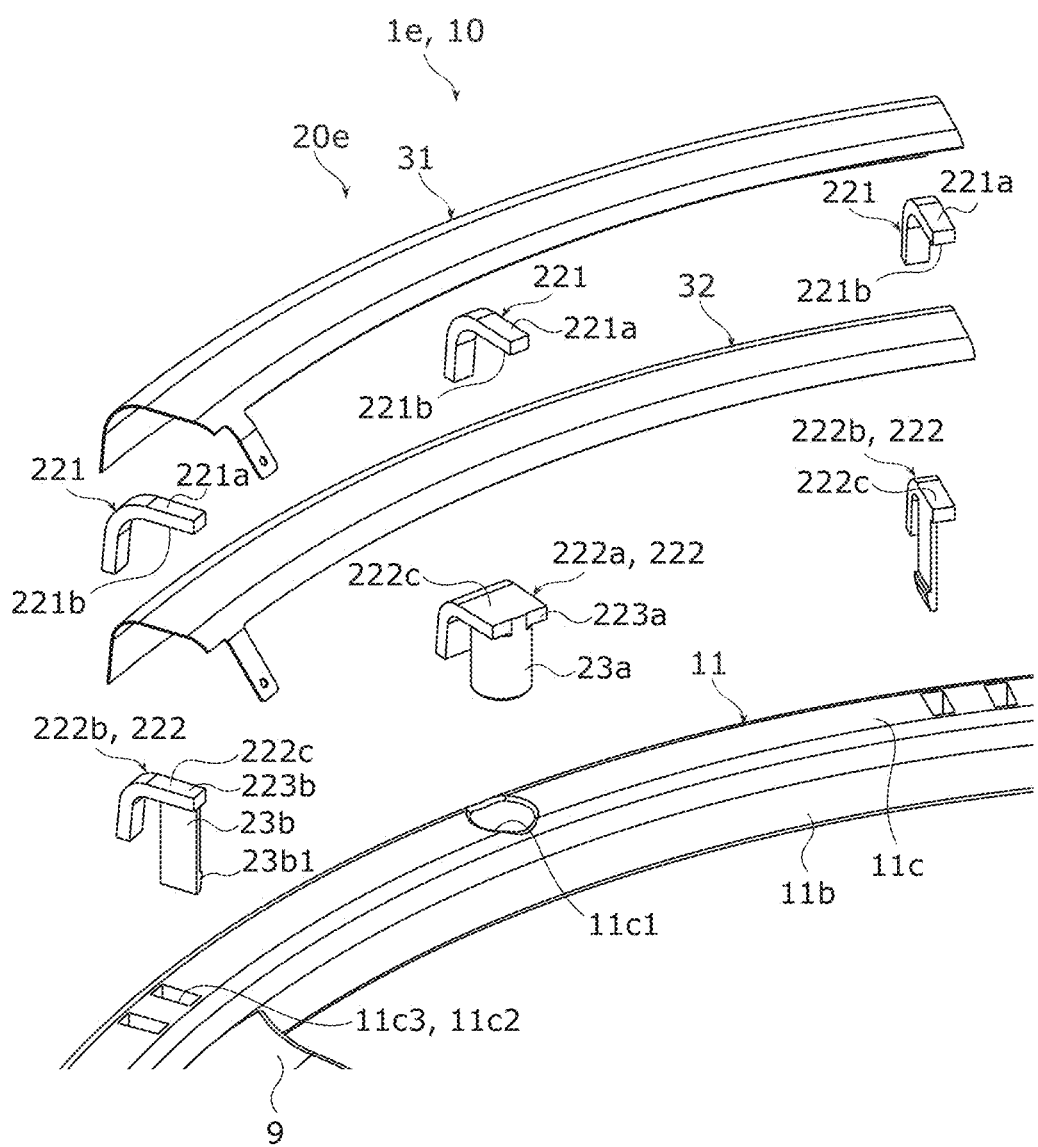
FIG. 16 is an exploded perspective view of an electrode structure according to Variation 4 of Embodiment 1.

FIG. 15 is a perspective view of electrode structure 20e and core metal 11 according to Variation 4 of Embodiment 1. FIG. 16 is an exploded perspective view of electrode structure 20e according to Variation 4 of Embodiment 1.

In the present variation, as illustrated in FIG. 15 and FIG. 16, first insulator 221 is disposed in parts of the region between first electrode 31 and second electrode 32. In other words, first insulator 221 is disposed at a plurality of locations scattered between first electrode 31 and second electrode 32, in the circumferential direction of core metal 11.

Although first insulators 221 are disposed scattered between first electrode 31 and second electrode 32, foam 15 is disposed in the gap between first electrode 31 and second electrode 32.

Second insulator 222 is disposed in parts of the region between second electrode 32 and core metal 11 of steering wheel 1e. In other words, second insulator 222 is disposed at a plurality of locations scattered between second electrode 32 and core metal 11 of steering wheel 1e, in the circumferential direction of core metal 11.

More specifically, one second insulator 222a includes spacer portion 223a disposed between second electrode 32 and core metal 11 of steering wheel 1e, and one first engagement portion 23a that extends from spacer portion 223a and is inserted in first engagement-target portion 11c1 of core metal 11. Another one second insulator 222b includes spacer portion 223b disposed between second electrode 32 and core metal 11 of steering wheel 1e, and one second engagement portion 23b that extends from spacer portion 223b and is inserted in insertion through-hole 11c3 of second engagement-target portion 11c2 of core metal 11. Spacer portion 223a of second insulator 222a and spacer portion 223b of second insulator 222b allow second electrode 32 to be arranged spaced apart from core metal 11 of steering wheel 1e.

Although second insulators 222 are disposed scattered between second electrode 32 and core metal 11 of steering wheel 1e, foam 15 is disposed in the gap between second electrode 32 and core metal 11.

Moreover, in the present variation, electrode structure 20e uses second insulators 222a and 222b, but electrode structure 20e may use at least one of second insulator 222a or second insulator 222b.

Second insulator 222a may be a different insulator spaced apart from second insulator 222b. In the present variation, second insulators 222a and 222b may be collectively referred to as second insulator 222.

First insulator 221 and second insulator 222 are disposed in mutually corresponding locations. More specifically, in a direction orthogonal to the circumferential direction of core metal 11, first insulator 221 and second insulator 222 are disposed inside steering wheel 1e so as to overlap one another while sandwiching second electrode 32.

Even when first insulator 221 and second insulator 222 are disposed scattered, first electrode 31 and second electrode 32 according to the present variation allow first electrode 31 and second electrode 32 to be arranged along the external shape of the cross section of core metal 11. In the present variation, first electrode 31 and second electrode 32, as well as second electrode 32 and core metal 11, can be arranged so as to overlap while approximately evenly spaced apart from one another.

Metal plates are used for first electrode 31 and second electrode 32. First electrode 31 and second electrode 32 are, for example, pressed into a curved shape. In other words, first electrode 31 and second electrode 32 have a curved shape in a cross section of steering wheel 1e taken in a plane perpendicular to the circumferential direction of steering wheel 1e. Since this ensures the rigidity of first electrode 31 and second electrode 32, even if a plurality of first insulators 221 are disposed spaced apart in the circumferential direction of core metal 11 and a plurality of second insulators 222 are disposed spaced apart in the circumferential direction of core metal 11, the postures of first electrode 31 and second electrode 32 can be maintained. First electrode 31 and second electrode 32 can be said to have a curved shape that curves along the annular shape of core metal 11. Since the cross section of steering wheel 1e is the same as in FIG. 3 described above, depiction has been omitted.

When assembling first insulator 221 between first electrode 31 and second electrode 32, first insulator 221 may be adhered to the surface of first electrode 31 that faces second electrode 32 and the surface of second electrode 32 that faces first electrode 31 with, for example, doubled-sided tape or an adhesive. When assembling second insulator 222 to second electrode 32, second insulator 222 may be adhered to the surface of second electrode 32 that faces core metal 11 with, for example, double-sided tape or an adhesive. Here, the electrodes may be adhered so that first insulator 221 and second insulator 222 overlap one another while sandwiching second electrode 32.

Harness 8a may be electrically connected to first electrode 31 by being soldered to first electrode 31. Harness 8a may be electrically connected to first electrode 31 by being crimped with a rivet to first electrode 31. Harness 8b may be electrically connected to second electrode 32 by being soldered to second electrode 32. Harness 8b may be electrically connected to second electrode 32 by being crimped with a rivet to second electrode 32.

In electrode structure 20e according to the present variation, first electrode 31 and second electrode 32 have a curved shape in a cross section of steering wheel 1e taken in a plane perpendicular to the circumferential direction of steering wheel 1e.

This ensures the rigidity of first electrode 31 and second electrode 32 since first electrode 31 and second electrode 32 are curved. Accordingly, even in locations in which first insulator 221 and second insulator 222 are not disposed, it is possible to inhibit first electrode 31 and second electrode 32 from deforming and changing the positional relationship between first electrode 31 and second electrode 32.

Electrode structure 20e includes a plurality of first insulators 221. The plurality of first insulators 221 are disposed spaced apart in the circumferential direction of steering wheel 1e, between one first electrode 31 and one second electrode 32. Electrode structure 20e includes a plurality of second insulators 222. The plurality of second insulators 222 are disposed spaced apart in the circumferential direction of steering wheel 1e, between one second electrode 32 core metal 11.

This allows for a smaller first insulator 221 to be used compared to when an elongated first insulator is disposed between one first electrode and one second electrode. This also allows for a smaller second insulator 222 to be used compared to when an elongated second insulator is disposed between one second electrode and the core metal. Consequently, the size of electrode structure 20e can be reduced and the manufacturing cost of electrode structure 20e can be inhibited from increasing.

Even when, between first electrode 31 and second electrode 32, foam 15 is filled between second electrode 32 and core metal 11, electrode structure 20e can be made lighter compared to when an elongated first insulator and an elongated second insulator are used.

For example, when first electrode and second electrode are metal plates, compared to when an elongated first insulator is disposed between one first electrode and one second electrode, there is a greater margin for precision in the manufacturing of first electrode 31 in regard to arranging first electrode 31 on first surface 221a of first insulator 221.

Moreover, compared to when an elongated second insulator is disposed between one second electrode and the core metal, there is a greater margin for precision in the manufacturing of second electrode 32 in regard to arranging second electrode 32 on second surface 221b of first insulator 221 or arranging second electrode 32 on third surface 222c of second insulator 222, which is the surface opposite the surface of second insulator 222 relative to the surface that faces core metal 11. This makes it possible to inhibit an increase in manufacturing cost.

In electrode structure 20e, each of the plurality of second insulators 222 includes an engagement portion (first engagement portion 23a and/or second engagement portion 23b).

This allows for a smaller second insulator 222 to be used compared to when an elongated second insulator is disposed between one second electrode and the core metal, and electrode structure 20e can be attached to core metal 11.

Electrode structure 20c, steering wheel 1c, and the method for manufacturing steering wheel 1c according to Embodiment 1 be configured as illustrated in FIG. 17A and FIG. 17B. FIG. 17A is a perspective view of when first electrode 31a and harness 8a are electrically connected by being crimped together with rivet 8c, when one first electrode 31a is provided for a plurality of first insulators 21 in other variations. FIG. 17B is a perspective view of when first electrode 31a and harness 8a are electrically connected by solder 8h, when one first electrode 31a is provided for a plurality of first insulators 21 in other variations. As illustrated in FIG. 17A and FIG. 17B, among two adjacent electrode structures 20c, the first electrode disposed on one electrode structure 20c and the first electrode disposed on the other electrode structure 20c may be provided as a unitary first electrode 31a. Although a second electrode is not illustrated in FIG. 17A or FIG. 17B, among two adjacent electrode structures 20c, the second electrode disposed on one electrode structure 20c and the second electrode disposed on the other electrode structure 20c may be provided as a unitary second electrode. In such cases, first electrode 31a is provided with first connecting portion 31c and the second electrode is provided with second connecting portion 32c. In this way, first electrode 31a is formed to have a length equivalent to the length of two first insulators 21 in the circumferential direction of steering wheel 1c, and the second electrode is formed to have a length equivalent to the length of two second insulators 22 in the circumferential direction of steering wheel 1c. In such cases, the size of the area that electrode structure 20c covers core metal 11 can be increased and decreased by coupling and uncoupling similar shapes of first insulator 21 and second insulator 22. By forming first electrode 31a and the second electrode according to the length of first insulator 21 and second insulator 22 in the circumferential direction of steering wheel 1c, there is no need to electrically connect first electrode 31a between two adjacent first insulators 21 or electrically connect the second electrode between two adjacent second insulators 22. This configuration is more user friendly because it increases the area where the driver's hand gripping steering wheel 1c is detected.

In electrode structure 20d, steering wheel 1d, and the method for manufacturing steering wheel 1d according to Embodiment 1, FIG. 17C is a perspective view of steering wheel 1d according to another variation. Compared to FIG. 2A, FIG. 8, FIG. 11, FIG. 14A, FIG. 14C, FIG. 15, FIG. 17A, and FIG. 17B, with core metal 111 illustrated in FIG. 17C, core metal 111 may be inverted so that core metal 111 has plane symmetry with respect to the plane of the opening on the inner circumferential side of core metal 111, and the position at which electrode structure 20d is attached to core metal 111 may also inverted. In other words, core metal 111 may be fixed to spoke 9 such that the opening of recessed portion 10a of core metal 111 in FIG. 17C faces the driver's seat. Moreover, electrode structure 20d may be attached to the side of core metal 111 that faces toward the front of vehicle 3 so as to cover recessed portion 10a of core metal 111.

Embodiment 2

<Configuration: Steering Wheel 201>

The present embodiment differs from the electrode structure and the steering wheel according to Embodiment 1 in that, for example, electrode structure 220 and the insulator of steering wheel 201 include extension portion 26. In the present embodiment, configurations and functions that are the same as the electrode structure and the steering wheel according to Embodiment 1 share the same reference signs, and detailed description related to these configurations and functions will be omitted. Moreover, in the present embodiment, configurations that are the same as in Embodiment 1 will be described with reference to the figures used for Embodiment 1.

FIG. 18A includes a perspective view of steering wheel 201 according to Embodiment 2, FIG. 18A2 shows a partial enlarged view of electrode structure 220 according to Embodiment 2, and FIG. 18A1 shows a cross-sectional view of core metal 211 taken at the dotted and dashed line in FIG. 18A.

As illustrated in FIG. 18A, steering wheel 201 imparts a steering angle to, for example, the steering of vehicle 3.

Steering wheel 201 includes rim 10. Rim 10 is integrally formed with T-shaped spoke 9 disposed on the inner circumferential surface of rim 10.

Rim 10 includes core metal 211, electrode structure 220, and foam 15 that covers electrode structure 220.

[Core Metal 211]

Figure 18B:
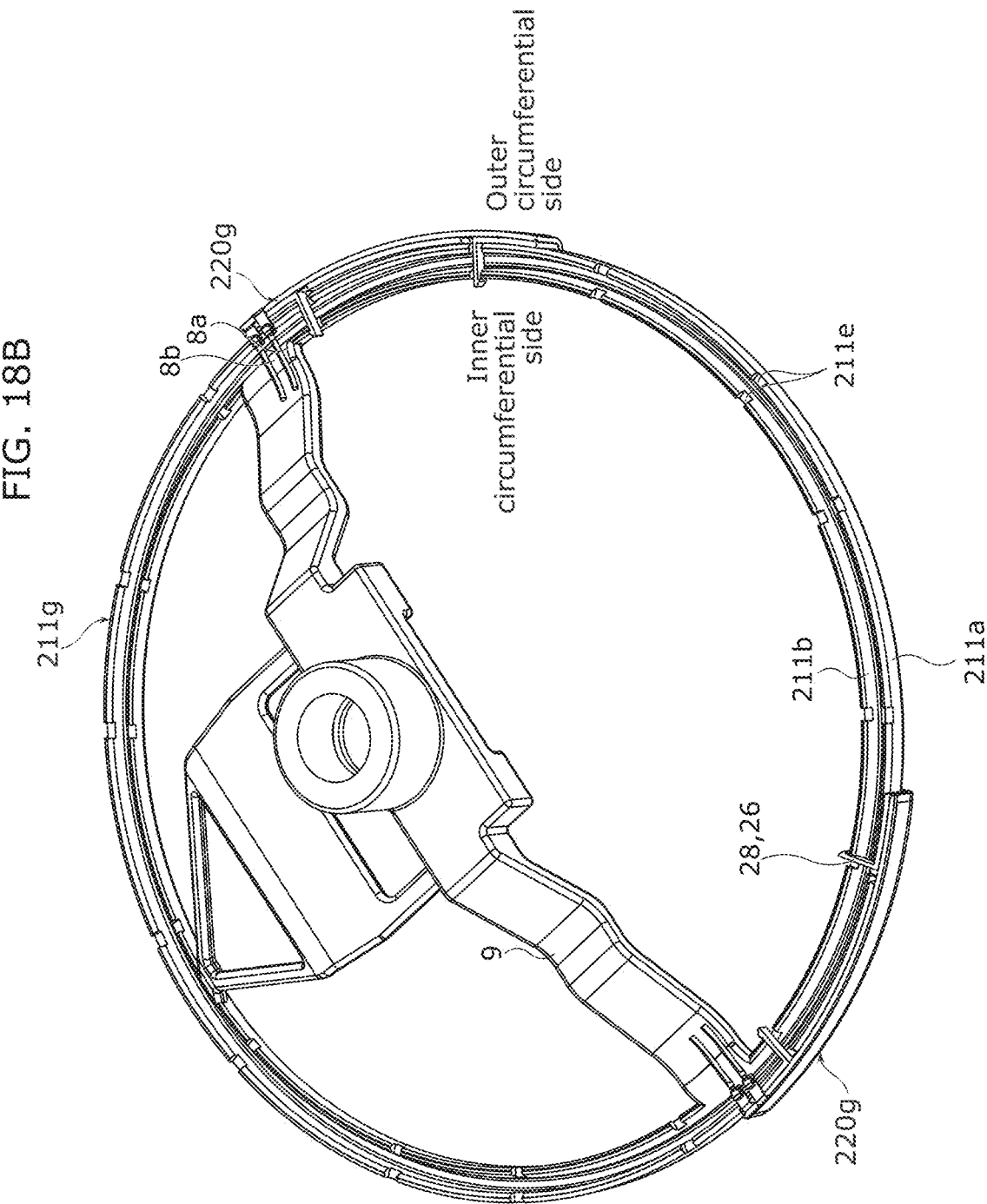
FIG. 18B is a perspective view of an electrode structure that does not include a first extension portion, and a core metal that does not include a first engagement-target portion.
Figure 19A:
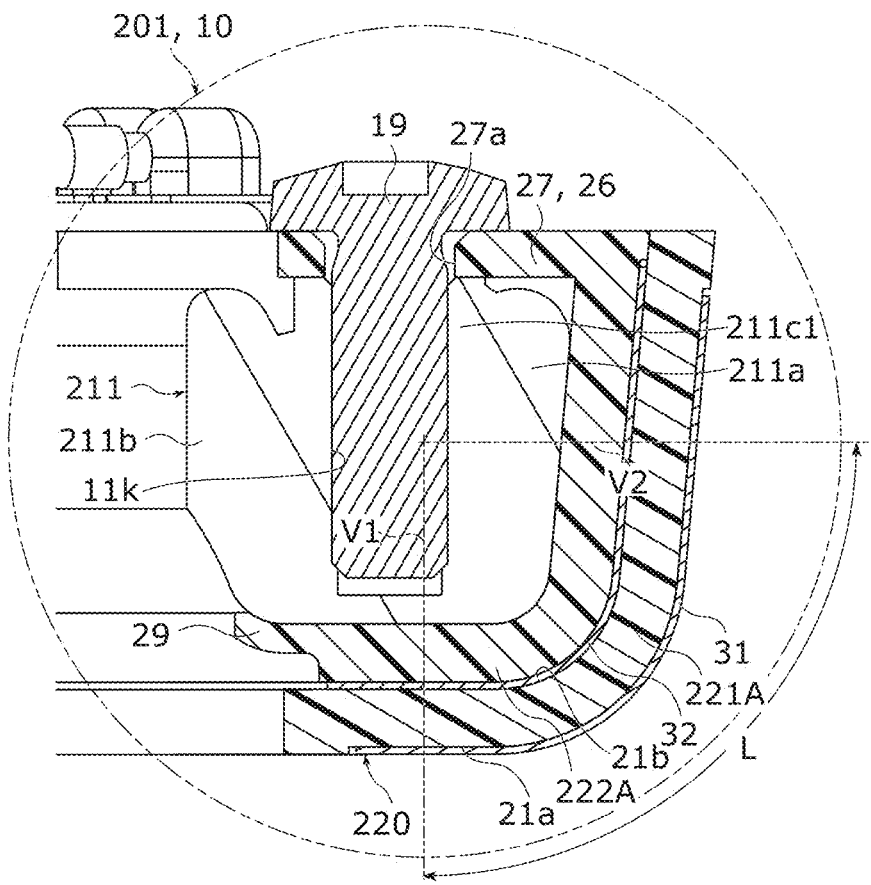
FIG. 19A is a cross-sectional view of a steering wheel taken at line E-E in FIG. 18A.

FIG. 19A is a cross-sectional view of steering wheel 201 taken at line E-E in FIG. 18A.

As illustrated in FIG. 18A and FIG. 19A, core metal 211 is a metal annular core. More specifically, core metal 211 includes annular first portion 211a, annular second portion 211b arranged on the inner circumferential side of first portion 211a, and curved portion 11c that is curved and couples first portion 211a and second portion 211b. One end edge of first portion 211a is coupled to one end edge of curved portion 11c, and one end edge of second portion 211b is coupled to the other end edge of curved portion 11c. Stated differently, in a cross section of core metal 211 taken in a plane perpendicular to the circumferential direction of core metal 211 (hereinafter also referred to as the cross section of core metal 211), curved portion 11c is disposed between first portion 211a and second portion 211b. A cross section of core metal 211 taken in this manner is, for example, U-shaped, V-shaped, J-shaped, or C-shaped. In FIG. 18A, core metal 211 is exemplified as having a U-shaped cross section. In the present embodiment, in a cross section of core metal 211, first portion 211a and second portion 211b are in the shape of a straight line.

Since core metal 211 has, for example, a U-shaped, V-shaped, J-shaped, or C-shaped cross section, first portion 211a, second portion 211b, and curved portion 11c form recessed portion 10a in core metal 211. Recessed portion 10a is formed in an annular shape. In the present embodiment, the opening of recessed portion 10a is formed in rim 10 so as to open toward the front of vehicle 3 (formed so as to open on the side of rim 10 opposite the side that faces the seats).

Engagement-target portion 211e is formed on first portion 211a and second portion 211b. Engagement-target portion 211e engages a claw portion of extension portion 26 on electrode structure 220, which will be described later. A plurality of engagement-target portions 211e are formed on first portion 211a and second portion 211b. The plurality of engagement-target portions 211e are formed at equal intervals on first portion 211a and second portion 211b.

Engagement-target portion 211e may be a through-hole formed in first portion 211a and second portion 211b, and may be a notch in a part of first portion 211a and second portion 211b. First portion 211a may be formed shorter than second portion 211b around the entire circumference of core metal 211. In such cases, core metal 211 may have a J-shaped cross section.

Figure 19B:
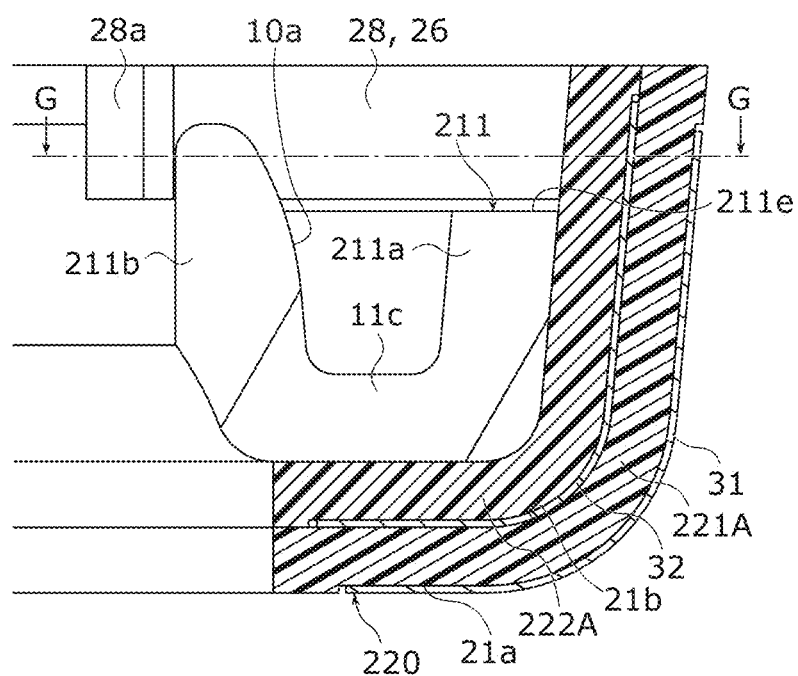
FIG. 19B is a cross-sectional view of an electrode structure and a core metal taken at line F-F in FIG. 18A.

FIG. 19B is a cross-sectional view of electrode structure 220 and core metal 211 taken at line F-F in FIG. 18A.

As illustrated in FIG. 19B, in a cross section of steering wheel 201 taken in a plane perpendicular to the circumferential direction of steering wheel 201 (hereinafter also referred to as the cross section of steering wheel 201), first portion 211a has a portion that is formed shorter than second portion 211b. In other words, in the portion of core metal 211 where first extension portion 27, which will be described later, is inserted through engagement-target portion 211e of first portion 211a and engagement-target portion 211e of second portion 211b, first portion 211a is formed shorter than second portion 211b. When first portion 211a is formed shorter than second portion 211b, second extension portion 28 is easier to insert through engagement-target portion 211e of core metal 211.

First engagement-target portion 211c1 is formed in recessed portion 10a.

First engagement-target portion 211c1 is formed on a rear surface of curved portion 11c, which is on the recessed portion 10a side, and is a cylindrical or round tubular projection that stands upright from the rear surface. Fastener hole 11k in which fastener 19, such as a screw, is insertable is formed on the inside of first engagement-target portion 211c1.

Core metal 211 according to the present embodiment is exemplified as, but not limited to, including first engagement-target portion 211c1 and engagement-target portion 211e. FIG. 18B is a perspective view of electrode structure 220g that does not include a first extension portion, and core metal 211g that does not include a first engagement-target portion. For example, as illustrated in FIG. 18B, core metal 211g may include engagement-target portion 211e without including a first engagement-target portion. In such cases, although not illustrated, electrode structure 220g may include second extension portion 28 without including a first extension portion. Moreover, core metal 211g may include first engagement-target portion 211c1 without including an engagement-target portion. In such cases, electrode structure 220g may include first extension portion 27 without including a second extension portion.

[Electrode Structure 220]

As illustrated in FIG. 1 and FIG. 18A, electrode structure 220 is used in a device that detects the driver's hand gripping steering wheel 201. More specifically, to facilitate detection of the driver's grip on steering wheel 201, electrode structure 220 is disposed on the outer circumference of core metal 211 of steering wheel 201 provided in vehicle 3. More specifically, electrode structure 220 is provided on core metal 211 so as to cover a range extending from first portion 211a of core metal 211 to curved portion 11c.

Control circuit 40, which is capable of detecting the driver's hand gripping steering wheel 201, is connected to electrode structure 220. When rim 10 is gripped by the driver's hand, the capacitance between the electrode of electrode structure 220 and the hand changes. Control circuit 40 detects the grip from the electrode of electrode structure 220 based on an output signal in which the capacitance has changed. More specifically, control circuit 40 measures the capacitance of the electrode or a value (amount of change) corresponding to the capacitance, and detects the driver's hand gripping rim 10 based on the value. Such control circuit 40 is configured by a dedicated circuit or a general-purpose processor. Control circuit 40 is embedded in spoke 9 of FIG. 1, for example.

Electrode structure 220 is disposed in steering wheel 201 provided in vehicle 3. In the present embodiment, electrode structure 220 is embedded in rim 10 of steering wheel 201. In FIG. 1 for example, electrode structure 220 is exemplified as being provided on both the left and right sides of rim 10. In FIG. 1 for example, a pair of electrode structures 220 are exemplified as being provided on a portion of rim 10, but this example is non-limiting. For example, three or more electrode structures 220 may be provided on rim 10, and, alternatively, one electrode structure 220 may be provided on rim 10.

More specifically, as illustrated in FIG. 18A, electrode structure 220 includes first insulator 221A, second insulator 222A, first electrode 31, and second electrode 32.

First insulator 221A is arranged along the outer circumferential side surface of core metal 211, and is spaced apart from the surface of core metal 211. Here, the outer circumferential side surface of core metal 211 is, in a view of the whole annular core metal 211, the surface on the opposite side of core metal 211 relative to the inner circumferential side surface of core metal 211 on which spoke 9 is disposed.

First insulator 221A includes first surface 21a and second surface 21b on opposite sides. Second surface 21b is the surface facing core metal 211. First electrode 31 is disposed on first surface 21a, and second electrode 32 is disposed on second surface 21b. Stated differently, first insulator 221A is sandwiched between first electrode 31 and second electrode 32. First insulator 221A can thus arrange first electrode 31 and second electrode 32 so as to be spaced apart from one another and to overlap one another. In other words, first insulator 221A can arrange first electrode 31 and second electrode 32 so that first electrode 31 and second electrode 32 are not electrically connected.

First insulator 221A is made of a resin material such as a hard plastic such as polycarbonate, polybutylene terephthalate, or the like.

First insulator 221A has a certain thickness. A "certain thickness" means, for example, that first insulator 221A has a thickness of approximately a few millimeters. Since first insulator 221A has a certain thickness, first insulator 221A is rigid.

First insulator 221A and second electrode 32 are supported by second insulator 222A and are disposed spaced apart from core metal 211 by a predetermined distance. Stated differently, second electrode 32, which is disposed on first insulator 221A, is disposed spaced apart from core metal 211 by a predetermined distance by second insulator 222A. In other words, second insulator 222A is disposed between first insulator 221A and second electrode 32 on one side and core metal 211 on the other.

Second insulator 222A is disposed between second electrode 32 and core metal 211, overlaps with first insulator 221A, first electrode 31, and second electrode 32, and is covered by first insulator 221A, first electrode 31 and second electrode 32. Second insulator 222A is disposed along the surface on the outer circumferential side of core metal 211, in contact with the surface on the outer circumferential side of core metal 211. In other words, second insulator 222A can arrange second electrode 32 so that second electrode 32 and core metal 211 are not electrically connected. First insulator 221A and/or second insulator 222A are collectively referred to as the insulator, stated differently, first insulator 221A and/or second insulator 222A are included in the insulator.

Second insulator 222A includes one or more extension portions 26.

Figure 20:
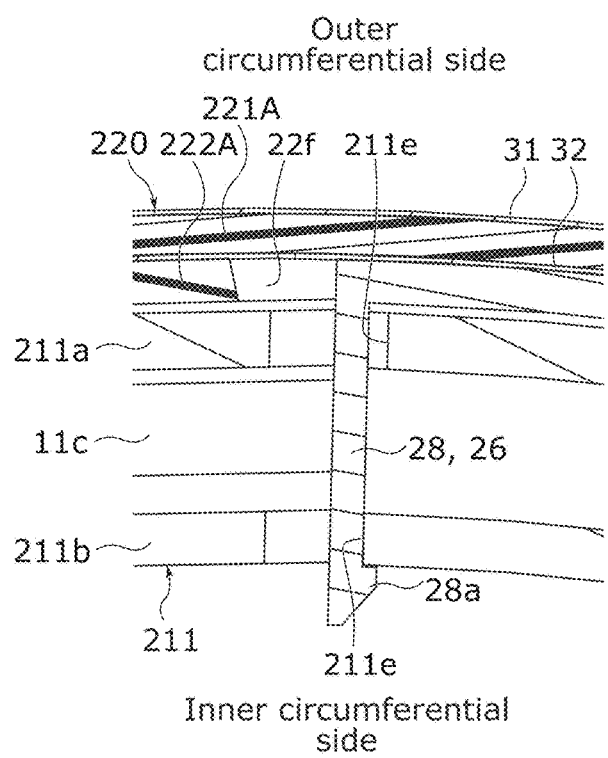
FIG. 20 is a cross-sectional view of an electrode structure and a core metal taken at line G-G in FIG. 19B.

FIG. 20 is a cross-sectional view of electrode structure 220 and core metal 211 taken at line G-G in FIG. 19B.

As illustrated in FIG. 18A, FIG. 19A, FIG. 19B, and FIG. 20, extension portion 26 extends in a direction that closes the opening of core metal 211, in a cross section of steering wheel 201. In a cross section of steering wheel 201, extension portion 26 is formed at one end of second insulator 222A and is connected to core metal 211.

More specifically, extension portion 26 extends from second insulator 222A so as to close the opening of core metal 211, and covers part of the opening of core metal 211. Stated differently, in a cross section of steering wheel 201 in a plane perpendicular to the circumferential direction of steering wheel 201, extension portion 26 extends from one end of second insulator 222A toward second portion 211b so as to extend in a direction perpendicular to the lengthwise direction of first portion 211a. In other words, extension portion 26 is orthogonal to the circumferential direction of core metal 211 and extends from the first portion 211a side of core metal 211 to the second portion 211b side of core metal 211 on second insulator 222A.

Extension portion 26 includes first extension portion 27 and second extension portion 28. Extension portion 26 may include only one of first extension portion 27 or second extension portion 28. In other words, only one of first extension portion 27 or second extension portion 28 may be provided on second insulator 222A.

As illustrated in FIG. 18A and FIG. 19A, first extension portion 27 is plate-shaped. Insertion through-hole 27a is formed in first extension portion 27.

In a cross section of steering wheel 201 in a plane perpendicular to the circumferential direction of steering wheel 201, insertion through-hole 27a is formed in a position that is coaxial with fastener hole 11k in first engagement-target portion 211c1 of core metal 211. In other words, insertion through-hole 27a is formed in a position corresponding to fastener hole 11k of first engagement-target portion 211c1. Accordingly, fastener 19, such as a screw, is inserted in insertion through-hole 27a and fastener hole 11k in first engagement-target portion 211c1 of core metal 211. In other words, fastener 19 can fasten with fastener hole 11k while inserted through insertion through-hole 27a. This fixes first extension portion 27 to first engagement-target portion 211c1.

As illustrated in FIG. 18A, FIG. 19B, and FIG. 20, second extension portion 28 is rod-shaped. Claw portion 28a that engages engagement-target portion 211e provided on second portion 211b of core metal 211 is formed on the leading end of second extension portion 28.

In a cross section of steering wheel 201, claw portion 28a extends from one end of second insulator 222A toward second portion 211b so as to engage engagement-target portion 211e formed in second portion 211b. More specifically, second extension portion 28 passes through engagement-target portion 211e formed in first portion 211a, and passes through engagement-target portion 211e formed in second portion 211b. Claw portion 28a of second extension portion 28 engages engagement-target portion 211e formed in second portion 211b. In other words, claw portion 28a engages second portion 211b while straddling first portion 211a, which causes the claw portion of claw portion 28a to hook onto engagement-target portion 211e of second portion 211b.

As illustrated in FIG. 19A, second insulator 222A includes engagement support portion 29 that engages core metal 211. Engagement support portion 29 extends along the surface of core metal 211 in a cross section of steering wheel 201. Engagement support portion 29 is formed on the other end of second insulator 222A at which extension portion 26 is not formed. Engagement support portion 29 is formed in a position that corresponds to extension portion 26, and is arranged so as to sandwich core metal 211 with extension portion 26. A claw-shaped connector may be formed on engagement support portion 29. In such cases, a recessed portion that engages the claw-shaped connector may be formed in core metal 211. Engagement support portion 29 may be one example of the engagement claw.

Figure 21:
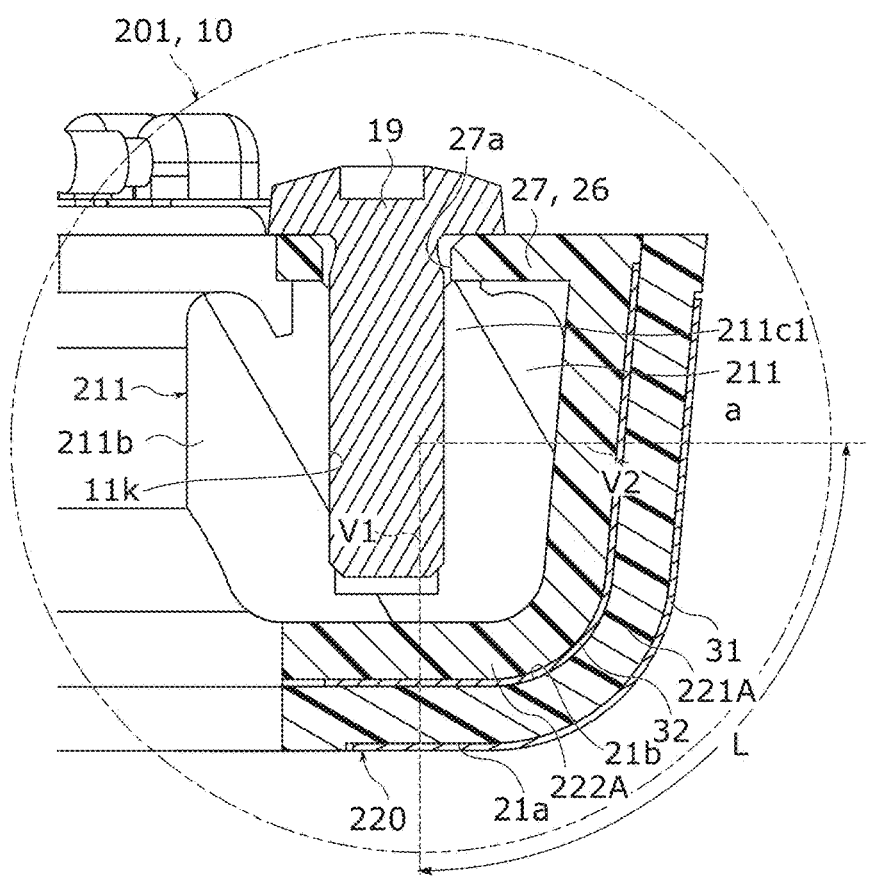
FIG. 21 is a cross-sectional view illustrating an electrode structure and a core metal in which a second insulator of a steering wheel does not include an engagement support portion, in FIG. 19A.

As illustrated in FIG. 21, second insulator 222A of electrode structure 220 need not include engagement support portion 29. FIG. 21 is a cross-sectional view illustrating electrode structure 220 and core metal 211 in which second insulator 222A of steering wheel 201 does not include engagement support portion 29, in FIG. 19A.

Second insulator 222A is made of a resin material such as a hard plastic such as polycarbonate, polybutylene terephthalate, or the like.

Second insulator 222A has a certain thickness. A "certain thickness" means, for example, that second insulator 222A has a thickness of approximately a few millimeters. Since second insulator 222A has a certain thickness, second insulator 222A is rigid.

As illustrated in FIG. 18A2, first insulator 221A includes first positioning portion 21t, and second insulator 222A includes second positioning portion 22t. First positioning portion 21t is formed at the corner portions of both end portions of first insulator 221A that extends in the circumferential direction of core metal 211. Second positioning portion 22t is formed at the corner portions of both end portions of second insulator 222A that extends in the circumferential direction of core metal 211. In the present embodiment, first positioning portion 21t is exemplified as a recessed portion that interlocks with second positioning portion 22t, but first positioning portion 21t may be a protruding portion that interlocks with second positioning portion 22t. Second positioning portion 22t is exemplified as a protruding portion that interlocks with first positioning portion 21t, but second positioning portion 22t may be a recessed portion that interlocks with first positioning portion 21t. When assembling first insulator 221A to second insulator 222A while sandwiching second electrode 32 between first insulator 221A and second insulator 222A, first positioning portion 21t is interlocked with second positioning portion 22t. Since this positions first insulator 221A and second insulator 222A, misalignment of first insulator 221A and second insulator 222A in the circumferential direction can be inhibited, making it possible to easily and properly assemble first insulator 221A and second insulator 222A.

Although first positioning portion 21t is exemplified as being formed at corner portions of first insulator 221A, first positioning portion 21t may be formed at any location. Moreover, a plurality of first positioning portions 21t may be formed in first insulator 221A. Although second positioning portion 22t is exemplified as being formed at corner portions of second insulator 222A, second positioning portion 22t may be formed at any location. Moreover, a plurality of second positioning portions 22t may be formed in second insulator 222A. For example, first positioning portions 21t may be formed at the four corner portions at both end portions of first insulator 221A, and second positioning portions 22t may be formed at the four corner portions at both ends of second insulator 222A.

First electrode 31, second electrode 32, first insulator 221A, and second insulator 222A may be integrally formed, and, alternatively, may be formed as individual separable elements.

As illustrated in FIG. 18A and FIG. 19A, first electrode 31 includes metal plating, a metal sheet, or a metal plate. When first electrode 31 is a metal sheet or a metal plate, the metal sheet or the metal plate is attached to first surface 21a of first insulator 221A by an adhesive or the like. First electrode 31 is, for example, a metal containing copper or aluminum or the like.

First electrode 31 is disposed on first surface 21a of first insulator 221A. First surface 21a is the surface on the opposite side of first insulator 221A relative to the surface of first insulator 221A that faces core metal 211 of steering wheel 201. Here, the surface of first insulator 221A that faces core metal 211 is second surface 21b, which faces core metal 211 with second insulator 222A and second electrode 32 disposed therebetween. In other words, first electrode 31 is disposed spaced apart from core metal 211 and second electrode 32.

As illustrated in FIG. 6 of Embodiment 1, in the present embodiment as well, an AC voltage is applied to first electrode 31. The AC voltage applied to first electrode 31 is generated in control circuit 40 by power supplied from power supply 41 illustrated in FIG. 6 of Embodiment 1. Here, since first electrode 31 is disposed on first surface 21a of first insulator 221A, when the part of rim 10 where first electrode 31 is disposed is gripped by the driver's hand, a capacitance is formed between first electrode 31 and the driver's hand. Control circuit 40 can therefore detect the driver's hand gripping rim 10 based on the change in capacitance.

First electrode 31 and second electrode 32 are electrically connected to harnesses 8a and 8b.

As illustrated in FIG. 18A, harness 8a is electrically connected to each first electrode 31 of electrode structure 220. Harness 8a may be electrically connected to first electrode 31 by being soldered to first electrode 31. Harness 8a may be electrically connected to first electrode 31 by being crimped with a rivet to first electrode 31.

Harness 8b is electrically connected to each second electrode 32 of electrode structure 220. Harness 8b may be electrically connected to second electrode 32 by being soldered to second electrode 32. Harness 8b may be electrically connected to second electrode 32 by being crimped with a rivet to second electrode 32.

Here, as illustrated in FIG. 6 of Embodiment 1, in the present embodiment as well, control circuit 40 can apply AC voltage to first electrode 31 and second electrode 32 via harnesses 8a and 8b.

The capacitance between first electrode 31 and core metal 211 can be canceled out or reduced by applying an AC voltage having the same phase to first electrode 31 and second electrode 32. Accordingly, control circuit 40 can accurately detect the capacitance formed between first electrode 31 and the driver's hand.

Second electrode 32 includes metal plating, a metal sheet, or a metal plate. When second electrode 32 is a metal sheet or a metal plate, the metal sheet or the metal plate is attached to second surface 21b of first insulator 221A by an adhesive or the like. Second electrode 32 is, for example, a metal containing copper or aluminum or the like.

When first electrode 31 and second electrode 32 are formed using metal plating, as illustrated in FIG. 20, since hole 22f is formed in the base of second extension portion 28 in second insulator 222A, hole 22f of second insulator 222A may be masked and the area of first surface 21a of first insulator 221A corresponding to hole 22f may be masked as well. With this, except for hole 22f, second electrode 32 can be formed on the surface of second insulator 222A on the first insulator 221A side, and except for the area corresponding to hole 22f, first electrode 31 can be formed on first surface 21a of first insulator 221A. Stated differently, second electrode 32 is not formed on hole 22f of second insulator 222A, and first electrode 31 is not formed on the area of first surface 21a of first insulator 221A that corresponds to hole 22f. As another method, first electrode 31 may be formed by metal plating first surface 21a of first insulator 221A, and second electrode 32 may be formed by metal plating second surface 21b of first insulator 221A.

Second electrode 32 is disposed on second surface 21b of first insulator 221A. Second surface 21b is on the opposite side of first insulator 221A relative to first surface 21a. More specifically, second electrode 32 is disposed along second surface 21b of first insulator 221A so as to sandwich first insulator 221A with first electrode 31. Since second electrode 32 is sandwiched by first insulator 221A and second insulator 222A, second electrode 32 can be said to be disposed on the surface of second insulator 222A that faces first insulator 221A. In other words, second electrode 32 is disposed spaced apart from core metal 211 and first electrode 31. For this reason, second electrode 32 is not electrically connected to core metal 211 or first electrode 31.

In addition, an AC voltage having the same phase as the AC voltage applied to first electrode 31 is applied to second electrode 32. The AC voltage applied to second electrode 32 is generated in control circuit 40 by power supplied from power supply 41 illustrated in FIG. 6 of Embodiment 1.

As illustrated in FIG. 19A, in first electrode 31 and second electrode 32, when first electrode 31 and second electrode 32 are viewed so as to overlap, first electrode 31 is covered by the whole of second electrode 32, and the surface area of coverage of second surface 21b by second electrode 32 is greater than the surface area of coverage of first surface 21a by first electrode 31. For this reason, second electrode 32 can inhibit the formation of capacitance between first electrode 31 and core metal 211.

As illustrated in FIG. 18A, first electrode 31 includes first connecting portion 31c. Second electrode 32 includes second connecting portion 32c. First connecting portion 31c and second connecting portion 32c are disposed spaced apart from one another so as not to be electrically connected to one another. Harness 8a is electrically connected to first connecting portion 31c by solder or a rivet. Harness 8b is electrically connected to second connecting portion 32c by solder or a rivet. In other words, in the present embodiment, first connecting portion 31c, second connecting portion 32c, and harnesses 8a and 8b are arranged on the rear surface side of steering wheel 201 (the side that faces the front of vehicle 3).

In a cross section of steering wheel 201 taken in a plane perpendicular to the circumferential direction of rim 10 of steering wheel 201 (hereinafter also referred to as the cross section of rim 10), first insulator 221A, second insulator 222A, first electrode 31, and second electrode 32 are disposed at least in the range from the outer circumferential side portion of rim 10 of steering wheel 201 to the portion of rim 10 facing the rear of vehicle 3.

In the present embodiment, first insulator 221A, second insulator 222A, first electrode 31, and second electrode 32 are disposed along the circumferential direction of the cross section of rim 10 over a range of at least ¼th of the circumference. As illustrated in FIG. 3 of Embodiment 1, first insulator 221A, first electrode 31, and second electrode 32 are disposed over a range greater than range L between the two straight lines V1 and V2 made of long dashes broken by two short dashes. More specifically, first insulator 221A, second insulator 222A, first electrode 31, and second electrode 32 are disposed spanning from first portion 211a to second portion 211b through curved portion 11c of rim 10. In this way, first insulator 221A, first electrode 31, and second electrode 32 are disposed in locations easily contacted by the driver's hand when the driver's hand grips rim 10, whereby the driver's grip on steering wheel 201 can be accurately detected by electrode structure 220.

[Foam 15]

As illustrated in FIG. 18A, foam 15 is the portion that the driver grips with their hand, and forms the outer shell of rim 10 on steering wheel 201. Foam 15 comprises a resin material of urethane resin such as polyurethane that covers electrode structure 220. First insulator 221A, second insulator 222A, first electrode 31, second electrode 32, and core metal 211 are embedded in foam 15. In other words, first insulator 221A, second insulator 222A, first electrode 31, second electrode 32, and core metal 211 are covered by foam 15 so as not to be exposed.

<Method for Manufacturing Steering Wheel 201>

As the flowchart for this manufacturing method is the same as FIG. 7 of Embodiment 1, the manufacturing method will be described with reference to FIG. 7.

First, as illustrated in FIG. 7, a worker prepares core metal 211 and electrode structure 220. The worker then causes second extension portion 28 to engage engagement-target portion 211e of second portion 211b. The worker fastens first extension portion 27 included in electrode structure 220 and first engagement-target portion 211c1 of core metal 211 together using fastener 19. This assembles core metal 211 to electrode structure 220 (S11: assemble step).

More specifically, second extension portion 28 passes through engagement-target portion 211e of first portion 211a and passes through engagement-target portion 211e of second portion 211b, whereby claw portion 28a of second extension portion 28 engages engagement-target portion 211e of second portion 211b. With this, claw portion 28a hooks onto engagement-target portion 211e. Insertion through-hole 27a and fastener hole 11k in first engagement-target portion 211c1 of core metal 211 are positioned, and fastener 19 is inserted into insertion through-hole 27a and fastener hole 11k. Accordingly, by fastener 19 being fastened to fastener hole 11k, first extension portion 27 is fixed to first engagement-target portion 211c1. Electrode structure 220 is fixed to core metal 211 by fixing first extension portion 27 to first engagement-target portion 211c1 of core metal 211, and second extension portion 28 and engagement-target portion 211e of second portion 211b engaging in this manner. This yields a structure in which electrode structure 220 is fastened to core metal 211.

Next, the structure is fixed in the cavity of a mold and the mold is clamped. In other words, the structure is covered using foam 15 while electrode structure 220 and core metal 211 are fastened together. In other words, injection molding resin is poured into the cavity in the mold through a gate formed in the mold to form foam 15 that covers the structure (S12: injection step). The injection molding resin is a resin material of a urethane resin such as polyurethane and the like.

In this way, foam 15 can cover electrode structure 220 and core metal 211 while electrode structure 220 is engaged with core metal 211. This yields steering wheel 201.

Advantageous Effects

Next, the advantageous effects of electrode structure 220, steering wheel 201, and the method for manufacturing steering wheel 201 according to the present embodiment will be described.

Electrode structure 220 according to the present embodiment is disposed on the outer circumference of core metal 211 of steering wheel 201 provided in vehicle 3, and includes an insulator (first insulator 221A and/or second insulator 222A) and first electrode 31 disposed on first surface 21a of the insulator, which is the surface on the opposite side of the insulator relative to the surface of the insulator that faces core metal 211 of steering wheel 201. The insulator includes extension portion 26 that extends in a direction that closes the opening of core metal 211, in a cross section of steering wheel 201 taken in a plane perpendicular to the circumferential direction of steering wheel 201. Extension portion 26 is connected to core metal 211.

With this, electrode structure 220 can be attached to core metal 211 by connecting extension portion 26 to core metal 211. Electrode structure 220 can therefore be disposed inside steering wheel 201 when forming steering wheel 201. For this reason, unlike the conventional technique, it is not necessary to make a notch in the steering wheel after forming the steering wheel to dispose the first electrode and the second electrode.

Therefore, owing to electrode structure 220, an increase in processes related to the manufacturing of steering wheel 201 can be inhibited, and an increase in the manufacturing cost of steering wheel 201 can be inhibited without compromising the appearance of steering wheel 201.

In particular, with this electrode structure 220, the posture of electrode structure 220 can be firmly supported by extension portion 26 being connected to core metal 211. For this reason, when steering wheel 201 is resin-molded, electrode structure 220 can be assembled to steering wheel 201 with certainty.

Moreover, electrode structure 220 can be firmly fastened to core metal 211 by extension portion 26 being connected to core metal 211. For this reason, it is possible to inhibit the insulator from being displaced with respect to core metal 211 or being rotationally displaced with respect to the circumferential direction of steering wheel 201 due to pressure at the time of resin molding steering wheel 201. This consequently inhibits an increase in the processes related to the manufacturing of the steering wheel and inhibits an increase in manufacturing cost.

In electrode structure 220 according to the present embodiment, the insulator (first insulator 221A and/or second insulator 222A) includes extension portion 26 that extends in a direction that closes the opening of core metal 211, in a cross section of steering wheel 201 taken in a plane perpendicular to the circumferential direction of steering wheel 201. Extension portion 26 is connected to core metal 211.

This electrode structure 220 also has the same advantageous effects as described above.

Steering wheel 201 according to the present embodiment includes electrode structure 220, core metal 211, and foam 15 that covers electrode structure 220.

Steering wheel 201 configured in this manner also has the same advantageous effects as described above.

A method for manufacturing steering wheel 201 according to the present embodiment includes fastening extension portion 26 to core metal 211 by inserting fastener 19 in insertion through-hole 27a included in electrode structure 220, and covering electrode structure 220 using foam 15 while extension portion 26 is fastened to core metal 211.

With this, electrode structure 220 and core metal 211 can be firmly fastened together by fastening extension portion 26 to core metal 211. For this reason, it is possible to inhibit the insulator from being displaced with respect to core metal 211 or being rotationally displaced with respect to the circumferential direction of steering wheel 201 due to pressure at the time of resin molding steering wheel 201. This method for manufacturing steering wheel 201 also has the same advantageous effects as described above.

A method for manufacturing steering wheel 201 according to the present embodiment includes engaging claw portion 28a included in electrode structure 220 to engagement-target portion 211e included in core metal 211, and covering electrode structure 220 using foam 15 while extension portion 26 is engaged with core metal 211.

With this, electrode structure 220 and core metal 211 can be firmly fastened together by engaging claw portion 28a with engagement-target portion 211e. For this reason, it is possible to inhibit the insulator from being displaced with respect to core metal 211 or being rotationally displaced with respect to the circumferential direction of steering wheel 201 due to pressure at the time of resin molding steering wheel 201. This method for manufacturing steering wheel 201 also has the same advantageous effects as described above.

In electrode structure 220 according to the present embodiment, the insulator includes first insulator 221A and second insulator 222A. First electrode 31 is disposed on first surface 21a of first insulator 221A. Electrode structure 220 further includes: second electrode 32 disposed on second surface 21b of first insulator 221A, which is on the opposite side of first insulator 221A relative to first surface 21a; and second insulator 222A, which is disposed between second electrode 32 and core metal 211. Second insulator 222A includes extension portion 26 that extends in a direction that closes the opening of core metal 211, in a cross section of steering wheel 201 taken in a plane perpendicular to the circumferential direction of steering wheel 201.

This allows first insulator 221A to position first electrode 31 away from second electrode 32 and core metal 211, by second insulator 222A positioning second electrode 32 away from core metal 211. With this, since first electrode 31 and second electrode 32 can be disposed on first insulator 221A, the member in which first insulator 221A, first electrode 31, and second electrode 32 are integrated can be easily assembled to core metal 211.

In electrode structure 220 according to the present embodiment, insertion through-hole 27a is formed in extension portion 26.

With this, if fastener 19 is passed through insertion through-hole 27a, extension portion 26 and core metal 211 can be fastened together.

In electrode structure 220 according to the present embodiment, in a cross section of steering wheel 201 taken in a plane perpendicular to the circumferential direction of steering wheel 201, insertion through-hole 27a is formed in a position that is coaxial with fastener hole 11k in core metal 211, and fastener 19 is inserted in insertion through-hole 27a in extension portion 26 and fastener hole 11k in core metal 211.

With this, since fastener 19 can connect extension portion 26 and core metal 211, electrode structure 220 can be easily and firmly fastened to core metal 211.

In electrode structure 220 according to the present embodiment, claw portion 28a that engages engagement-target portion 211e included in core metal 211 is formed on extension portion 26.

With this, since the insulator can be connected to core metal 211 by engaging claw portion 28a with engagement-target portion 211e, electrode structure 220 can be easily and firmly fastened to core metal 211.

In electrode structure 220 according to the present embodiment, in a cross section of steering wheel 201 taken in a plane perpendicular to the circumferential direction of steering wheel 201, core metal 211 includes curved portion 11c, first portion 211a, and second portion 211b, and first portion 211a is formed shorter than second portion 211b. Engagement-target portion 211e is formed on second portion 211b. In a cross section of steering wheel 201 taken in a plane perpendicular to the circumferential direction of steering wheel 201, extension portion 26 extends toward second portion 211b in a direction perpendicular to the lengthwise direction of first portion 211a, and claw portion 28a formed on extension portion 26 engages engagement-target portion 211e formed on second portion 211b.

With this, since the insulator can be connected to core metal 211 by engaging claw portion 28a with engagement-target portion 211e formed on second portion 211b, electrode structure 220 can be easily and firmly fastened to core metal 211.

In electrode structure 220 according to the present embodiment, in a cross section of steering wheel 201 taken in a plane perpendicular to the circumferential direction of steering wheel 201, first insulator 221A, first electrode 31, and second electrode 32 are disposed at least in a range from the outer circumferential side of steering wheel 201 to the side of steering wheel 201 facing the rear of vehicle 3.

With this, electrode structure 220 can be disposed at a position where the driver's hand easily comes into contact with the surface of steering wheel 201 when the driver grips steering wheel 201 with their hand. Accordingly, it is possible to detect the driver's hand gripping steering wheel 201.

In electrode structure 220 according to the present embodiment, first insulator 221A comprises a resin material. Second insulator 222A comprises a resin material. First electrode 31 includes metal plating, a metal sheet, or a metal plate. Second electrode 32 includes metal plating, a metal sheet, or a metal plate.

With this, since first electrode 31 and second electrode 32 can be disposed on first insulator 221A, the member in which the insulator, first electrode 31, and second electrode 32 are integrated can be easily assembled to core metal 211. Furthermore, since second insulator 222A is disposed between first insulator 221A and second electrode 32 on one side and core metal 211 on the other, second insulator 222A can dispose first electrode 31 so as to be spaced apart from core metal 211.

In electrode structure 220 according to the present embodiment, an AC voltage having the same phase as the AC voltage applied to second electrode 32 is applied to first electrode 31.

According to this, the capacitance formed between first electrode 31 and core metal 211 can be canceled or reduced. Accordingly, if control circuit 40 for detecting the driver's hand gripping steering wheel 201 is used, control circuit 40 will be able to accurately detect the capacitance formed between first electrode 31 and the driver's hand that generates when the driver's hand grips steering wheel 201.

In electrode structure 220, first insulator 221A includes first positioning portion 21t. Second insulator 222A includes second positioning portion 22t that interlocks with first positioning portion 21t.

With this, when assembling first insulator 221A to second insulator 222A, first positioning portion 21t and second positioning portion 22t can be interlocked. Since this positions first insulator 221A and second insulator 222A, misalignment of first insulator 221A and second insulator 222A in the circumferential direction can be inhibited, making it possible to easily and properly assemble first insulator 221A and second insulator 222A.

Variation 1 of Embodiment 2

Electrode structure 220a and steering wheel 201a according to the present variation differ from the electrode structure and the steering wheel according to Embodiment 2 in that they include first insulator 221B and first electrode 31 but do not include a second insulator or a second electrode. In the present variation, configurations and functions that are the same as electrode structure 220a and steering wheel 201a according to Embodiment 2 share the same reference signs, and detailed description related to these configurations and functions will be omitted.

Figure 22:
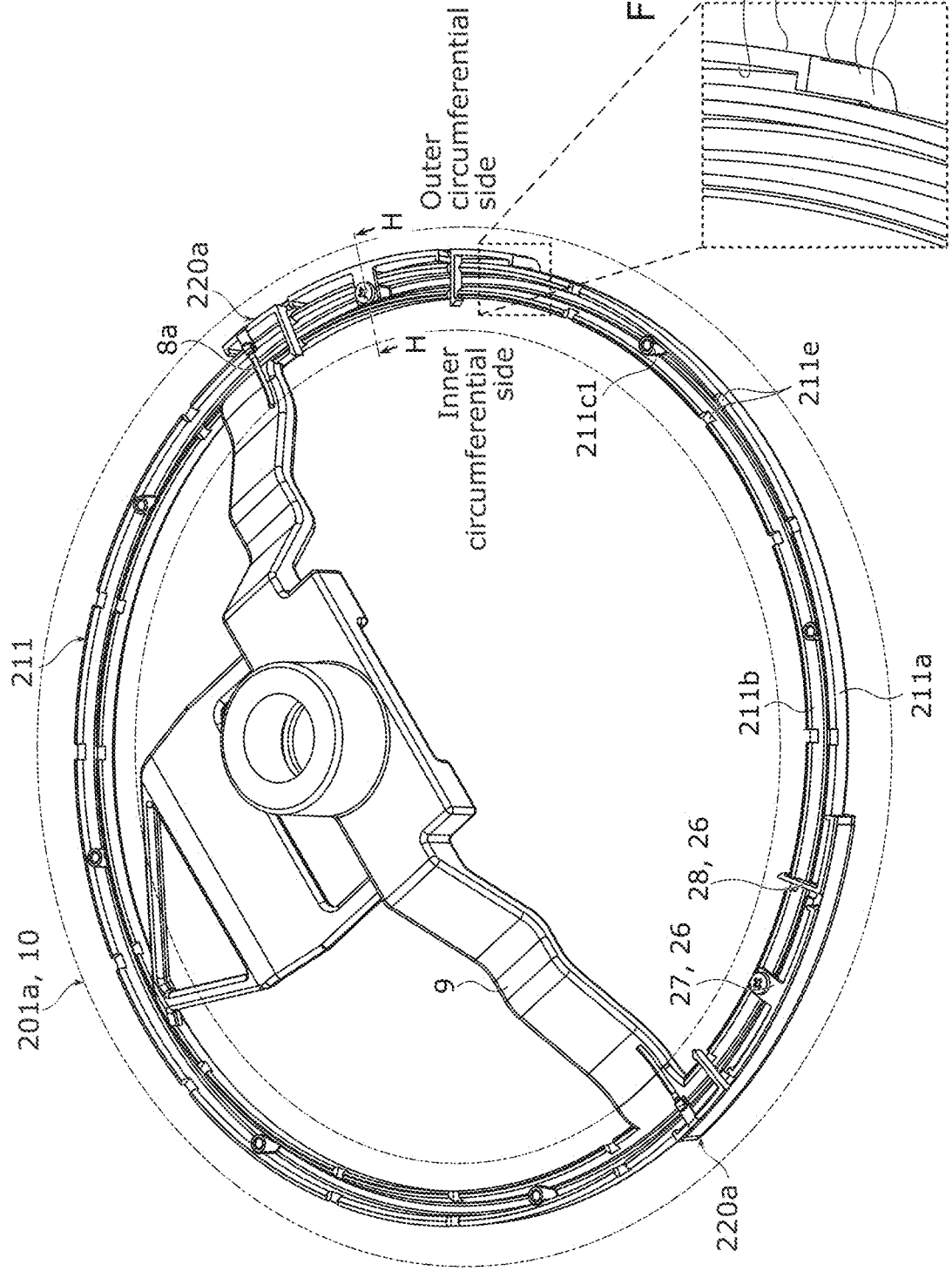
FIG. 22 includes a perspective view of a steering wheel according to Variation 1 of Embodiment 2.
Figure 23:
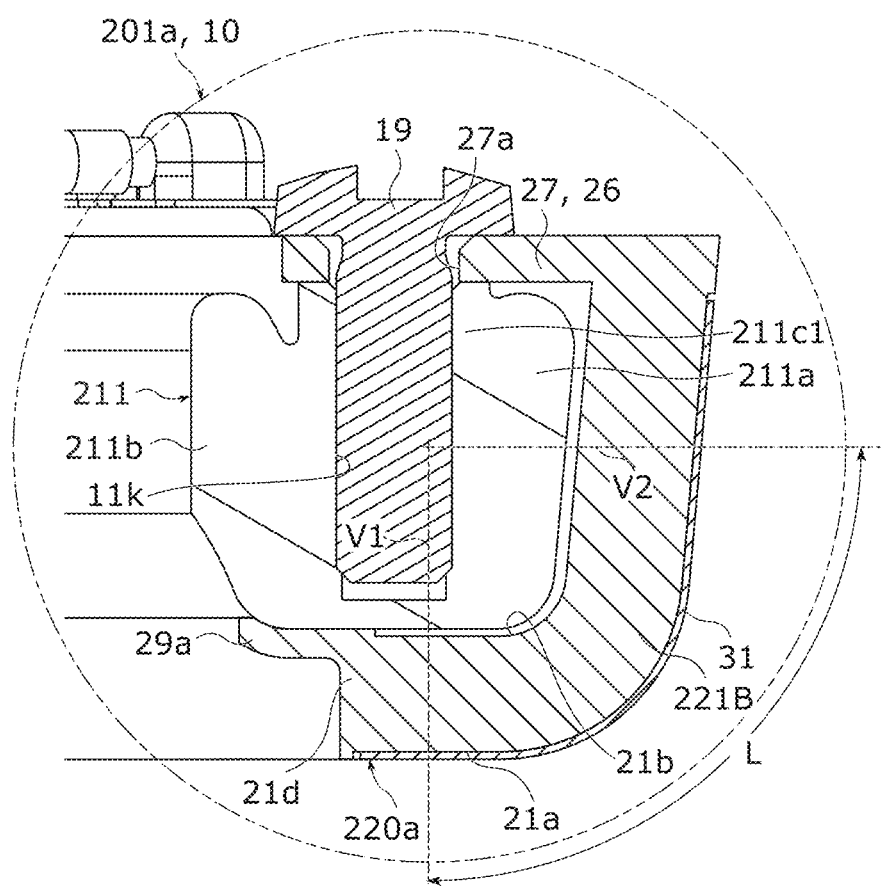
FIG. 23 is a cross-sectional view of a steering wheel taken at line H-H in FIG. 22.

FIG. 22 includes a perspective view of steering wheel 201a according to Variation 1 of Embodiment 2 and FIG. 22A shows a partial enlarged view of electrode structure 220a according to Variation 1 of Embodiment 2. FIG. 23 is a cross-sectional view of steering wheel 201a taken at line H-H in FIG. 22.

As illustrated in FIG. 22, FIG. 22A and FIG. 23, electrode structure 220a according to the present variation includes first insulator 221B, first electrode 31, and projecting portion 21d.

First insulator 221B is arranged along the outer circumferential side surface of core metal 211. First insulator 221B includes first surface 21a and second surface 21b on opposite sides. Second surface 21b is the surface facing core metal 211. First electrode 31 is disposed on first surface 21a. First electrode 31 is electrically connected to harness 8a. Second surface 21b is separated a predetermined distance from core metal 211 by projecting portion 21d. In this way, first insulator 221B can arrange first electrode 31 so as to be spaced apart from core metal 211 so that first electrode 31 and core metal 211 are not electrically connected. Foam 15 may be disposed between first insulator 221B and core metal 211. Second surface 21b of first insulator 221B may contact core metal 211.

First electrode 31 is supported by first insulator 221B and is disposed spaced apart from core metal 211 by a predetermined distance.

First insulator 221B includes one or more extension portions 26.

As illustrated in FIG. 22 and FIG. 23, extension portion 26 extends in a direction that closes the opening of core metal 211, in a cross section of steering wheel 201a. Extension portion 26 includes first extension portion 27 and second extension portion 28.

First extension portion 27 is plate-shaped. Insertion through-hole 27a is formed in first extension portion 27.

Second extension portion 28 is rod-shaped. Claw portion 28a that engages engagement-target portion 211e provided on core metal 211 is formed on the leading end of second extension portion 28.

As illustrated in FIG. 23, first insulator 221B includes engagement support portion 29a that engages core metal 211. In a cross section of steering wheel 201a, engagement support portion 29a extends along the outer circumferential surface of core metal 211, and is disposed so as to sandwich core metal 211 with extension portion 26.

First electrode 31 and first insulator 221B may be integrally formed, and, alternatively, may be formed as individual separable elements.

Projecting portion 21d is disposed at a position facing core metal 211. Projecting portion 21d projects from first insulator 221B toward core metal 211. A portion of the tip of projecting portion 21d abuts core metal 211. In other words, projecting portion 21d is disposed between first insulator 221B and core metal 211. Accordingly, projecting portion 21d can ensure that first insulator 221B is distanced from core metal 211 and maintain the posture of first insulator 221B relative to core metal 211 so that first insulator 221B and first electrode 31 do not contact core metal 211.

Projecting portion 21d is integrally formed with first insulator 221B. Projecting portion 21d and first insulator 221B may be formed as individual separable elements.

A plurality of projecting portions 21d are disposed between core metal 211 and first insulator 221B. Projecting portions 21d may be disposed at approximately equal intervals on core metal 211 and first insulator 221B.

In electrode structure 220a according to the present variation, the insulator includes first insulator 221B, and first electrode 31 is disposed on first surface 21a of first insulator 221B. First insulator 221B includes extension portion 26 that extends in a direction that closes the opening of core metal 211, in a cross section of steering wheel 201a taken in a plane perpendicular to the circumferential direction of steering wheel 201a.

This allows first insulator 221B to position first electrode 31 away from core metal 211. Since first electrode 31 can be disposed on first insulator 221B, the member in which first insulator 221B and first electrode 31 are integrated can be easily assembled to core metal 211.

Variation 2 of Embodiment 2

The present variation differs from the electrode structure and the steering wheel according to Embodiment 2 and Variation 1 of Embodiment 2 in that a plurality of electrode structures 220 are coupled together and disposed along the circumferential direction of core metal 211, for example. In the present variation, configurations and functions that are the same as the electrode structure and the steering wheel according to Embodiment 2 and Variation 1 of Embodiment 2 share the same reference signs, and detailed description related to these configurations and functions will be omitted.

Figure 24:
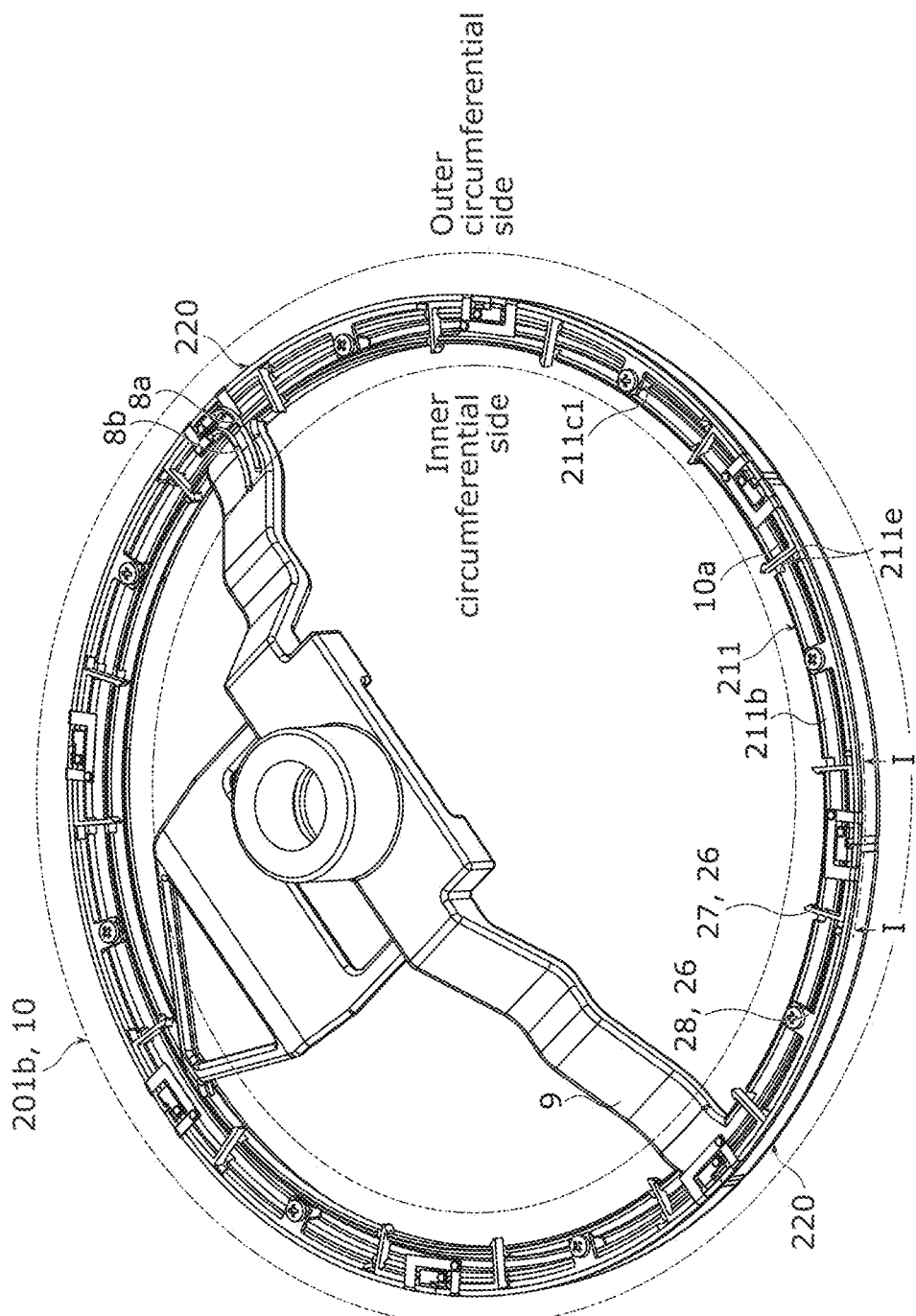
FIG. 24 is a perspective view of a steering wheel according to Variation 2 of Embodiment 2.
Figure 25:
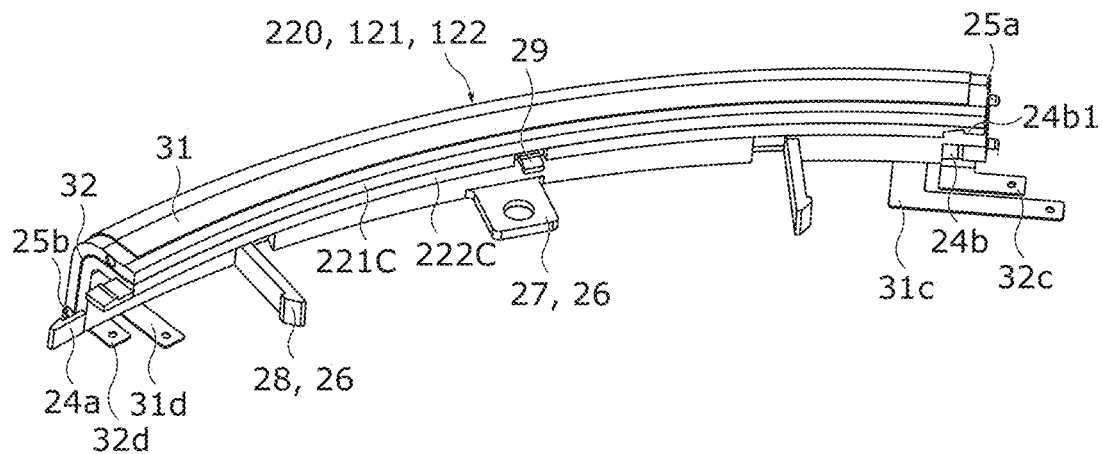
FIG. 25 is a perspective view of an electrode structure according to Variation 2 of Embodiment 2.
Figure 26:
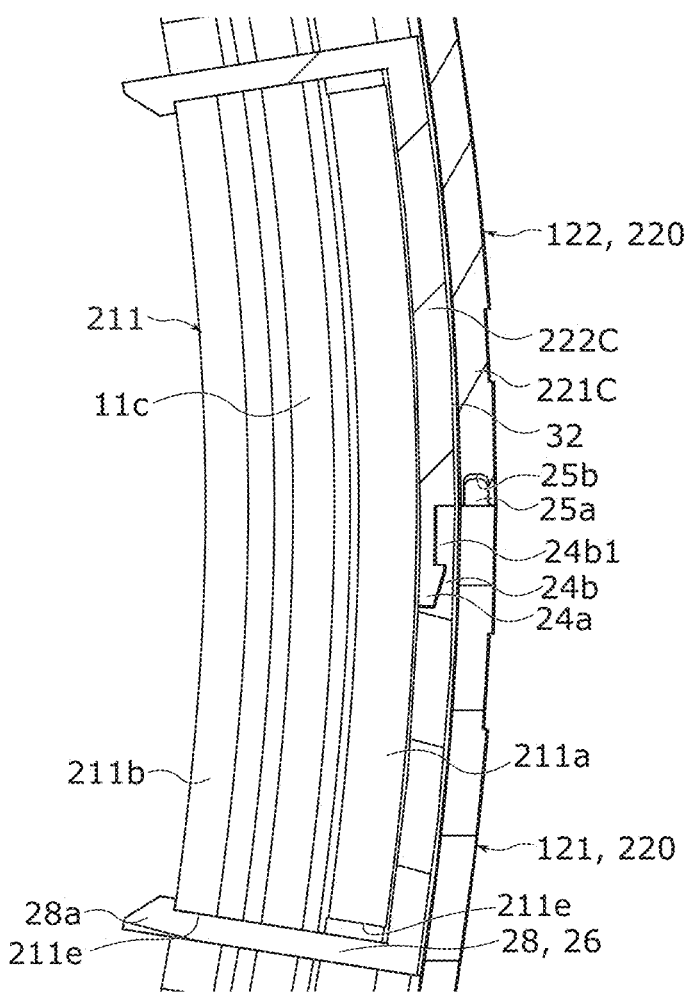
FIG. 26 is a cross-sectional view of an electrode structure and a core metal taken at line I-I in FIG. 24.

FIG. 24 is a perspective view of steering wheel 201b according to Variation 2 of Embodiment 2. FIG. 25 is a perspective view of electrode structure 220 according to Variation 2 of Embodiment 2. FIG. 26 is a cross-sectional view of electrode structure 220 and core metal 211 taken at line I-I in FIG. 24. The present variation presents an example in which first connecting portions 31c and 31d of two adjacent first electrodes 31 are fastened by, for example, rivet 8c, and second connecting portions 32c and 32d of two adjacent second electrodes 32 are fastened by, for example, rivet 8c.

In the present variation, as illustrated in FIG. 24, a plurality of electrode structures 220 are provided along the circumferential direction of core metal 211. More specifically, the plurality of electrode structures 220 are provided on core metal 211 so as to cover a range extending from first portion 211a of core metal 211 to curved portion 11c. Stated differently, a plurality of electrode structures 220 are provided on core metal 211 so as to cover core metal 211, excluding second portion 211b and recessed portion 10a of core metal 211. Although eight electrode structures 220 are used in the present variation, seven or fewer, or nine or more electrode structures 220 may be used. Moreover, the entire circumference of core metal 211 need not be covered by electrode structures 220.

As illustrated in FIG. 25 and FIG. 26, first coupling portion 25a and first coupling-target portion 25b are formed on each first insulator 221C of the plurality of electrode structures 220. In FIG. 26 according to the present variation, among two adjacent electrode structures 220 included in the plurality of electrode structures 220, one electrode structure 220 is referred to as first electrode structure 121 and the other electrode structure 220 is referred to as second electrode structure 122. Each of first electrode structure 121 and second electrode structure 122 includes first coupling portion 25a and first coupling-target portion 25b.

First coupling portion 25a is formed on one end of first insulator 221C of first electrode structure 121 and, although omitted in the figure, formed on one end of first insulator 221C of second electrode structure 122. First coupling-target portion 25b is formed on the other end of first insulator 221C of first electrode structure 121 although omitted in the figure, and formed on the other end of first insulator 221C of second electrode structure 122.

First coupling portion 25a couples with first coupling-target portion 25b of first insulator 221C of second electrode structure 122, which is the electrode structure 220 adjacent to first electrode structure 121. First coupling portion 25a is a protruding portion that protrudes from the end edge at one end of first insulator 221C in the circumferential direction of first electrode structure 121. In FIG. 26, first coupling portion 25a is a pin-shaped protruding portion. First coupling portion 25a may be a claw-shaped protruding portion.

First coupling-target portion 25b of second electrode structure 122 couples with first coupling portion 25a of first insulator 221C in first electrode structure 121. First coupling-target portion 25b is a recessed portion that recedes from the end edge at the other end of first insulator 221C in the circumferential direction of second electrode structure 122. In FIG. 26, when first coupling portion 25a is a pin-shaped protruding portion, first coupling-target portion 25b is a recessed portion in which the pin-shaped protruding portion is insertable. First coupling-target portion 25b may be a recessed portion including a hooking part on which the claw-shaped first coupling portion 25a can hook.

As illustrated in FIG. 25 and FIG. 26, each of first electrode structure 121 and second electrode structure 122 includes second coupling portion 24a and second coupling-target portion 24b.

Second coupling portion 24a is formed on the other end of second insulator 222C of first electrode structure 121 although omitted in the figure, and formed on the other end of second insulator 222C of second electrode structure 122. Second coupling-target portion 24b is formed on one end of second insulator 222C of first electrode structure 121 and, although omitted in the figure, formed on one end of second insulator 222C of second electrode structure 122.

Figure 27:
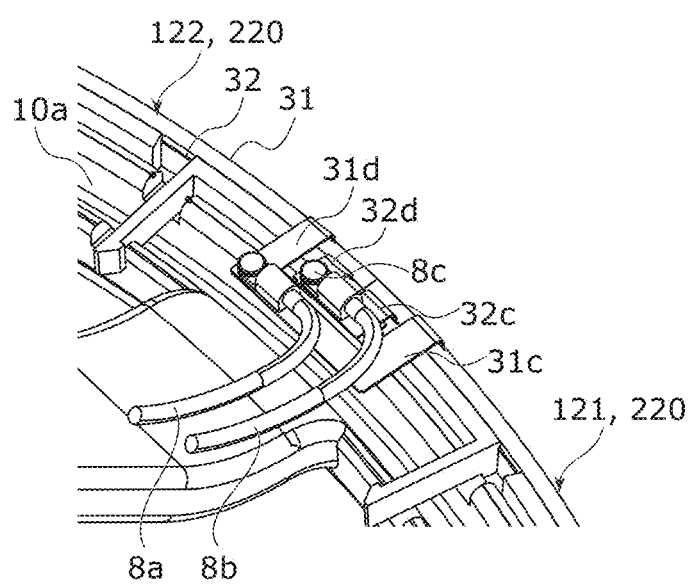
FIG. 27 is a partial enlarged perspective view of the electrical connection between harnesses and first and second electrodes.

Second coupling portion 24a of second electrode structure 122 couples with second coupling-target portion 24b of second insulator 222C of first electrode structure 121. Second coupling portion 24a is a protruding portion that protrudes from the end edge at the other end of second insulator 222C in the circumferential direction of second electrode structure 122. In FIG. 27, second coupling portion 24a is a claw-shaped protruding portion. Second coupling portion 24a may be a pin-shaped protruding portion.

Second coupling-target portion 24b of first electrode structure 121 couples with second coupling portion 24a of second insulator 222C of second electrode structure 122. Second coupling-target portion 24b is a recessed portion that recedes from the end edge at one end of second insulator 222C in the circumferential direction of first electrode structure 121. In FIG. 26, second coupling-target portion 24b may be a recessed portion including hooking part 24b1 on which the claw-shaped second coupling portion 24a can hook. When second coupling portion 24a is a pin-shaped protruding portion, second coupling-target portion 24b may be a recessed portion in which the pin-shaped protruding portion is insertable.

In this way, first coupling portion 25a that couples with first coupling-target portion 25b of second electrode structure 122 is formed on the end portion at one end of first insulator 221C of first electrode structure 121, and first coupling-target portion 25b that couples with first coupling portion 25a of another, adjacent electrode structure 220 is formed on the end portion at the other end of first insulator 221C of first electrode structure 121. Second coupling-target portion 24b that couples with second coupling portion 24a of second electrode structure 122 is formed on the end portion at one end of second insulator 222C of first electrode structure 121, and second coupling portion 24a that couples with second coupling-target portion 24b of another, adjacent electrode structure 220 is formed on the end portion at the other end of second insulator 222C of first electrode structure 121. With this, by coupling second coupling-target portion 24b of first electrode structure 121 to second coupling portion 24a of second electrode structure 122, and coupling first coupling portion 25a of first electrode structure 121 to first coupling-target portion 25b of second electrode structure 122, a plurality of coupled electrode structures 220 can be attached to core metal 211 along the circumferential direction of core metal 211.

In the present variation, first coupling portion 25a, second coupling portion 24a, first coupling-target portion 25b, and second coupling-target portion 24b may be provided on one or the other end of electrode structure 220.

Next, in two adjacent electrode structures 220, how two adjacent first electrodes 31 are connected with two adjacent second electrodes 32, how the plurality of first electrodes 31 are connected to harness 8a, and how the plurality of second electrodes 32 are connected to harness 8b will be described.

When a plurality of electrode structures 220 are provided on core metal 211, harness 8a may be individually electrically connected to each of the plurality of first electrodes 31, and harness 8b may be individually electrically connected to each of the plurality of second electrodes 32. Harness 8a may be electrically connected to one first electrode 31 among the plurality of first electrodes 31 connected so as to electrically function as a single electrode, and harness 8b may be electrically connected to one second electrode 32 among the plurality of second electrodes 32 connected so as to electrically function as a single electrode.

FIG. 27 is a partial enlarged perspective view of the electrical connection between harnesses 8a and 8b and first and second electrodes 31 and 32.

As illustrated in FIG. 25 and FIG. 27, each of the plurality of first electrodes 31 includes first connecting portions 31c and 31d for directly electrically connecting the plurality of first electrodes 31 together.

First connecting portion 31c is formed on one end in the circumferential direction of electrode structure 220, and first connecting portion 31d is formed on the other end in the circumferential direction of electrode structure 220. The plurality of first electrodes 31 may be electrically connected while arranged in a line along the circumferential direction of core metal 211 by overlapping first connecting portion 31c and first connecting portion 31d of two adjacent first electrodes 31 and fastening them with rivet 8c or the like. In such cases, harness 8a may be electrically connected to first connecting portion 31c via rivet 8c. In other words, harness 8a may be electrically connected to first connecting portions 31c and 31d at one location among the plurality of first electrodes 31 by being crimped via rivet 8c.

Each of the plurality of second electrodes 32 includes second connecting portions 32c and 32d for directly electrically connecting the plurality of second electrodes 32 together.

Second connecting portion 32c is formed on one end in the circumferential direction of electrode structure 220, and second connecting portion 32d is formed on the other end in the circumferential direction of electrode structure 220. The plurality of second electrodes 32 may be electrically connected while arranged in a line along the circumferential direction of the core metal by overlapping second connecting portion 32c and second connecting portion 32d of two adjacent second electrodes 32 and fastening them with rivet 8c or the like. In such cases, harness 8b may be electrically connected to second connecting portions 32c and 32d via rivet 8c. In other words, harness 8b may be electrically connected to second connecting portions 32c and 32d at one location among the plurality of second electrodes 32 by being crimped via rivet 8c.

First connecting portion 31c and first connecting portion 31d are disposed so as to extend from first insulator 221C along the opening of recessed portion 10a of core metal 211, and second connecting portion 32c and second connecting portion 32d are disposed so as to extend from second insulator 222C along the opening of recessed portion 10a of core metal 211. First connecting portion 31c and first connecting portion 31d are spaced apart from second connecting portion 32c and second connecting portion 32d so as not to contact second connecting portion 32c and second connecting portion 32d.

Variation 3 of Embodiment 2

The present variation differs from the electrode structure and the steering wheel according to Embodiment 2 and Variations 1 and 2 of Embodiment 2 in that a plurality of electrode structures 220 are coupled together and disposed along the circumferential direction of core metal 211, and that electrode structure 220 and steering wheel 201c include first insulator 221D and first electrode 31 and do not include a second insulator or a second electrode, for example. In the present variation, configurations and functions that are the same as the electrode structure and the steering wheel according to Embodiment 2 and Variations 1 and 2 of Embodiment 2 share the same reference signs, and detailed description related to these configurations and functions will be omitted.

Figure 28:
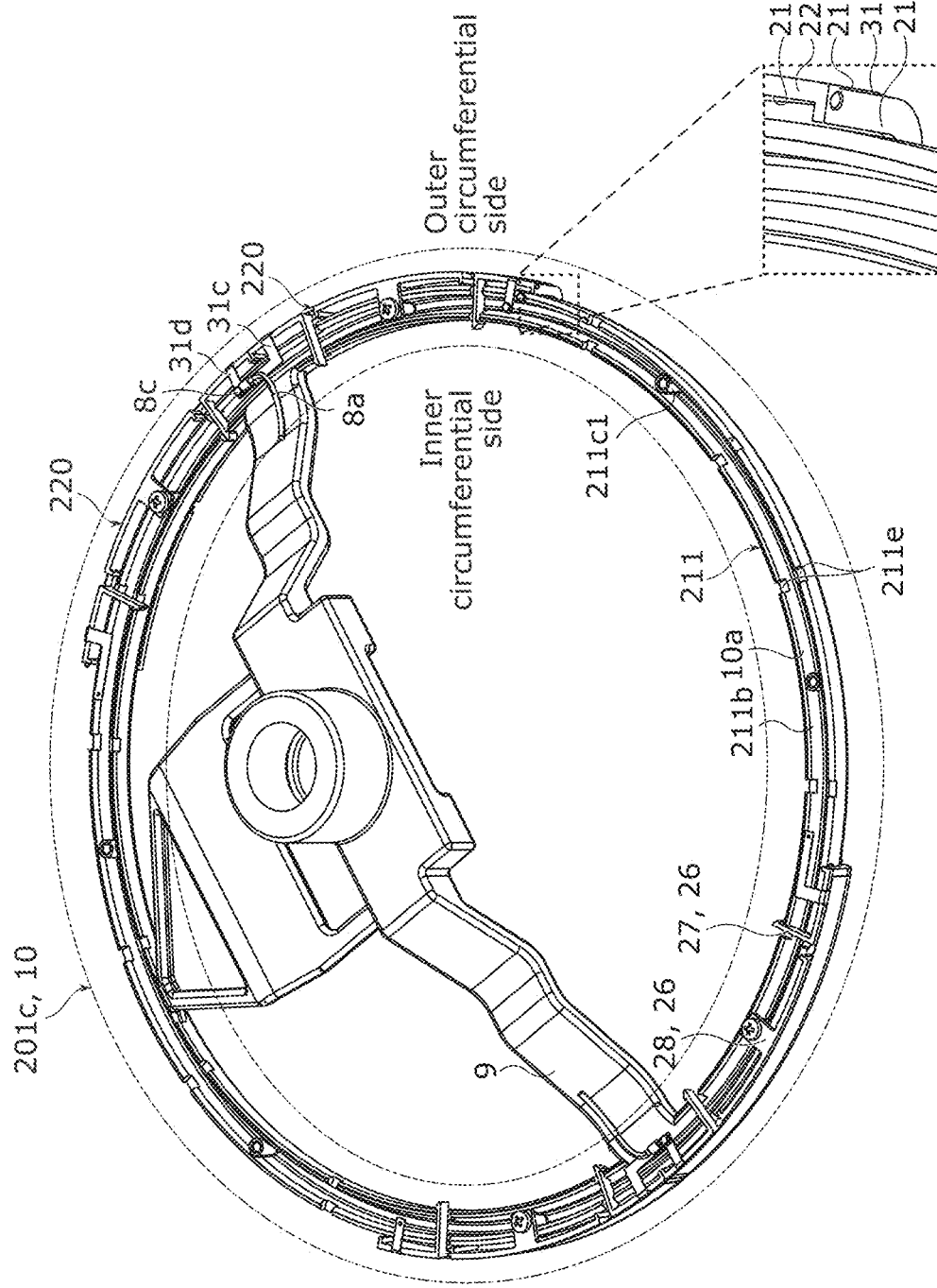
FIG. 28 includes a perspective view of a steering wheel according to Variation 3 of Embodiment 2.

FIG. 28 includes a perspective view of steering wheel 201c according to Variation 3 of Embodiment 2 and FIG. 28A shows a partial enlarged view of electrode structure 220 according to Variation 3 of Embodiment 2.

In the present variation, as illustrated in FIG. 28, two electrode structures 220 are provided on each of the left and right sides along the circumferential direction of core metal 211. More specifically, two electrode structures 220 are provided on the right side of steering wheel 201c, and two electrode structures 220 are provided on the left side of steering wheel 201c.

Electrode structure 220 according to the present variation includes first insulator 221D, first electrode 31, and projecting portion 21d.

First insulator 221D is arranged along the outer circumferential side surface of core metal 211. First electrode 31 is disposed spaced apart from core metal 211 by a predetermined distance by being supported by first insulator 221D. Projecting portion 21d is disposed between first insulator 221D and core metal 211. Accordingly, projecting portion 21d can ensure that first insulator 221D is distanced from core metal 211 and maintain the posture of first insulator 221D relative to core metal 211 so that first insulator 221D and first electrode 31 do not contact core metal 211.

Each of the two first electrodes 31 includes first connecting portions 31c and 31d for directly electrically connecting them together.

First connecting portion 31c is formed on one end in the circumferential direction of electrode structure 220, and first connecting portion 31d is formed on the other end in the circumferential direction of electrode structure 220. The plurality of first electrodes 31 may be electrically connected while arranged in a line along the circumferential direction of core metal 211 by fastening first connecting portions 31c and 31d of two adjacent first electrodes 31 with rivet 8c or the like. In such cases, harness 8a may be electrically connected to first connecting portions 31c and 31d at one location among the plurality of first electrodes 31 by being crimped via rivet 8c.

Variation 4 of Embodiment 2

The present variation differs from the electrode structure and the steering wheel according to Variations 1 through 3 of Embodiment 2 in that core metal 211A is inverted so as to have plane symmetry from the configuration in FIG. 28, and that the position in which electrode structure 220 is attached to core metal 211A is also inverted, for example. In the present variation, configurations and functions that are the same as the electrode structure and the steering wheel according to Variation 3 of Embodiment 2 share the same reference signs, and detailed description related to these configurations and functions will be omitted.

Figure 29:
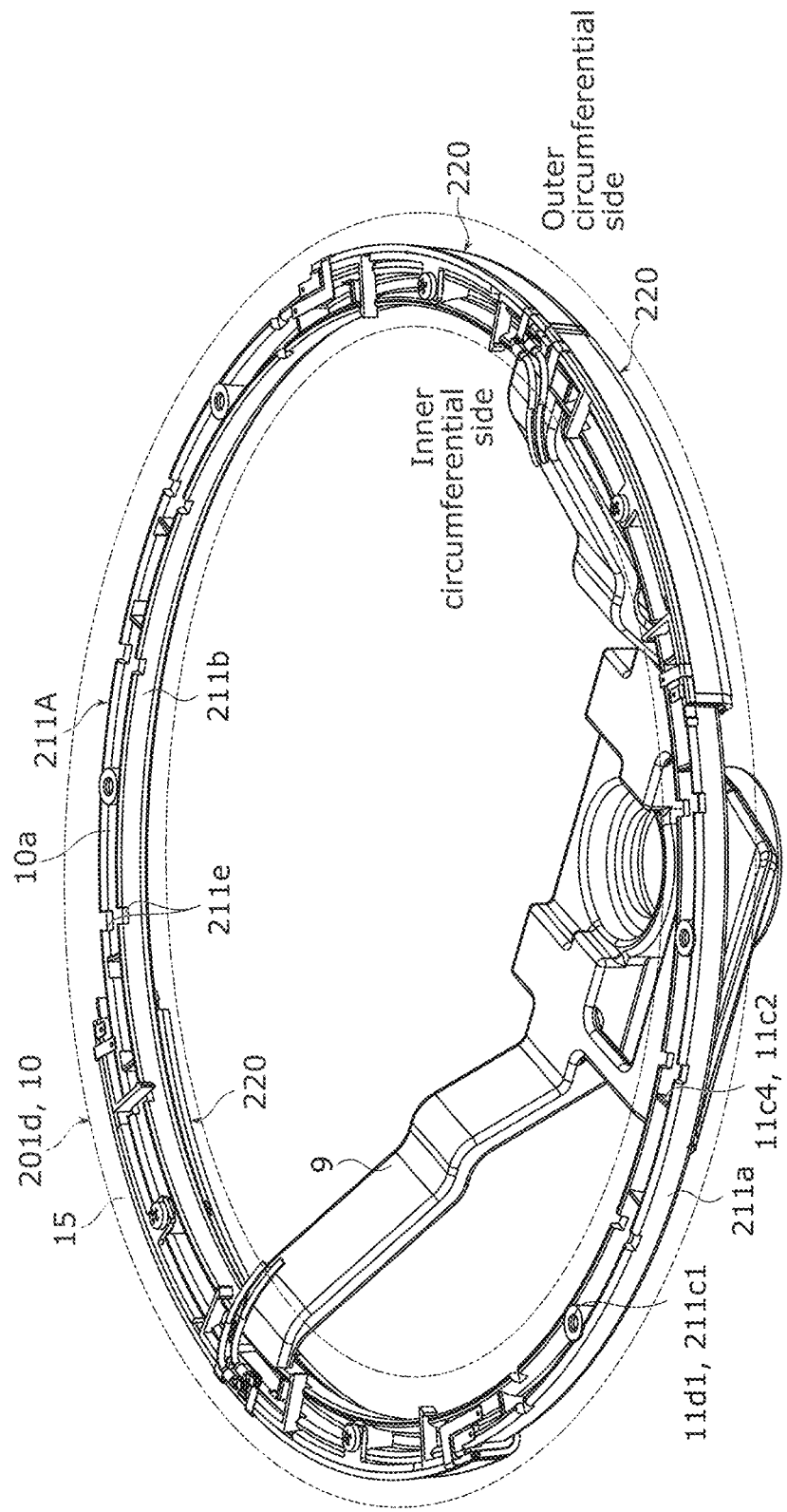
FIG. 29 is a perspective view of a steering wheel according to Variation 4 of Embodiment 2.

FIG. 29 is a perspective view of steering wheel 201d according to another variation.

With core metal 211A in FIG. 29, the plane of the opening of recessed portion 10a of core metal 211A faces the driver's seat, and electrode structure 220 is attached on the side of core metal 211A that faces the front of vehicle 3. In other words, core metal 211A is fixed to spoke 9 so that the opening of recessed portion 10a in core metal 211A faces the driver's seat. Note that electrode structure 220 may be attached to the side of core metal 211A that faces the rear of vehicle 3 so as to cover recessed portion 10a in core metal 211A.

Variation 5 of Embodiment 2

The present variation differs from the electrode structure and the steering wheel according to Embodiment 2 and Variations 1 through 4 of Embodiment 2 in that second insulator 222E of electrode structure 220b and steering wheel 201e includes first engagement claw 22d1 and second engagement claw 22d2. In the present variation, configurations and functions that are the same as the electrode structure and the steering wheel according to Embodiment 2 share the same reference signs, and detailed description related to these configurations and functions will be omitted.

Figure 30:
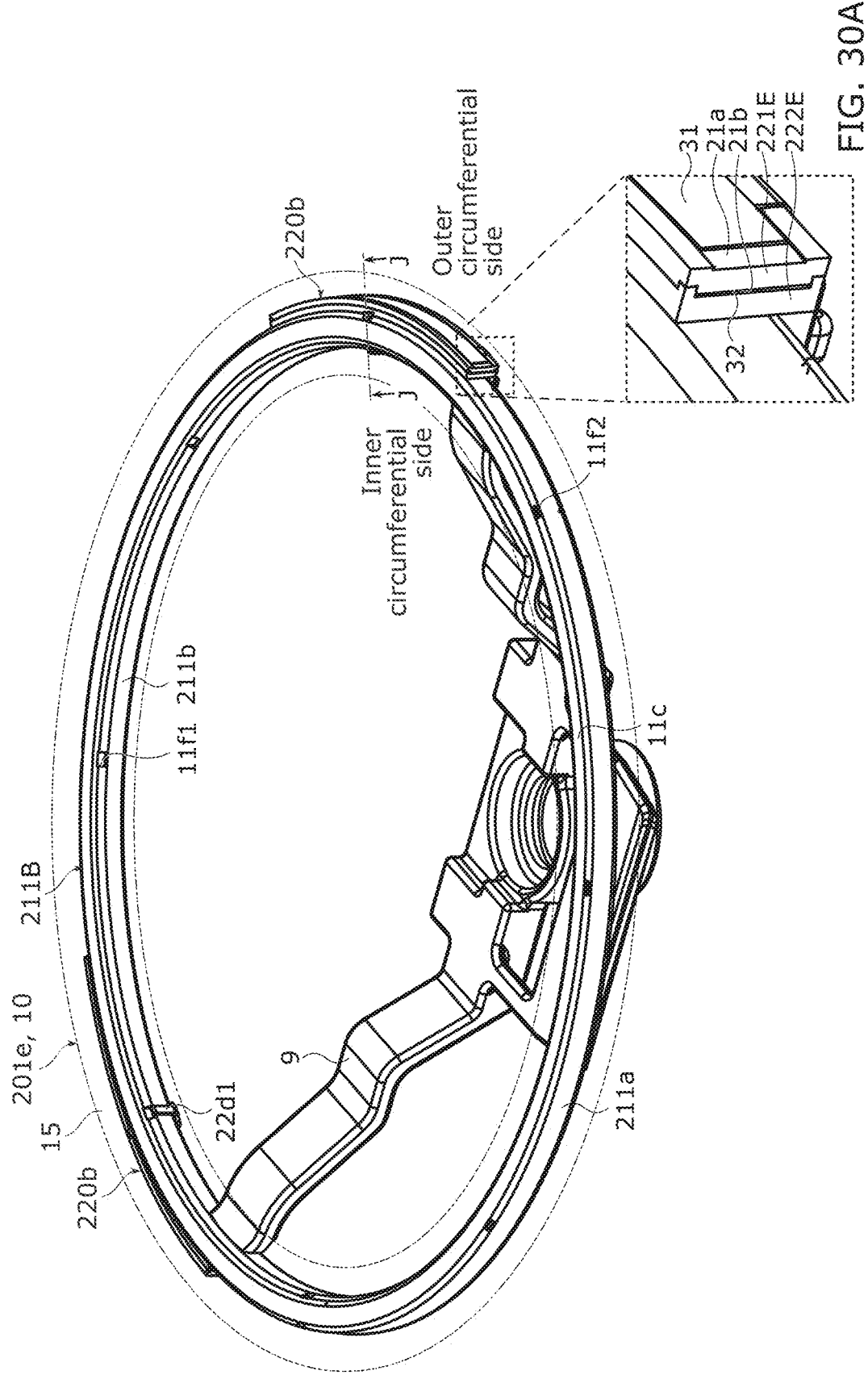
FIG. 30 includes a perspective view of a steering wheel according to Variation 5 of Embodiment 2.
Figure 31:
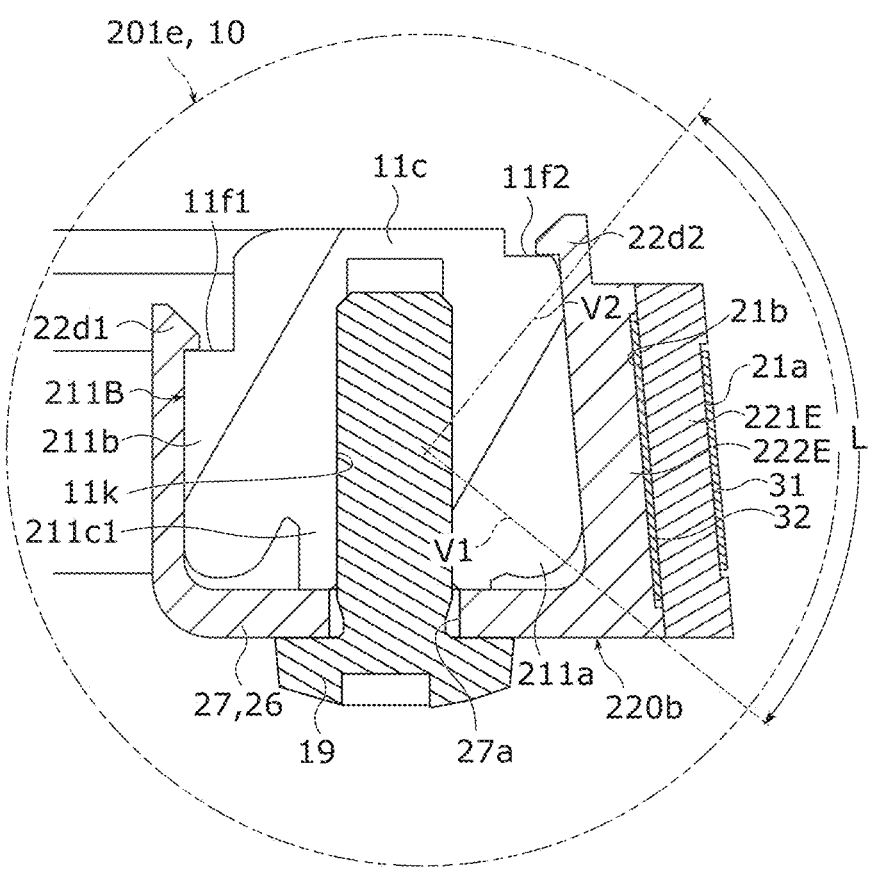
FIG. 31 is a cross-sectional view of a steering wheel taken at line J-J in FIG. 30.

FIG. 30 includes a perspective view of steering wheel 201e according to Variation 5 of Embodiment 2 and FIG. 30A shows a partial enlarged view of electrode structure 220b according to Variation 5 of Embodiment 2. FIG. 31 is a cross-sectional view of steering wheel 201e taken at line J-J in FIG. 30.

As illustrated in FIG. 30 and FIG. 31, first engagement-target recessed portion 11f1 and second engagement-target recessed portion 11f2 are formed in core metal 211B. First engagement-target recessed portion 11f1 is formed at the boundary region between second portion 211b and curved portion 11c of core metal 211B, and second engagement-target recessed portion 11f2 is formed at the boundary region between first portion 211a and curved portion 11c of core metal 211B. In the present variation, a plurality of first engagement-target recessed portions 11f1 are formed on the inner circumferential side of core metal 211B, and a plurality of second engagement-target recessed portions 11f2 are formed on the outer circumferential side of core metal 211B.

First engagement claw 22d1 capable of engaging first engagement-target recessed portion 11f1 in core metal 211B, and second engagement claw 22d2 capable of engaging second engagement-target recessed portion 11f2 in core metal 211B are formed on second insulator 222E.

First engagement claw 22d1 is a claw portion that, in a cross section of steering wheel 201e, extends along the surface of second portion 211b of core metal 211B, from an end portion on the second portion 211b side of extension portion 26. First engagement claw 22d1 hooks onto first engagement-target recessed portion 11f1 of core metal 211B by engaging first engagement-target recessed portion 11f1.

Second engagement claw 22d2 engages second engagement-target recessed portion 11f2 in core metal 211B, on the other end of second insulator 222E at which extension portion 26 is not formed. In other words, second engagement claw 22d2 is a claw portion that, in a cross section of steering wheel 201e, extends along the surface of first portion 211a of core metal 211B, from the other end of second insulator 222E. Second engagement claw 22d2 hooks onto second engagement-target recessed portion 11f2 of core metal 211B by engaging second engagement-target recessed portion 11f2.

In other words, first engagement claw 22d1 and second engagement claw 22d2 can fix electrode structure 220b to core metal 211B by hooking onto first engagement-target recessed portion 11f1 and second engagement-target recessed portion 11f2 of core metal 211B so as to sandwich core metal 211B.

In the present variation, in a cross section of steering wheel 201e, first insulator 221E, first electrode 31, and second electrode 32 are disposed across a range of ¼th or less of the circumference of the cross section of steering wheel 201e. In other words, first insulator 221E, first electrode 31, and second electrode 32 are disposed over a range less than range L between the two straight lines V1 and V2 made of long dashes broken by two short dashes. Additionally, in the present variation, second insulator 222E is also disposed over a range less than range L between the two straight lines V1 and V2 made of long dashes broken by two short dashes.

In the present variation, since first insulator 221E, first electrode 31, and second electrode 32 are disposed in locations easily contacted by the driver's hand when the driver's hand grips rim 10, the size of steering wheel 201e can be reduced and the driver's hand gripping steering wheel 201e can be detected accurately.

In the present variation, core metal 211B is exemplified as, but not limited to, including first engagement-target portion 211c1 and engagement-target portion 211e. For example, core metal 211B may include engagement-target portion 211e without including a first engagement-target portion. In such cases, on electrode structure 220b, insertion through-hole 27a need not be formed in first extension portion 27. First extension portion 27 may be capable of sandwiching core metal 211B with second insulator 222E.

Next, the method for manufacturing steering wheel 201e will be described.

Since the method for manufacturing steering wheel 201e is the same as in FIG. 7 in Embodiment 1, the manufacturing method will be described with reference to FIG. 7. Repeated description will be omitted where appropriate.

First, as illustrated in FIG. 7 and FIG. 31, the worker causes first engagement claw 22d1 included in electrode structure 220b to engage first engagement-target recessed portion 11f1. The worker further causes second engagement claw 22d2 included in electrode structure 220b to engage second engagement-target recessed portion 11f2. The worker further prepares core metal 211B and electrode structure 220b. The worker fastens first extension portion 27 included in electrode structure 220b and first engagement-target portion 211c1 of core metal 211B together using fastener 19. This assembles core metal 211B to electrode structure 220b (S11: assemble step).

Next, the structure is fixed in the cavity of a mold and the mold is clamped. In other words, the structure is covered using foam 15 while electrode structure 220b and core metal 211B are fastened together. In other words, injection molding resin is poured into the cavity in the mold through a gate formed in the mold to form foam 15 that covers the structure (S12: injection step).

In this way, foam 15 can cover electrode structure 220b and core metal 211B while electrode structure 220b is engaged with core metal 211B. This yields steering wheel 201e.

In electrode structure 220b according to the present variation, the insulator includes first insulator 221E and second insulator 222E. First electrode 31 is disposed on first surface 21a of first insulator 221E. Electrode structure 220b further includes: second electrode 32 disposed on second surface 21b of first insulator 221E, which is on the opposite side of first insulator 221E relative to first surface 21a; and second insulator 222E, which is disposed between second electrode 32 and core metal 211B. Second insulator 222E includes extension portion 26 that extends in a direction that closes the opening of core metal 211B, in a cross section of steering wheel 201e taken in a plane perpendicular to the circumferential direction of steering wheel 201e.

This allows first insulator 221E to position first electrode 31 away from second electrode 32 and core metal 211B, by second insulator 222E positioning second electrode 32 away from core metal 211B. With this, since first electrode 31 and second electrode 32 can be disposed on first insulator 221E, the member in which first insulator 221E, first electrode 31, and second electrode 32 are integrated can be easily assembled to core metal 211B.

In electrode structure 220b, in a cross section of steering wheel 201e taken in a plane perpendicular to the circumferential direction of steering wheel 201e, extension portion 26 is formed so as to close the opening of core metal 211B follow the outer circumferential surface of core metal 211B. First engagement claw 22d1 that engages first engagement-target recessed portion 11f1 included in core metal 211B is formed on extension portion 26.

With this, since the insulator can be connected to core metal 211B by engaging first engagement claw 22d1 with first engagement-target recessed portion 11f1, electrode structure 220b can be easily and firmly fastened to core metal 211B.

In electrode structure 220b according to the present variation, in a cross section of steering wheel 201e taken in a plane perpendicular to the circumferential direction of steering wheel 201e, second engagement claw 22d2 that engages second engagement-target recessed portion 11f2 included in core metal 211B is formed on the other end of second insulator 222E at which extension portion 26 is not formed.

With this, since second insulator 222E can be connected to core metal 211B by engaging second engagement claw 22d2 with second engagement-target recessed portion 11f2, electrode structure 220b can be easily and firmly fastened to core metal 211B.

As illustrated in FIG. 31, in electrode structure 220b according to the present variation, in a cross section of steering wheel 201e taken in a plane perpendicular to the circumferential direction of steering wheel 201e, first insulator 221E, first electrode 31, and second electrode 32 are disposed across a range of ¼th or less of the circumference of the cross section of steering wheel 201e.

With this, the size of electrode structure 220b can be reduced by disposing first insulator 221E, first electrode 31, and second electrode 32 across a range of ¼th or less of the circumference. Moreover, since first insulator 221E, first electrode 31, and second electrode 32 are disposed in locations easily contacted by the driver's hand when the driver's hand grips the rim, electrode structure 220b can detect the driver's hand gripping steering wheel 201e accurately.

The method for manufacturing steering wheel 201e according to the present variation includes engaging first engagement claw 22d1 included in electrode structure 220b with first engagement-target recessed portion 11f1 included in core metal 211B, and covering electrode structure 220b using foam 15 while extension portion 26 is engaged with core metal 211B.

With this, electrode structure 220b and core metal 211B can be firmly fastened together by engaging first engagement claw 22d1 with core metal 211B. For this reason, it is possible to inhibit the insulator from being displaced with respect to core metal 211B or being rotationally displaced with respect to the circumferential direction of steering wheel 201e due to pressure at the time of resin molding steering wheel 201e. This method for manufacturing steering wheel 201e also has the same advantageous effects as described above.

Variation 6 of Embodiment 2

The present variation differs from the electrode structure and the steering wheel according to Embodiment 2 and Variations 1 through 5 of Embodiment 2 in that claw portion 128c of electrode structure 220f and steering wheel 201f project in a direction orthogonal to a direction that closes the opening of core metal 211C. In the present variation, configurations and functions that are the same as the electrode structure and the steering wheel according to Variation 5 of Embodiment 2 share the same reference signs, and detailed description related to these configurations and functions will be omitted.

Figure 32:
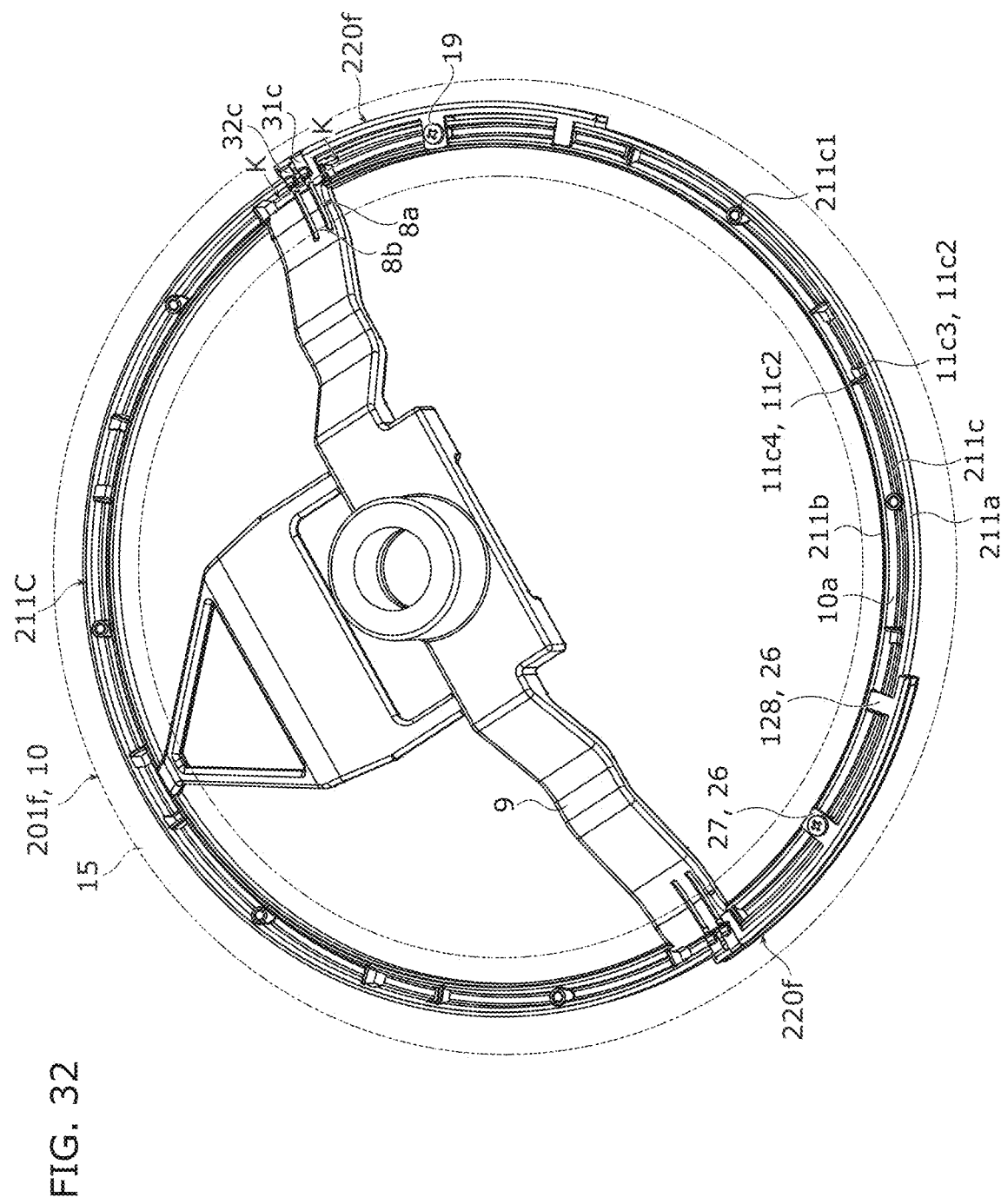
FIG. 32 is a perspective view of a steering wheel according to Variation 6 of Embodiment 2.
Figure 33:
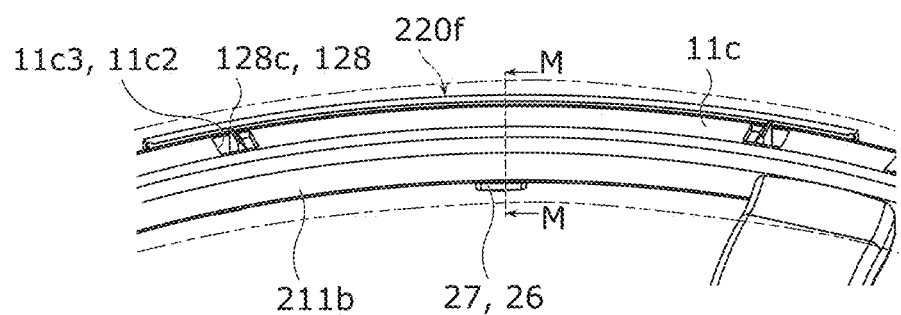
FIG. 33 is a perspective view of an electrode structure and a core metal according to Variation 6 of Embodiment 2.
Figure 34:
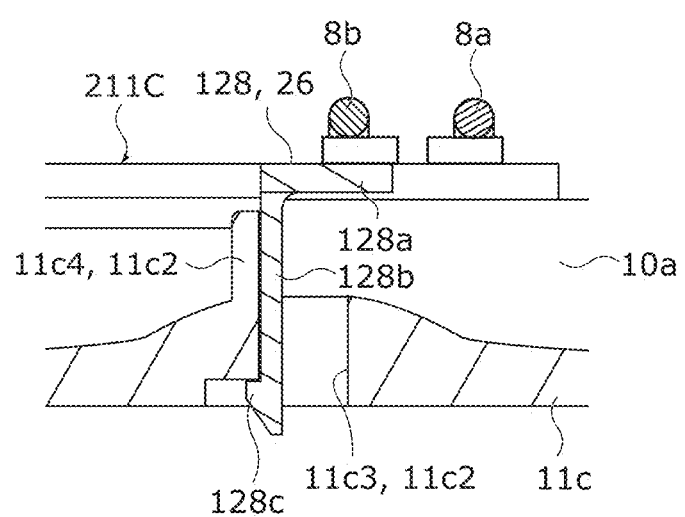
FIG. 34 is a cross-sectional view of an electrode structure and a core metal taken at line K-K in FIG. 32.
Figure 35:
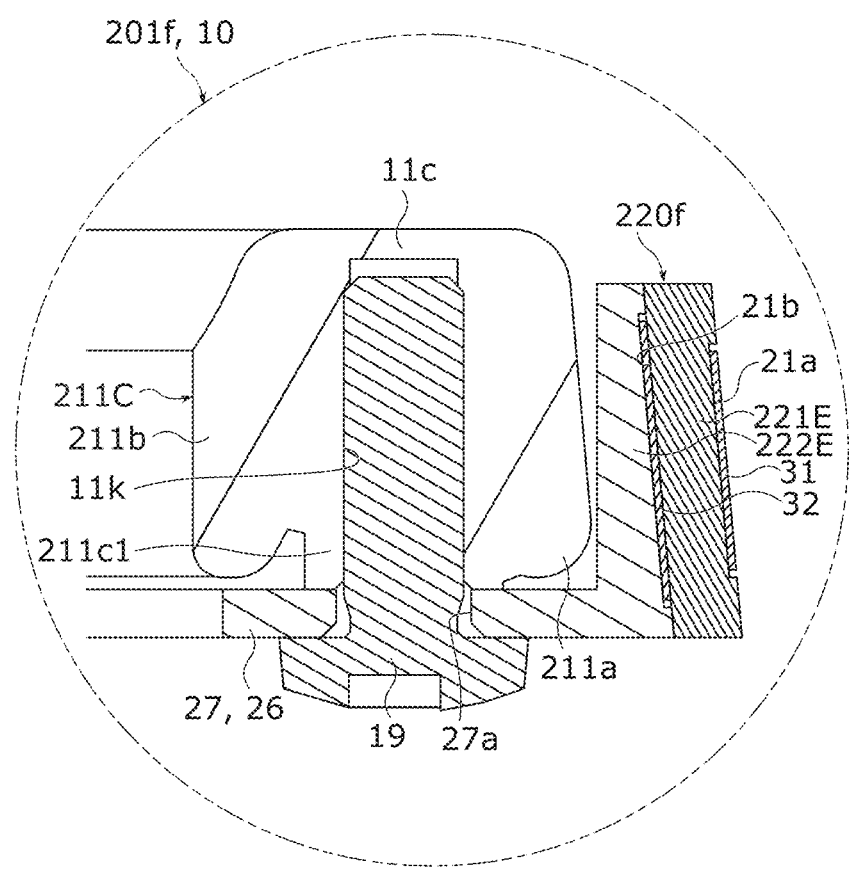
FIG. 35 is a cross-sectional view of a steering wheel taken at line M-M in FIG. 33.

FIG. 32 is a perspective view of steering wheel 201f according to Variation 6 of Embodiment 2. FIG. 33 is a perspective view of electrode structure 220f and core metal 211C according to Variation 6 of Embodiment 2. FIG. 34 is a cross-sectional view of electrode structure 220f and core metal 211C taken at line K-K in FIG. 32. FIG. 35 is a cross-sectional view of steering wheel 201f taken at line M-M in FIG. 33.

In the present variation, as illustrated in FIG. 32 through FIG. 35, first engagement-target portion 211c1 and second engagement-target portion 11c2 are formed in recessed portion 10a. Fastener 19 is insertable into first engagement-target portion 211c1. Second engagement-target portion 11c2 includes insertion through-hole 11c3 formed in recessed portion 10a and upright wall 11c4. Second extension portion 128 is insertable inside insertion through-hole 11c3. Upright wall 11c4 is formed on the rear surface of curved portion 11c, which is on the recessed portion 10a side, and is a plate-shaped projection that stands upright from the rear surface. Upright wall 11c4 is capable of engaging with second extension portion 128 inserted in insertion through-hole 11c3. Second engagement-target portion 11c2 is one example of the engagement-target portion.

Core metal 211C according to the present embodiment is exemplified as, but not limited to, including first engagement-target portion 211c1 and second engagement-target portion 11c2. For example, core metal 211C may include second engagement-target portion 11c2 without including a first engagement-target portion. In such cases, electrode structure 220f may include second extension portion 128 without including a first extension portion. Core metal 211C may include first engagement-target portion 211c1 without including a second engagement-target portion. In such cases, electrode structure 220f may include first extension portion 27 without including a second extension portion.

In the present variation as well, extension portion 26 includes first extension portion 27 and second extension portion 128.

First extension portion 27 is fastened to core metal 211C by fastener 19.

As illustrated in FIG. 32 and FIG. 34, second extension portion 128 includes plate-shaped portion 128a that is plate-shaped, and projecting portion 128b that projects from plate-shaped portion 128a to curved portion 11c of core metal 211C. Plate-shaped portion 128a extends in a direction that closes the opening of recessed portion 10a of core metal 211C. In other words, plate-shaped portion 128a extends from first portion 211a of core metal 211C to second portion 211b. In a cross section of steering wheel 201f, projecting portion 128b projects in a direction orthogonal to a direction that closes the opening of core metal 211C. In other words, projecting portion 128b extends from second insulator 222E in a direction orthogonal to a direction extending toward first portion 211a of core metal 211C, and engages curved portion 11c of core metal 211C.

More specifically, claw portion 128c that engages second engagement-target portion 11c2 included in core metal 211C is formed on projecting portion 128b. Projecting portion 128b extends from plate-shaped portion 128a toward curved portion 11c of core metal 211C and is inserted through insertion through-hole 11c3 formed in curved portion 11c of core metal 211C. With this, projecting portion 128b engages core metal 211C by claw portion 128c of projecting portion 128b hooking onto insertion through-hole 11c3.

As illustrated in FIG. 32, on the surface of second extension portion 128 on the opposite side of second extension portion 128 relative to the surface of second extension portion 128 that is adjacent to core metal 211C, first connecting portion 31c of first electrode 31 and second connecting portion 32c of second electrode 32 are disposed spaced apart so as not to be electrically connected. Harness 8a is electrically connected to first connecting portion 31c by solder or a rivet. Harness 8b is electrically connected to second connecting portion 32c by solder or a rivet.

In other words, in the present variation, first connecting portion 31c, second connecting portion 32c, and harnesses 8a and 8b are arranged on the rear surface side of steering wheel 201f (the side that faces the front of vehicle 3).

One or more first extension portions 27 and second extension portions 128 are provided on one electrode structure 220f. In the present variation, two second extension portions 128 are provided on one electrode structure 220f, and claw portions 128c of projecting portions 128b of the two second extension portions 128 face one another. Note that claw portions 128c of the two projecting portions 128b need not face one another, and may face away from one another.

In electrode structure 220f according to the present variation, the insulator includes first insulator 221E and second insulator 222E. First electrode 31 is disposed on first surface 21a of first insulator 221E. Electrode structure 220f further includes: second electrode 32 disposed on second surface 21b of first insulator 221E, which is on the opposite side of first insulator 221E relative to first surface 21a; and second insulator 222E, which is disposed between second electrode 32 and core metal 211C. Second insulator 222E includes extension portion 26 that extends in a direction that closes the opening of core metal 211C, in a cross section of steering wheel 201f taken in a plane perpendicular to the circumferential direction of steering wheel 201f.

This allows first insulator 221E to position first electrode 31 away from second electrode 32 and core metal 211C, by second insulator 222A positioning second electrode 32 away from core metal 211C. With this, since first electrode 31 and second electrode 32 can be disposed on first insulator 221E, the member in which first insulator 221E, first electrode 31, and second electrode 32 are integrated can be easily assembled to core metal 211C.

Projecting portion 128b that projects in a direction orthogonal to a that closes the opening of core metal 211C is formed on extension portion 26, in a cross section of steering wheel 201f taken in a plane perpendicular to the circumferential direction of steering wheel 201f. Claw portion 128c that engages the engagement-target portion (second engagement-target portion 11c2) included in core metal 211C is formed on projecting portion 128b.

With this, since projecting portion 128b engages core metal 211C, electrode structure 220f can be easily and firmly fastened to core metal 211C.

Variation 7 of Embodiment 2

The present variation differs from the electrode structure and steering wheel according to Embodiment 2 and Variations 1 through 6 of Embodiment 2 in that a first engagement-target recessed portion and a second engagement-target recessed portion are not formed in core metal 211 of steering wheel 201h, and a first engagement claw and a second engagement claw are not formed on second insulator 222F. In the present variation, configurations and functions that are the same as the electrode structure and the steering wheel according to Embodiment 2 share the same reference signs, and detailed description related to these configurations and functions will be omitted.

Figure 36:
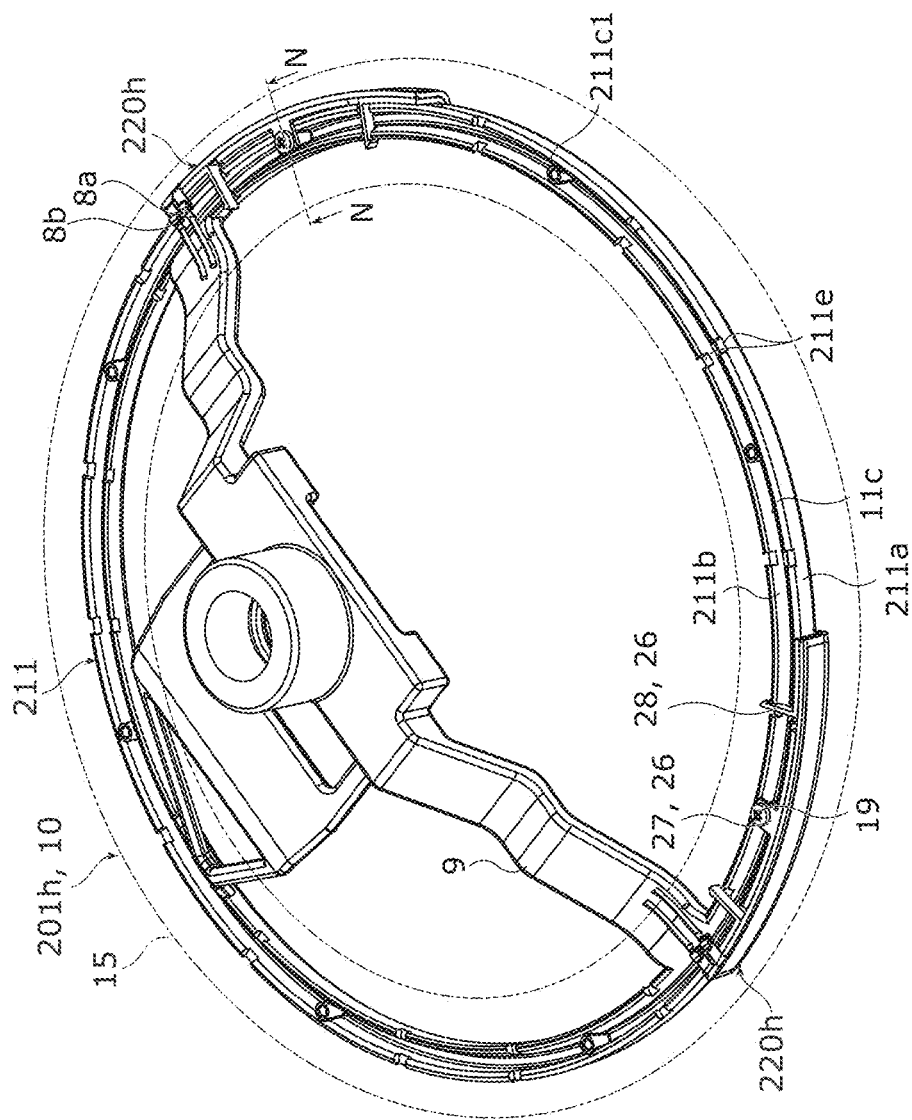
FIG. 36 is a perspective view of a steering wheel according to Variation 7 of Embodiment 2.
Figure 37:
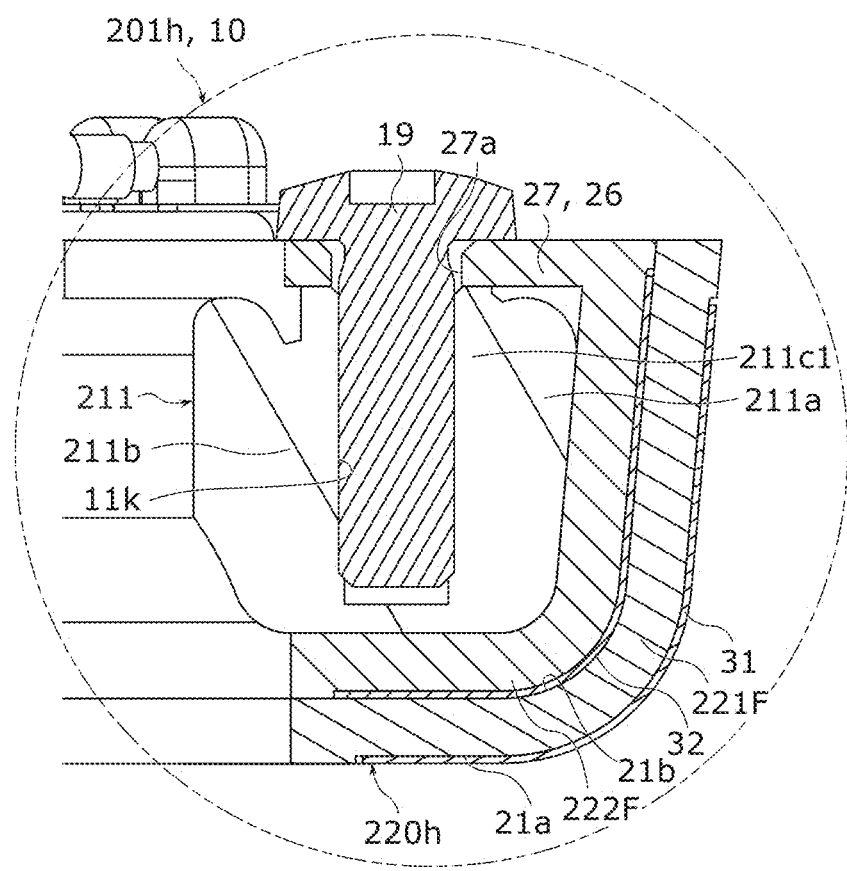
FIG. 37 is a cross-sectional view of a steering wheel taken at line N-N in FIG. 36.

FIG. 36 is a perspective view of steering wheel 201h according to Variation 7 of Embodiment 2. FIG. 37 is a cross-sectional view of steering wheel 201h taken at line N-N in FIG. 36.

As illustrated in FIG. 36 and FIG. 37, first portion 211a, curved portion 11c, and second portion 211b are formed on core metal 211. Engagement-target portion 211e is formed on first portion 211a and second portion 211b. Engagement-target portion 211e engages second extension portion 28 of extension portion 26 on electrode structure 220h. First engagement-target portion 211c1 is formed in recessed portion 10a of core metal 211. First engagement-target portion 211c1 is fastened to first extension portion 27 of extension portion 26 by fastener 19.

Electrode structure 220h includes first insulator 221F, second insulator 222F including extension portion 26, first electrode 31 disposed on first insulator 221F, and second electrode disposed 32 on first insulator 221F.

In the present variation, core metal 211 is exemplified as, but not limited to, including first engagement-target portion 211c1 and engagement-target portion 211e. For example, core metal 211 may include engagement-target portion 211e without including a first engagement-target portion. In such cases, electrode structure 220h may include second extension portion 28 without including a first extension portion. Moreover, core metal 211 may include first engagement-target portion 211c1 without including an engagement-target portion. In such cases, electrode structure 220h may include first extension portion 27 without including a second extension portion.

Embodiment 3

<Configuration: Steering Wheel 301>

The present embodiment differs from the electrode structure and the steering wheel according to, for example, Embodiments 1 and 2 in that a plurality of electrode structures 20 are coupled together and disposed along the circumferential direction of core metal 11. In the present embodiment, configurations and functions that are the same as the electrode structure and the steering wheel according to Embodiments 1 and 2 share the same reference signs, and detailed description related to these configurations and functions will be omitted. Moreover, in the present embodiment, configurations that are the same as in Embodiments 1 and 2 will be described with reference to the figures used for Embodiments 1 and 2.

Figure 38:
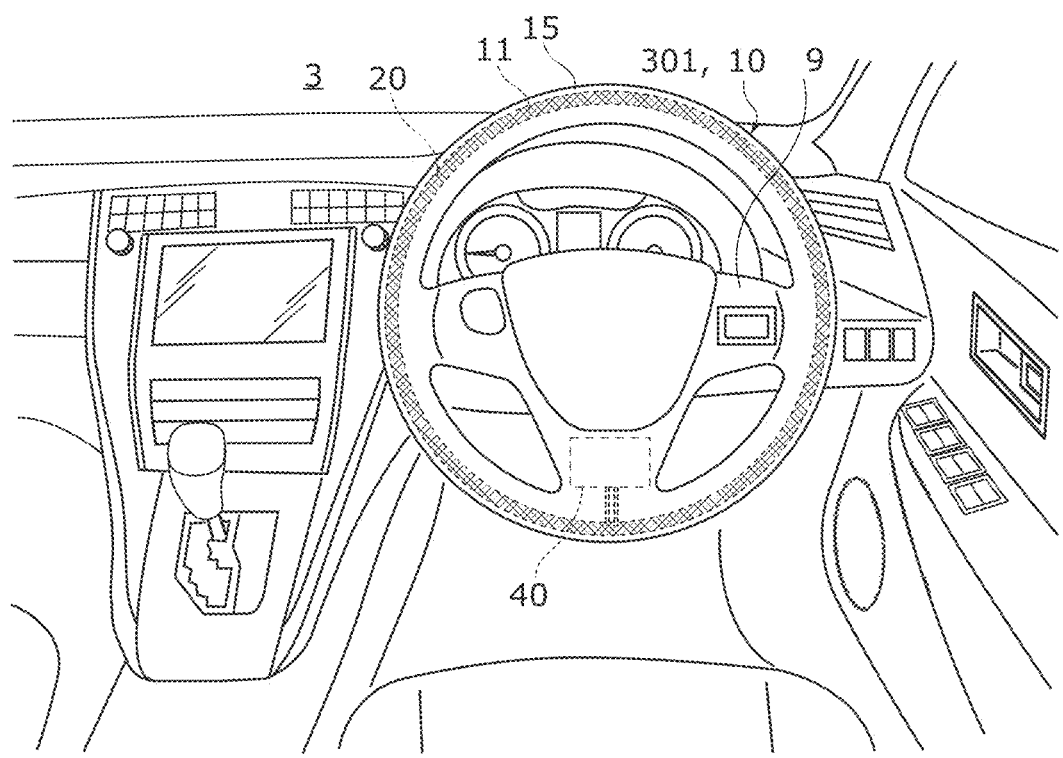
FIG. 38 illustrates a passenger compartment of a vehicle in which a steering wheel according to Embodiment 3 is disposed.

FIG. 38 illustrates a passenger compartment of vehicle 3 in which steering wheel 301 according to Embodiment 3 is disposed.

Figure 39A:
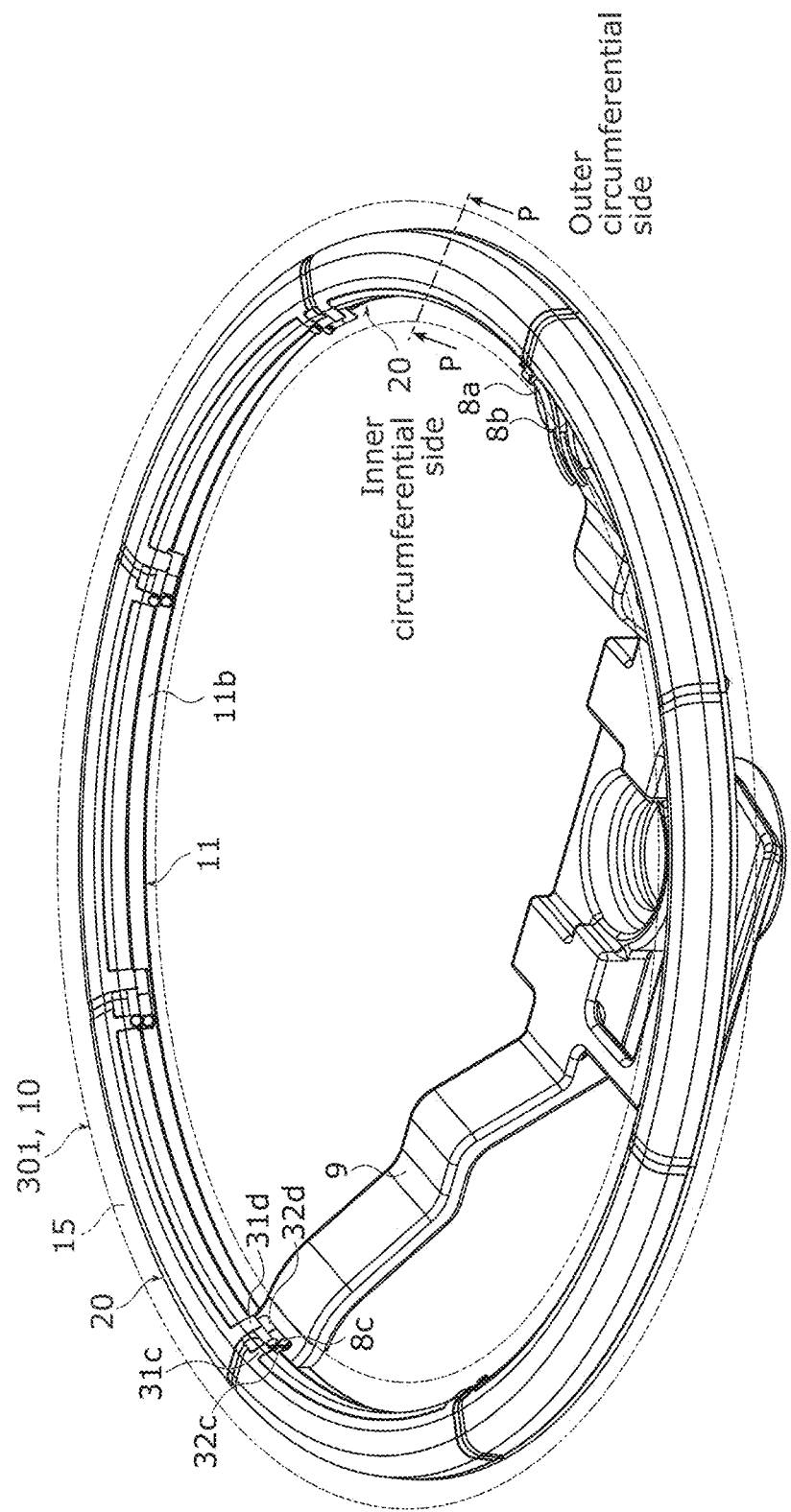
FIG. 39A is a perspective view of a steering wheel according to Embodiment 3.

As illustrated in FIG. 39A, steering wheel 301 imparts a steering angle to, for example, the steering of vehicle 3 illustrated in FIG. 38.

Steering wheel 301 includes rim 10. Rim 10 is integrally formed with T-shaped spoke 9 arranged on the inner circumferential surface of rim 10.

Rim 10 includes core metal 11, electrode structure 20, and foam 15 that covers electrode structure 20.

[Core Metal 11]

Figure 39C:
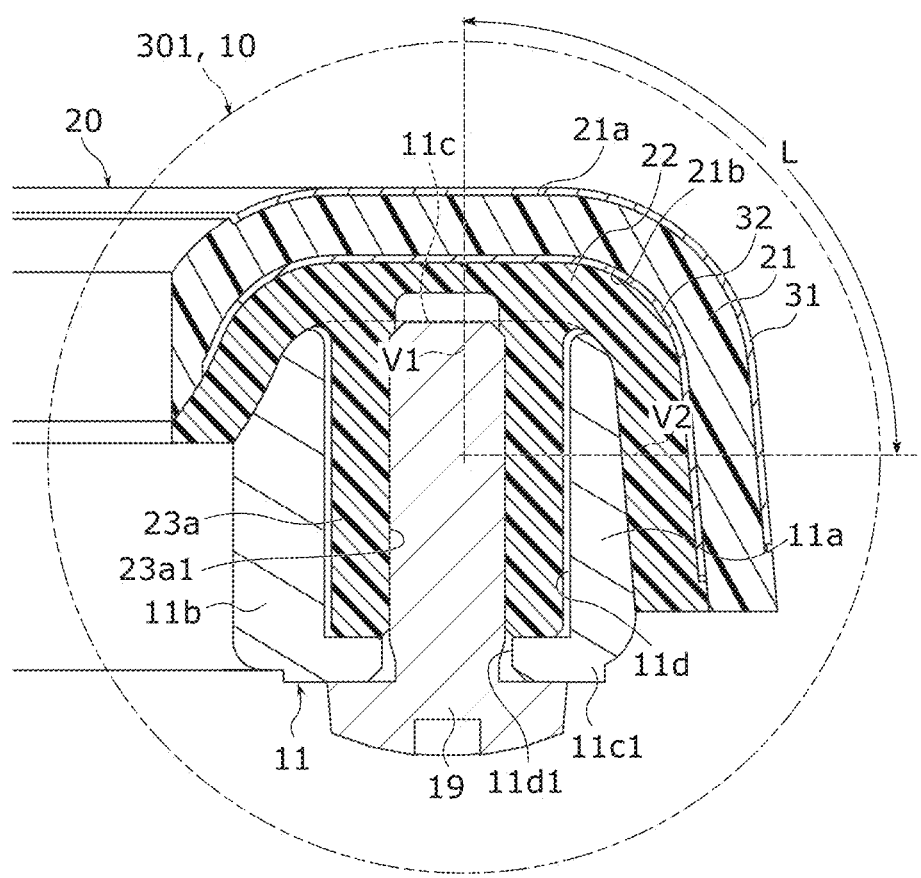
FIG. 39C is a cross-sectional view illustrating a first engagement-target portion and a first engagement portion of the steering wheel taken at line P-P in FIG. 39A.

FIG. 39C is a cross-sectional view illustrating first engagement-target portion 11c1 and first engagement portion 23a of steering wheel 301 taken at line P-P in FIG. 39A.

As illustrated in FIG. 39A and FIG. 39C, core metal 11 is a metal annular core. More specifically, core metal 11 includes annular first portion 11a, annular second portion 11b arranged on the inner circumferential side of first portion 11a, and curved portion 11c that is curved and couples first portion 11a and second portion 11b. One end edge of first portion 11a is coupled to one end edge of curved portion 11c, and one end edge of second portion 11b is coupled to the other end edge of curved portion 11c. Stated differently, in a cross section of core metal 11 taken in a plane perpendicular to the circumferential direction of core metal 11 (hereinafter also referred to as the cross section of core metal 11), curved portion 11c is disposed between first portion 11a and second portion 11b. A cross section of core metal 11 taken in this manner is, for example, U-shaped, V-shaped, J-shaped, or C-shaped. In FIG. 39A, core metal 11 is exemplified as having a U-shaped cross section. In the present embodiment, in a cross section of core metal 11, first portion 11a and second portion 11b are in the shape of a straight line.

Since core metal 11 has, for example, a U-shaped, V-shaped, J-shaped, or C-shaped cross section, first portion 11a, second portion 11b, and curved portion 11c form recessed portion 10a in core metal 11. Recessed portion 10a is formed in an annular shape. In the present embodiment, the opening of recessed portion 10a is formed in rim 10 so as to open toward the front of vehicle 3 (formed so as to open on the side of rim 10 opposite the side that faces the seats).

As illustrated in FIG. 39C, first engagement-target portion 11c1 and second engagement-target portion 11c2 are formed in recessed portion 10a.

First engagement-target portion 11c1 is formed on a rear surface of curved portion 11c, which is on the recessed portion 10a side, and is a cylindrical or round tubular projection that stands upright from the rear surface. Insertion hole 11d, in which fastener 19, such as a screw, and first engagement portion 23a of second insulator 22 are insertable, is formed on the inside of first engagement-target portion 11c1. Screw hole 11d1, in which fastener 19 is insertable, is formed on the bottom of first engagement-target portion 11c1, stated differently, the leading end of first engagement-target portion 11c1.

As illustrated in FIG. 4 and FIG. 5 in Embodiment 1, in the present embodiment as well, second engagement-target portion 11c2 includes insertion through-hole 11c3 and upright wall 11c4 formed in recessed portion 10a. Second insulator 22 and second engagement portion 23b are insertable inside insertion through-hole 11c3. Upright wall 11c4 is formed on the rear surface of curved portion 11c, which is on the recessed portion 10a side, and is a plate-shaped projection that stands upright from the rear surface. Upright wall 11c4 is capable of engaging with second engagement portion 23b inserted in insertion through-hole 11c3.

Core metal 11 according to the present embodiment is exemplified as, but not limited to, including first engagement-target portion 11c1 and second engagement-target portion 11c2. FIG. 39B is a perspective view of electrode structure 20m that does not include a first engagement portion, and core metal 11m that does not include a first engagement-target portion. For example, as illustrated in FIG. 39B, core metal 11m may include second engagement-target portion 11c2 without including a first engagement-target portion. In such cases, although not illustrated, electrode structure 20m may include second engagement portion 23b without including a first engagement portion. Moreover, core metal 11m may include first engagement-target portion 11c1 without including a second engagement-target portion. In such cases, electrode structure 20 may include first engagement portion 23a without including a second engagement portion.

[Electrode Structure 20]

As illustrated in FIG. 38, FIG. 39A, and FIG. 39C, electrode structure 20 is used in a device that detects the driver's hand gripping steering wheel 301. More specifically, to facilitate detection of the driver's grip on steering wheel 301, electrode structure 20 is disposed on the outer circumference of core metal 11 of steering wheel 301 provided in vehicle 3. Even more specifically, electrode structure 20 is provided on core metal 11 so as to cover a region from the outer circumferential side to the inner circumferential side of core metal 11, spanning from first portion 11a to second portion 11b through curved portion 11c of core metal 11. Stated differently, a plurality of electrode structures 20 are provided on core metal 11 so as to cover core metal 11, excluding recessed portion 10a of core metal 11.

Control circuit 40, which is capable of detecting the driver's hand gripping steering wheel 301, is connected to electrode structure 20. When rim 10 is gripped by the driver's hand, the capacitance between the electrode of electrode structure 20 and the hand changes. Control circuit 40 detects the grip from the electrode of electrode structure 20 based on an output signal in which the capacitance has changed. More specifically, control circuit 40 measures the capacitance of the electrode or a value (amount of change) corresponding to the capacitance, and detects the driver's hand gripping rim 10 based on the value. Such control circuit 40 is configured by a dedicated circuit or a general-purpose processor. Control circuit 40 is embedded in spoke 9 of FIG. 38, for example.

Electrode structure 20 is disposed in steering wheel 301 illustrated in FIG. 39A that is provided in vehicle 3. In the present embodiment, electrode structure 20 is embedded in rim 10 of steering wheel 301.

More specifically, electrode structure 20 includes first insulator 21, second insulator 22, first electrode 31, and second electrode 32.

First insulator 21 is arranged along the outer circumferential side surface of core metal 11, and is spaced apart from the surface of core metal 11. Here, the outer circumferential side surface of core metal 11 is, in a view of the whole annular core metal 11, the surface on the opposite side of core metal 11 relative to the inner circumferential side surface of core metal 11 on which spoke 9 is disposed.

First insulator 21 includes first surface 21a and second surface 21b on opposite sides. Second surface 21b is the surface facing core metal 11. First electrode 31 is disposed on first surface 21a, and second electrode 32 is disposed on second surface 21b. Stated differently, first insulator 21 is sandwiched between first electrode 31 and second electrode 32. First insulator 21 can thus arrange first electrode 31 and second electrode 32 so as to be spaced apart from one another and to overlap one another. In other words, first insulator 21 can arrange first electrode 31 and second electrode 32 so that first electrode 31 and second electrode 32 are not electrically connected.

First insulator 21 is made of a resin material such as a hard plastic such as polycarbonate, polybutylene terephthalate, or the like.

First insulator 21 has a certain thickness. A "certain thickness" means, for example, that first insulator 21 has a thickness of approximately a few millimeters. Since first insulator 21 has a certain thickness, first insulator 21 is rigid.

First insulator 21 and second electrode 32 are supported by second insulator 22 and are disposed spaced apart from core metal 11 by a predetermined distance. Stated differently, second electrode 32, which is disposed between first insulator 21 and second insulator 22, is disposed spaced apart from core metal 11 by a predetermined distance by second insulator 22. In other words, second insulator 22 is disposed between first insulator 21 and second electrode 32 on one side and core metal 11 on the other.

Second insulator 22 is disposed between second electrode 32 and core metal 11, overlaps with first insulator 21, first electrode 31, and second electrode 32, and is covered by first insulator 21, first electrode 31 and second electrode 32. Second insulator 22 is disposed along the surface on the outer circumferential side of core metal 11, in contact with the surface on the outer circumferential side of core metal 11. In other words, second insulator 22 can arrange second electrode 32 so that second electrode 32 and core metal 11 are not electrically connected. First insulator 21 and/or second insulator 22 are collectively referred to as the insulator, stated differently, first insulator 21 and/or second insulator 22 are included in the insulator.

As illustrated in FIG. 39C as well as in FIG. 4 and FIG. 5 in Embodiment 1, in a cross section of steering wheel 301 taken in a plane perpendicular to the circumferential direction of steering wheel 301 (hereinafter also referred to as the cross section of steering wheel 301), second insulator 22 includes first engagement portion 23a that engages first engagement-target portion 11c1 included in core metal 11, and second engagement portion 23b that engages second engagement-target portion 11c2 included in core metal 11. First engagement portion 23a and second engagement portion 23b are included in the engagement portion.

First engagement portion 23a engages first engagement-target portion 11c1 of core metal 11. More specifically, first engagement portion 23a can engage first engagement-target portion 11c1 by being inserted inside first engagement-target portion 11c1. In other words, first engagement portion 23a is a cylindrical or round tubular portion that stands upright from the surface of second insulator 22 facing core metal 11, and is fixed to first engagement-target portion 11c1 by being fitted inside first engagement-target portion 11c1.

First engagement portion 23a is a cylindrical or round tubular portion, but includes fastener hole 23a1 that corresponds to screw hole 11d1 of first engagement-target portion 11c1. In other words, first engagement portion 23a can be fastened with fastener 19 by inserting fastener 19 inserted through screw hole 11d1 of first engagement-target portion 11c1 into fastener hole 23a1 of first engagement portion 23a.

Second engagement portion 23b includes engagement claw 23b1 that engages second engagement-target portion 11c2 of core metal 11. More specifically, second engagement portion 23b includes engagement claw 23b1 that is inserted in insertion through-hole 11c3 of second engagement-target portion 11c2 and can engage upright wall 11c4 of second engagement-target portion 11c2. In other words, second engagement portion 23b is a rod-shaped or plate-shaped portion that stands upright from the surface of second insulator 22 facing core metal 11, and when inserted in insertion through-hole 11c3 of second engagement-target portion 11c2, engagement claw 23b1 of second engagement portion 23b hooks onto upright wall 11c4 of second engagement-target portion 11c2.

One or more first engagement portions 23a and one or more second engagement portions 23b are disposed on second insulator 22. A plurality of first engagement-target portions 11c1 and a plurality of second engagement-target portions 11c2 may be formed on core metal 11 in accordance with the number of first engagement portions 23a and second engagement portions 23b. First engagement portion 23a, second engagement portion 23b, first engagement-target portion 11c1, and second engagement-target portion 11c2 may be disposed at approximately equal intervals on rim 10.

Second insulator 22 is made of a resin material such as a hard plastic such as polycarbonate, polybutylene terephthalate, or the like.

Second insulator 22 has a certain thickness. A "certain thickness" means, for example, that second insulator 22 has a thickness of approximately a few millimeters. Since second insulator 22 has a certain thickness, second insulator 22 is rigid.

First electrode 31, second electrode 32, first insulator 21, and second insulator 22 may be integrally formed, and, alternatively, may be formed as individual separable elements.

First electrode 31 includes metal plating, a metal sheet, or a metal plate. When first electrode 31 is a metal sheet or a metal plate, the metal sheet or the metal plate is attached to first surface 21a of first insulator 21 by an adhesive or the like. First electrode 31 is, for example, a metal containing copper or aluminum or the like.

First electrode 31 is disposed on first surface 21a of first insulator 21. First surface 21a is the surface on the opposite side of first insulator 21 relative to the surface of first insulator 21 that faces core metal 11 of steering wheel 301. Here, the surface of first insulator 21 that faces core metal 11 is second surface 21b, which faces core metal 11 with second insulator 22 and second electrode 32 disposed therebetween. In other words, first electrode 31 is disposed spaced apart from core metal 11 and second electrode 32.

As illustrated in FIG. 6 of Embodiment 1, in the present embodiment as well, an AC voltage is applied to first electrode 31. The AC voltage applied to first electrode 31 is generated in control circuit 40 by power supplied from power supply 41. Here, since first electrode 31 is disposed on first surface 21a of first insulator 21, when the part of rim 10 where first electrode 31 is disposed is gripped by the driver's hand, a capacitance is formed between first electrode 31 and the driver's hand. Control circuit 40 can therefore detect the driver's hand gripping rim 10 based on the change in capacitance.

First electrode 31 and second electrode 32 are electrically connected to harnesses 8a and 8b.

As illustrated in FIG. 39A, harness 8a is electrically connected to each first electrode 31 of electrode structure 20. Harness 8a may be electrically connected to first electrode 31 by being soldered to first electrode 31. Harness 8a may be electrically connected to first electrode 31 by being crimped with rivet 8c to first electrode 31.

Harness 8b is electrically connected to each second electrode 32 of electrode structure 20. Harness 8b may be electrically connected to second electrode 32 by being soldered to second electrode 32. Harness 8b may be electrically connected to second electrode 32 by being crimped with rivet 8c to second electrode 32.

FIG. 39A illustrates an example in which first connecting portions 31c and 31d of two adjacent first electrodes 31 are fastened by, for example, rivet 8c, and second connecting portions 32c and 32d of two adjacent second electrodes 32 are fastened by, for example, rivet 8c.

Here, control circuit 40 in FIG. 6 can apply AC voltage to first electrode 31 and second electrode 32 via harnesses 8a and 8b.

The capacitance between first electrode 31 and core metal 11 can be canceled out or reduced by applying an AC voltage having the same phase to first electrode 31 and second electrode 32. Accordingly, control circuit 40 can accurately detect the capacitance formed between first electrode 31 and the driver's hand.

Second electrode 32 includes metal plating, a metal sheet, or a metal plate. When second electrode 32 is a metal sheet or a metal plate, the metal sheet or the metal plate is attached to second surface 21b of first insulator 21 by an adhesive or the like. Second electrode 32 is, for example, a metal containing copper or aluminum or the like.

When first electrode 31 and second electrode 32 are formed using metal plating, as illustrated in FIG. 5 of Embodiment 1, since hole 22f is formed in the base of second engagement portion 23b in second insulator 22, hole 22f of second insulator 22 may be masked and the area of first surface 21a of first insulator 21 corresponding to hole 22f may be masked as well. With this, except for hole 22f, second electrode 32 can be formed on the surface of second insulator 22 on the first insulator 21 side, and except for the area corresponding to hole 22f, first electrode 31 can be formed on first surface 21a of first insulator 21. Stated differently, second electrode 32 is not formed on hole 22f of second insulator 22, and first electrode 31 is not formed on the area of first surface 21a of first insulator 21 that corresponds to hole 22f. As another method, first electrode 31 may be formed by metal plating first surface 21a of first insulator 21, and second electrode 32 may be formed by metal plating second surface 21b of first insulator 21.

Second electrode 32 is disposed on second surface 21b of first insulator 21. Second surface 21b is on the opposite side of first insulator 21 relative to first surface 21a. More specifically, second electrode 32 is disposed along second surface 21b of first insulator 21 so as to sandwich first insulator 21 with first electrode 31. Since second electrode 32 is sandwiched by first insulator 21 and second insulator 22, second electrode 32 can be said to be disposed on the surface of second insulator 22 that faces first insulator 21. In other words, second electrode 32 is disposed spaced apart from core metal 11 and first electrode 31. For this reason, second electrode 32 is not electrically connected to core metal 11 or first electrode 31.

In addition, an AC voltage having the same phase as the AC voltage applied to first electrode 31 is applied to second electrode 32. The AC voltage applied to second electrode 32 is generated in control circuit 40 illustrated in FIG. 38.

As illustrated in FIG. 39A, in first electrode 31 and second electrode 32, when first electrode 31 and second electrode 32 are viewed so as to overlap, first electrode 31 is covered by the whole of second electrode 32, and the surface area of coverage of second surface 21b by second electrode 32 is greater than the surface area of coverage of first surface 21a by first electrode 31. For this reason, second electrode 32 can inhibit the formation of capacitance between first electrode 31 and core metal 11.

In a cross section of steering wheel 301 taken in a plane perpendicular to the circumferential direction of rim 10 of steering wheel 301 (hereinafter also referred to as the cross section of rim 10), first insulator 21, second insulator 22, first electrode 31, and second electrode 32 are disposed at least in the range from the outer circumferential side portion of rim 10 of steering wheel 301 to the portion of rim 10 facing the rear of vehicle 3.

In the present embodiment, first insulator 21, second insulator 22, first electrode 31, and second electrode 32 are disposed along the circumferential direction of the cross section of rim 10 over a range of at least $\frac{1}{4}^{th}$ of the circumference. As illustrated in FIG. 39C, first insulator 21, first electrode 31, and second electrode 32 are disposed over a range greater than range L between the two straight lines V1 and V2 made of long dashes broken by two short dashes. More specifically, first insulator 21, second insulator 22, first electrode 31, and second electrode 32 are disposed spanning from first portion 11a to second portion 11b through curved portion 11c of rim 10. In this way, first insulator 21, first electrode 31, and second electrode 32 are disposed in locations easily contacted by the driver's hand when the driver's hand grips rim 10, whereby the driver's hand gripping steering wheel 301 can be accurately detected by electrode structure 20.

[Foam 15]

As illustrated in FIG. 39A, foam 15 is the portion that the driver grips with their hand, and forms the outer shell of rim 10 on steering wheel 301. Foam 15 is made of a resin material such as a urethane resin such as polyurethane, and covers electrode structure 20. First insulator 21, second insulator 22, first electrode 31, second electrode 32, and core metal 11 are embedded in foam 15. In other words, first insulator 21, second insulator 22, first electrode 31, second electrode 32, and core metal 11 are covered by foam 15 so as not to be exposed.

In the present embodiment, as illustrated in FIG. 39A, a plurality of electrode structures 20 are provided along the circumferential direction of core metal 11. Although eight electrode structures 20 are used in the present embodiment, seven or fewer, or nine or more electrode structures 20 may be used. Moreover, the entire circumference of core metal 11 need not be covered by electrode structures 20.

As illustrated in FIG. 12 and FIG. 13 in Embodiment 1, in the present embodiment as well, first coupling portion 25a and first coupling-target portion 25b are formed on each first insulator 21 of the plurality of electrode structures 20. In FIG. 13, among two adjacent electrode structures 20 included in the plurality of electrode structures 20, one electrode structure 20 is referred to as first electrode structure 121 and the other electrode structure 20 is referred to as second electrode structure 122. Each of first electrode structure 121 and second electrode structure 122 includes first coupling portion 25a and first coupling-target portion 25b. Here, first coupling portion 25a is one example of the coupling portion. First coupling-target portion 25b is one example of the coupling-target portion.

First coupling portion 25a is formed on one end of first insulator 21 of first electrode structure 121 and, although omitted in the figure, formed on one end of first insulator 21 of second electrode structure 122. First coupling-target portion 25b is formed on the other end of first insulator 21 of first electrode structure 121 although omitted in the figure, and formed on the other end of first insulator 21 of second electrode structure 122.

First coupling portion 25a couples with first coupling-target portion 25b of first insulator 21 of second electrode structure 122, which is the electrode structure 20 adjacent to first electrode structure 121. First coupling portion 25a is a protruding portion that protrudes from the end edge at one end of first insulator 21 in the circumferential direction of first electrode structure 121. As illustrated in FIG. 13 in Embodiment 1, in the present embodiment as well, first coupling portion 25a is a pin-shaped protruding portion. First coupling portion 25a may be a claw-shaped protruding portion.

First coupling-target portion 25b of second electrode structure 122 couples with first coupling portion 25a of first insulator 21 in first electrode structure 121. First coupling-target portion 25b is a recessed portion that recedes from the end edge at the other end of first insulator 21 in the circumferential direction of second electrode structure 122. When first coupling portion 25a is configured as a pin-shaped protruding portion, first coupling-target portion 25b is a recessed portion into which the pin-shaped protruding portion is insertable. First coupling-target portion 25b may be a recessed portion including a hooking part on which the claw-shaped first coupling portion 25a can hook.

As illustrated in FIG. 12 and FIG. 13 of Embodiment 1, in the present embodiment as well, second coupling portion 24a is formed on the other end of second insulator 22 of first electrode structure 121 although omitted in the figure, and formed on the other end of second insulator 22 of second electrode structure 122. Second coupling-target portion 24b is formed on one end of second insulator 22 of first electrode structure 121 and, although omitted in the figure, formed on one end of second insulator 22 of second electrode structure 122. Here, second coupling portion 24a is one example of the coupling portion. Second coupling-target portion 24b is one example of the coupling-target portion.

Second coupling portion 24a of second electrode structure 122 couples with second coupling-target portion 24b of second insulator 22 of first electrode structure 121. Second coupling portion 24a is a protruding portion that protrudes from the end edge at the other end of second insulator 22 in the circumferential direction of second electrode structure 122. In FIG. 13, second coupling portion 24a is a claw-shaped protruding portion. Second coupling portion 24a may be a pin-shaped protruding portion.

Second coupling-target portion 24b of first electrode structure 121 couples with second coupling portion 24a of second insulator 22 of second electrode structure 122. Second coupling-target portion 24b is a recessed portion that recedes from the end edge at one end of second insulator 22 in the circumferential direction of first electrode structure 121. In FIG. 12, second coupling-target portion 24b may be a recessed portion including hooking part 24b1 on which the claw-shaped second coupling portion 24a can hook. When second coupling portion 24a is a pin-shaped protruding portion, second coupling-target portion 24b may be a recessed portion in which the pin-shaped protruding portion is insertable.

In this way, first coupling portion 25a that couples with first coupling-target portion 25b of second electrode structure 122 is formed on the end portion at one end of first insulator 21 of first electrode structure 121, and first coupling-target portion 25b that couples with first coupling portion 25a of another, adjacent electrode structure 20 is formed on the end portion at the other end of first insulator 21 of first electrode structure 121. Second coupling-target portion 24b that couples with second coupling portion 24a of second electrode structure 122 is formed on the end portion at one end of second insulator 22 of first electrode structure 121, and second coupling portion 24a that couples with second coupling-target portion 24b of another, adjacent electrode structure 20 is formed on the end portion at the other end of second insulator 22 of first electrode structure 121. With this, by coupling second coupling-target portion 24b of first electrode structure 121 to second coupling portion 24a of second electrode structure 122, and coupling first coupling portion 25a of first electrode structure 121 to first coupling-target portion 25b of second electrode structure 122, a plurality of coupled electrode structures 20 can be attached to core metal 11 along the circumferential direction of core metal 11.

In the present embodiment, first coupling portion 25a, second coupling portion 24a, first coupling-target portion 25b, and second coupling-target portion 24b may be provided on one or the other end of electrode structure 20.

As the means for connecting two adjacent electrodes is the same as described in Embodiment 1 and illustrated in FIG. 14A through FIG. 14D, FIG. 17A, and FIG. 17B, repeated description will be omitted.

<Method for Manufacturing Steering Wheel 301>

As the flowchart for this manufacturing method is the same as FIG. 7 of Embodiment 1, the manufacturing method will be described with reference to FIG. 7.

First, as illustrated in FIG. 7, a worker prepares core metal 11 and a plurality of electrode structures 20. The worker engages, in one to one correspondence, the coupling portion and the coupling-target portion of an other first insulator 21 and an other second insulator 22 disposed adjacent to first insulator 21 and second insulator 22 of electrode structure 20 in the circumferential direction of steering wheel 301, and engages, in one to one correspondence, the coupling-target portion of the other first insulator 21 and the coupling portion of the other second insulator 22 to the coupling portion included in first insulator 21 and the coupling-target portion included in second insulator 22. More specifically, the worker engages, to first coupling portion 25a included in first insulator 21 and second coupling-target portion 24b included in second insulator 22 of first electrode structure 121 among the plurality of electrode structures 20, first coupling-target portion 25b included in first insulator 21 and second coupling portion 24a included in second insulator 22 of second electrode structure 122, which is another electrode structure 20 disposed adjacent to the above-mentioned electrode structure 20 in the circumferential direction of steering wheel 301. This couples a plurality of electrode structures 20 together into one unit. The engagement portion included in the plurality of electrode structure 20 is caused to engage the engagement-target portion included in core metal 11, fastener 19 is inserted in fastener hole 23a1, and the engagement portion is fastened to core metal 11. With this, the plurality of electrode structures 20 are assembled to core metal 11 (S11: assemble step). First engagement-target portion 11c1 of core metal 11 engages first engagement portion 23a of second insulator 22. In other words, first engagement portion 23a is caused to engage first engagement-target portion 11c1, and first engagement portion 23a and first engagement-target portion 11c1 are fastened together by fastener 19 inserted in screw hole 11d1 of first engagement-target portion 11c1 and fastener hole 23a1 of first engagement portion 23a. Second engagement-target portion 11c2 of core metal 11 engages second engagement portion 23b of second insulator 22. In other words, engagement claw 23b1 of second engagement portion 23b included in the plurality of electrode structure 20 is caused to engage second engagement-target portion 11c2 provided on core metal 11. This yields a structure in which a plurality of electrode structure 20 are fastened to core metal 11.

Next, the structure is fixed in the cavity of a mold and the mold is clamped. In other words, the structure is covered using foam 15 while the plurality of electrode structures 20 and core metal 11 are fastened together. In other words, injection molding resin is poured into the cavity in the mold through a gate formed in the mold to form foam 15 that covers the structure (S12: injection step). The injection molding resin is a resin material of a urethane resin such as polyurethane and the like.

In this way, foam 15 can cover the plurality of electrode structures 20 and core metal 11 while the plurality of electrode structures 20 are engaged with core metal 11. This yields steering wheel 301.

Advantageous Effects

Next, the advantageous effects of electrode structure 20, steering wheel 301, and the method for manufacturing steering wheel 301 according to the present embodiment will be described.

Electrode structure 20 according to the present embodiment is disposed on the outer circumference of core metal 11 of steering wheel 301 provided in vehicle 3, and includes an insulator (first insulator 21 and/or second insulator 22) and first electrode 31 disposed on first surface 21a of the insulator, which is the surface on the opposite side of the insulator relative to the surface of the insulator that faces core metal 11 of steering wheel 301. The insulator includes a coupling portion (first coupling portion 25a and/or second coupling portion 24a) that couples with an other insulator disposed adjacent to the insulator in the circumferential direction of steering wheel 301.

With this, since the coupling portion of an insulator can be coupled with another adjacent insulator, a plurality of electrode structures 20 can be easily assembled to core metal 11 while coupled together. This also makes it possible to easily change (increase or decrease the size of) the region in which the driver's hand gripping steering wheel 301 by fixing a plurality of electrode structures 20 along the circumferential direction of steering wheel 301.

If electrode structure 20 is assembled to core metal 11, when forming steering wheel 301, electrode structure 20 can be arranged in the correct position inside steering wheel 301, and electrode structure 20 can be arranged in a given, precise position. For this reason, unlike the conventional technique, it is not necessary to make a notch in steering wheel 301 after forming steering wheel 301 to dispose first electrode 31 and second electrode 32.

Therefore, owing to electrode structure 20, an increase in the manufacturing cost of steering wheel 301 can be inhibited without compromising the appearance of steering wheel 301, and furthermore, it is possible to change the range in which the driver's hand gripping steering wheel 301 is detected.

In particular, in the conventional technique, when a notch is made in the steering wheel after forming the steering wheel to dispose the first electrode and the second electrode, steps are necessary for making the notch and inserting the first electrode and the second electrode inside the steering wheel. Accordingly, the conventional steering wheel technique includes added steps of making the notch and inserting the conductors of the sensor. However, in contrast to this conventional steering wheel, with electrode structure 20, steps related to manufacturing steering wheel 301 are inhibited from increasing, which inhibits an increase in the manufacturing cost of steering wheel 301.

If electrode structure 20 is fixed to core metal 11, the posture of electrode structure 20 relative to core metal 11 can be firmly supported. For this reason, when steering wheel 301 is resin-molded, electrode structure 20 can be assembled to steering wheel 301 with certainty. For this reason, it is possible to inhibit the insulator from being displaced with respect to core metal 11 or being rotationally displaced with respect to the circumferential direction of steering wheel 301 due to pressure at the time of resin molding steering wheel 301. This consequently inhibits an increase in the processes related to the manufacturing of steering wheel 301 and inhibits an increase in manufacturing cost.

In electrode structure 20 according to the present embodiment, the insulator includes a coupling portion (first coupling portion 25a and/or second coupling portion 24a) that couples with an other insulator disposed adjacent to the insulator in the circumferential direction of steering wheel 301.

This electrode structure 20 also has the same advantageous effects as described above.

Steering wheel 301 according to the present embodiment includes electrode structure 20, core metal 11, and foam 15 that covers electrode structure 20.

Steering wheel 301 configured in this manner also has the same advantageous effects as described above.

The method for manufacturing steering wheel 301 according to the present embodiment includes: engaging, to the coupling portion (first coupling portion 25a) included in first insulator 21 and the coupling portion (second coupling-target portion 24b) included in second insulator 22 of electrode structure 20, in one to one correspondence, the engagement-target portion of another first insulator 21 and the coupling portion of another second insulator 22 disposed adjacent to first insulator 21 and second insulator 22 of the above-mentioned electrode structure 20 in the circumferential direction of steering wheel 301, and covering electrode structure 20 using foam 15 while the coupling-target portion of the other first insulator 21 and the coupling portion of the other second insulator 22 are coupled in one to one correspondence to the coupling portion included in first insulator 21 and the coupling-target portion included in second insulator 22.

With this, since the coupling portion of first insulator 21 and the coupling-target portion of second insulator 22 can be coupled in one to one correspondence with the couple portion of another adjacent first insulator 21 and the coupling portion of another adjacent second insulator 22, a plurality of electrode structures 20 can be easily assembled to core metal 11 while coupled together. If the plurality of electrode structures 20 are fixed to core metal 11, it is possible to inhibit first insulator 21 and second insulator 22 from being displaced with respect to core metal 11 or being rotationally displaced with respect to the circumferential direction of steering wheel 301 due to pressure at the time of resin molding steering wheel 301. This method for manufacturing steering wheel 301 also has the same advantageous effects as described above.

In electrode structure 20 according to the present embodiment, the insulator includes first insulator 21 and second insulator 22, and first electrode 31 is disposed on first surface 21a of first insulator 21. Electrode structure 20 further includes: second electrode 32 disposed on second surface 21b of first insulator 21, which is on the opposite side of first insulator 21 relative to first surface 21a; and second insulator 22, which is disposed between second electrode 32 and core metal 11. Second insulator 22 includes a coupling portion (second coupling portion 24a) that couples with another second insulator 22 disposed adjacent to second insulator 22 in the circumferential direction of steering wheel 301.

With this, since the coupling portion of first insulator 21 and the coupling-target portion of second insulator 22 can be coupled in one to one correspondence with the couple portion of another adjacent first insulator 21 and the coupling portion of another adjacent second insulator 22, a plurality of electrode structures 20 can be firmly coupled together. This also makes it possible to easily assemble the plurality of electrode structures 20 to core metal 11 while coupled together.

In electrode structure 20, second insulator 22 further includes a coupling-target portion (second coupling-target portion 24b) formed on an end edge at one end in the circumferential direction of steering wheel 301. A coupling portion (second coupling portion 24a) is formed on the end edge at the other end of second insulator 22 in the circumferential direction of steering wheel 301, and is claw-shaped so as to couple with the coupling-target portion of another second insulator 22.

With this, second coupling portion 24a hooks onto the coupling-target portion by coupling the coupling portion of second insulator 22 and the coupling-target portion of another second insulator 22 disposed adjacent to the second insulator 22. Accordingly, second insulator 22 and another second insulator 22 can be easily and firmly coupled together. This makes it possible to unitarily couple two adjacent electrode structures 20. This also makes it possible to easily assemble the plurality of electrode structures 20 to core metal 11 while coupled together.

In electrode structure 20 according to the present embodiment, first insulator 21 includes a coupling portion (first coupling portion 25a) that couples with another first insulator 21 disposed adjacent to second first insulator 21 in the circumferential direction of steering wheel 301.

With this, since the coupling portion of first insulator 21 can be coupled with another adjacent first insulator 21, a plurality of electrode structures 20 can be easily assembled to core metal 11 while coupled together. This also makes it possible to easily assemble the plurality of electrode structures 20 to core metal 11 while coupled together.

In electrode structure 20 according to the present embodiment, first insulator 21 further includes a coupling-target portion (first coupling-target portion 25b) formed on an end edge at the other end in the circumferential direction of steering wheel 301. The coupling portion is formed on the end edge at one end of first insulator 21 in the circumferential direction of steering wheel 301, and is a protruding portion that couples with the coupling-target portion of another first insulator 21.

With this, by coupling the coupling portion of first insulator 21 with the coupling-target portion of another first insulator 21 adjacent to first insulator 21, the coupling portion and the coupling-target portion can easily be coupled. Accordingly, it possible to unitarily and more firmly couple two adjacent electrode structures 20. This also makes it possible to easily assemble the plurality of electrode structures 20 to core metal 11 while coupled together.

In electrode structure 20 according to the present embodiment, in a cross section of steering wheel 301 taken in a plane perpendicular to a circumferential direction of steering wheel 301, first insulator 21, second insulator 22, first electrode 31, and second electrode 32 are disposed at least in a range from an outer circumferential side of steering wheel 301 to an inner circumferential side of steering wheel 301.

With this, electrode structure 20 can be disposed at a position where the driver's hand easily comes into contact with the surface of steering wheel 301 when the driver grips steering wheel 301 with their hand. For this reason, the grip by the driver's hand can be detected.

In electrode structure 20 according to the present embodiment, first insulator 21 comprises a resin material. Second insulator 22 comprises a resin material. First electrode 31 includes metal plating, a metal sheet, or a metal plate. Second electrode 32 includes metal plating, a metal sheet, or a metal plate.

With this, since first electrode 31 and second electrode 32 can be disposed on first insulator 21, the member in which the insulator, first electrode 31, and second electrode 32 are integrated can be easily assembled to core metal 11. Furthermore, since second insulator 22 is disposed between first insulator 21 and second electrode 32 on one side and core metal 11 on the other, second insulator 22 can dispose first electrode 31 so as to be spaced apart from core metal 11.

In electrode structure 20 according to the present embodiment, an AC voltage having the same phase as the AC voltage applied to second electrode 32 is applied to first electrode 31.

According to this, the capacitance formed between first electrode 31 and core metal 11 can be canceled or reduced. Accordingly, if control circuit 40 for detecting the driver's hand gripping steering wheel 301 is used, control circuit 40 will be able to accurately detect the capacitance formed between first electrode 31 and the driver's hand that generates when the driver's hand grips steering wheel 301.

Variation 1 of Embodiment 3

The present variation differs from the electrode structure and the steering wheel according to Embodiment 3 in that, for example, electrode structure 320a and second insulator 322 of steering wheel 301a include one or more extension portions 26. In the present variation, configurations and functions that are the same as the electrode structure and the steering wheel according to Embodiment 3 share the same reference signs, and detailed description related to these configurations and functions will be omitted.

Figure 40:
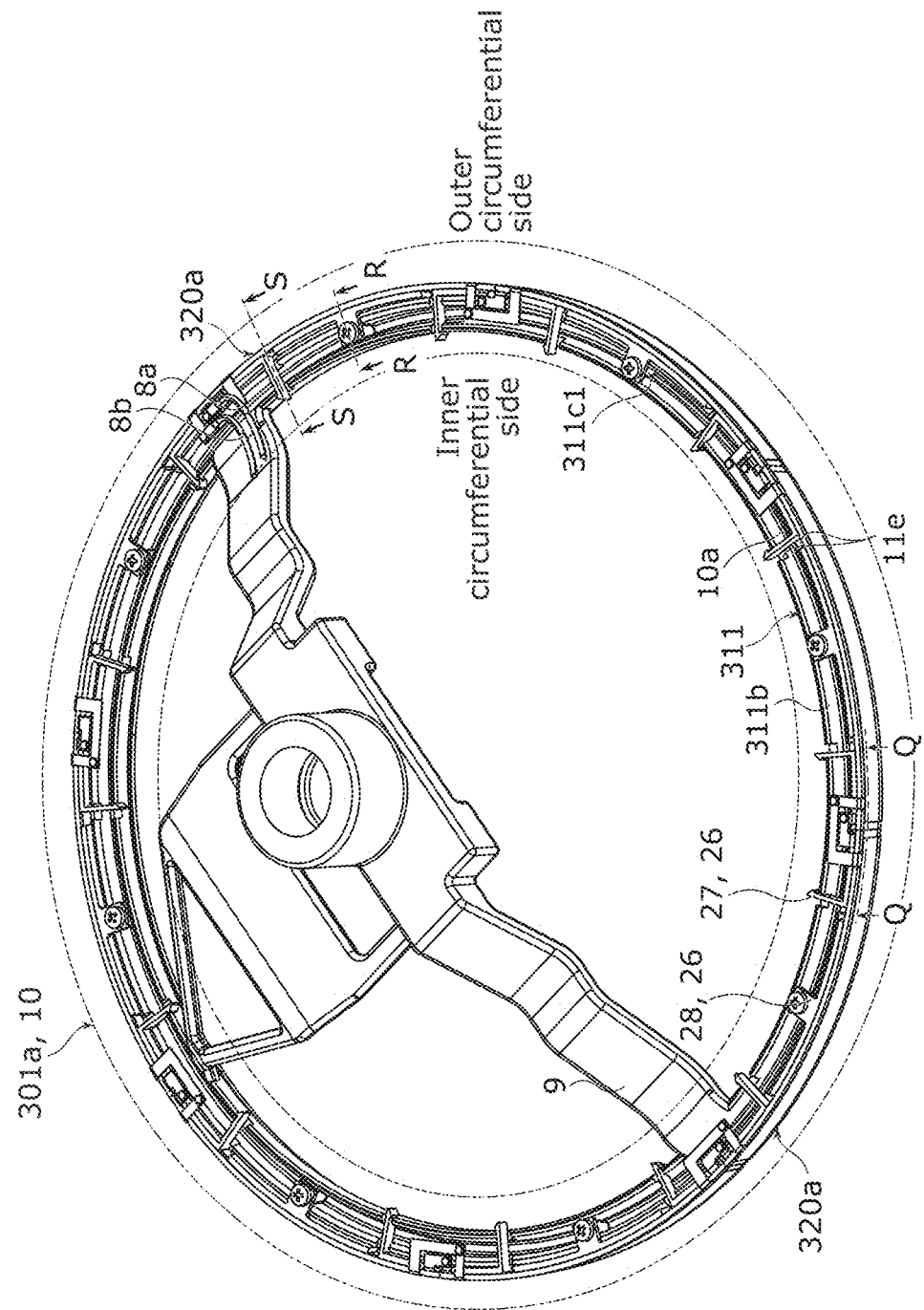
FIG. 40 is a perspective view of a steering wheel according to Variation 1 of Embodiment 3.
Figure 41:
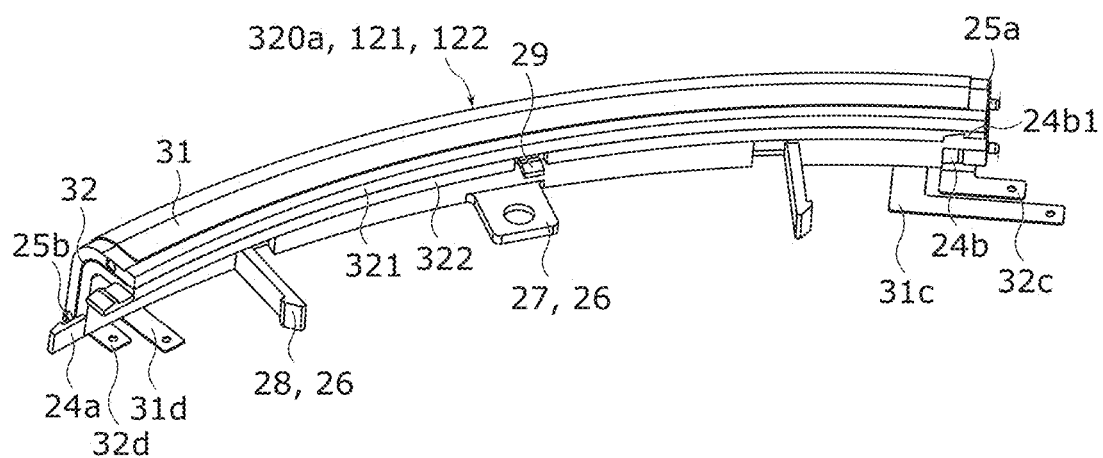
FIG. 41 is a perspective view of an electrode structure according to Variation 1 of Embodiment 3.

FIG. 40 is a perspective view of steering wheel 301a according to Variation 1 of Embodiment 3. FIG. 41 is a perspective view of electrode structure 320a according to Variation 1 of Embodiment 3.

As illustrated in FIG. 40 and FIG. 41, engagement-target portion 11e is formed on first portion 311a and second portion 311b of core metal 311. Engagement-target portion 11e engages a claw portion of extension portion 26 on electrode structure 320a, which will be described later. A plurality of engagement-target portions 11e are formed on first portion 311a and second portion 311b. The plurality of engagement-target portions 11e are formed at equal intervals on first portion 311a and second portion 311b.

Engagement-target portion 11e may be a through-hole formed in first portion 311a and second portion 311b, and may be a notch in a part of first portion 311a and second portion 311b. In such cases, first portion 311a may be formed shorter than second portion 311b. In other words, first portion 311a may be formed shorter than second portion 311b around the entire circumference of core metal 311. In such cases, core metal 311 may have a J-shaped cross section.

Figure 42:
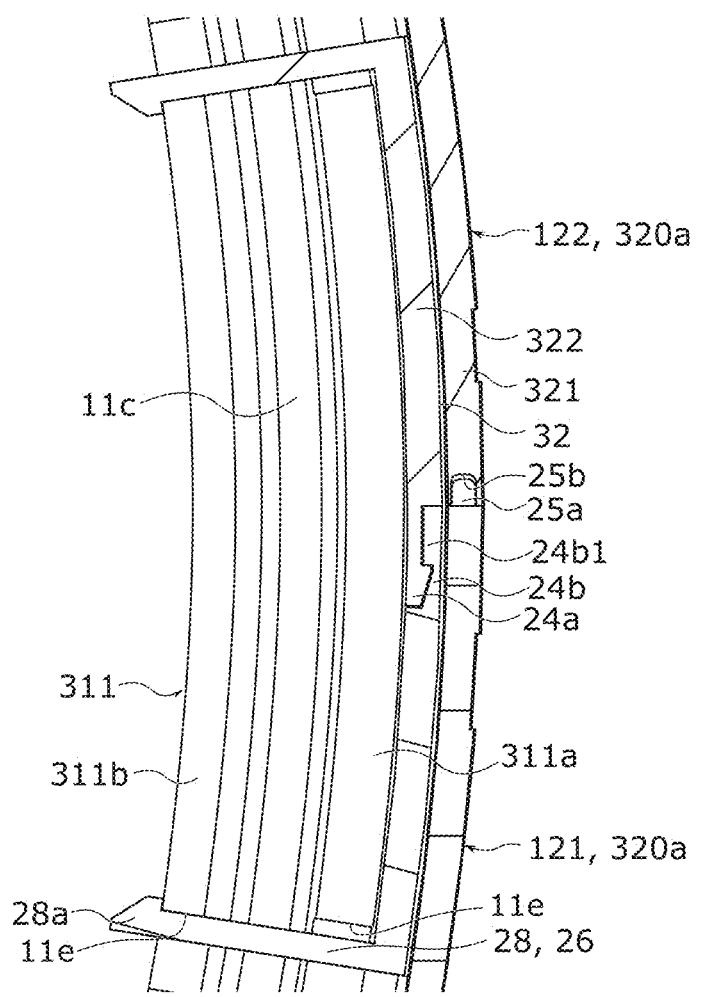
FIG. 42 is a cross-sectional view of an electrode structure and a core metal taken at line Q-Q in FIG. 40.

FIG. 42 is a cross-sectional view of electrode structure 320a and core metal 311 taken at line Q-Q in FIG. 40.

As illustrated in FIG. 42, in a cross section of steering wheel 301a, first portion 311a has a portion that is formed shorter than second portion 311b. In other words, in the portion of core metal 311 where first extension portion 27, which will be described later, is inserted through engagement-target portion 11e of first portion 311a and engagement-target portion 11e of second portion 311b, first portion 311a is formed shorter than second portion 311b. Note that first portion 311a may be formed shorter than second portion 311b around the entire circumference of core metal 311.

Figure 43A:
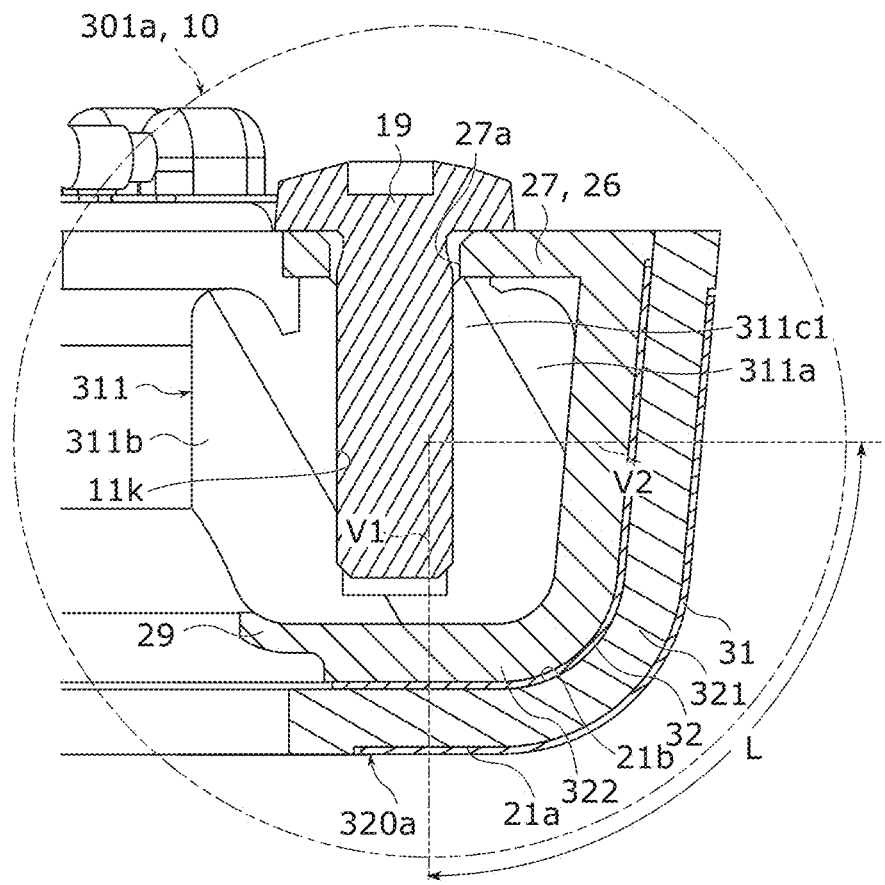
FIG. 43A is a cross-sectional view of a steering wheel taken at line R-R in FIG. 40.
Figure 43B:
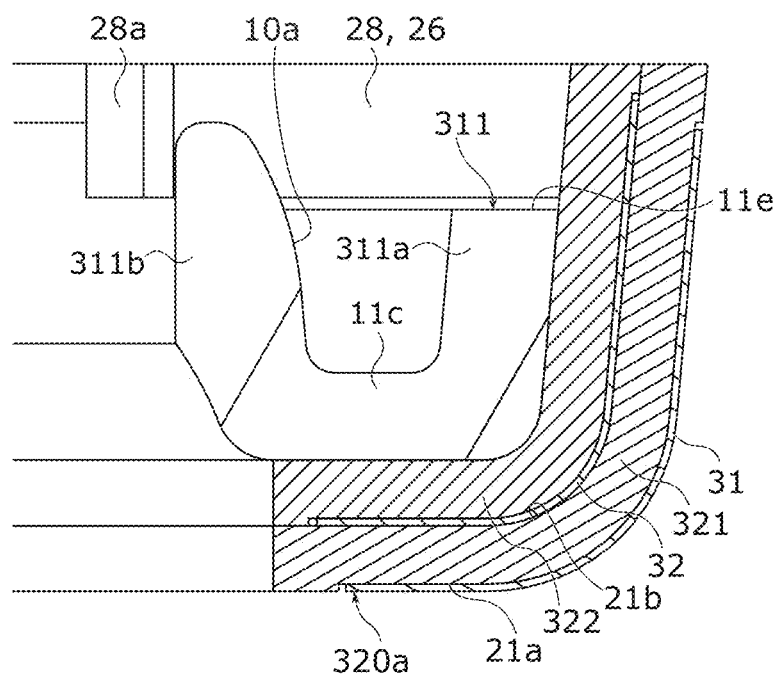
FIG. 43B is a cross-sectional view of an electrode structure and a core metal taken at line S-S in FIG. 40.

FIG. 43A is a cross-sectional view of steering wheel 301a taken at line R-R in FIG. 40. FIG. 43B is a cross-sectional view of electrode structure 320a and core metal 311 taken at line S-S in FIG. 40.

As illustrated in FIG. 40, FIG. 43A, and FIG. 43B, first engagement-target portion 311c1 is formed in recessed portion 10a.

First engagement-target portion 311c1 is formed on a rear surface of curved portion 11c, which is on the recessed portion 10a side, and is a cylindrical or round tubular projection that stands upright from the rear surface. Fastener hole 11k in which fastener 19, such as a screw, is insertable is formed on the inside of first engagement-target portion 311c1.

Core metal 311 according to the present variation is exemplified as, but not limited to, including first engagement-target portion 311c1 and engagement-target portion 11e. Although omitted in the figure, for example, core metal 311 may include engagement-target portion 11e without including a first engagement-target portion. In such cases, electrode structure 320a may include second extension portion 28 without including a first extension portion. Moreover, core metal 311 may include first engagement-target portion 311c1 without including an engagement portion. In such cases, electrode structure 320a may include first extension portion 27 without including a second extension portion.

Second insulator 322 of the electrode structure includes one or more extension portions 26.

Extension portion 26 extends in a direction that closes the opening of core metal 311, in a cross section of steering wheel 301a. In a cross section of steering wheel 301a, extension portion 26 is formed at one end of second insulator 322 and is connected to core metal 311.

More specifically, extension portion 26 extends from second insulator 322 so as to close the opening of core metal 311, and covers part of the opening of core metal 311. Stated differently, in a cross section of steering wheel 301a in a plane perpendicular to the circumferential direction of steering wheel 301a, extension portion 26 extends from one end of second insulator 322 toward second portion 311b so as to extend in a direction perpendicular to the lengthwise direction of first portion 311a. In other words, extension portion 26 is orthogonal to the circumferential direction of core metal 311 and extends from the first portion 311a side of core metal 311 to the second portion 311b side of core metal 311 on second insulator 322.

Extension portion 26 includes first extension portion 27 and second extension portion 28. Extension portion 26 may include only one of first extension portion 27 or second extension portion 28. In other words, only one of first extension portion 27 or second extension portion 28 may be provided on second insulator 322.

First extension portion 27 is plate-shaped. Insertion through-hole 27a is formed in first extension portion 27.

In a cross section of steering wheel 301a in a plane perpendicular to the circumferential direction of steering wheel 301a, insertion through-hole 27a is formed in a position that is coaxial with fastener hole 11k in first engagement-target portion 311c1 of core metal 311. In other words, insertion through-hole 27a is formed in a position corresponding to fastener hole 11k of first engagement-target portion 311c1. Accordingly, fastener 19, such as a screw, is inserted in insertion through-hole 27a and fastener hole 11k in first engagement-target portion 311c1 of core metal 311. In other words, fastener 19 can fasten with fastener hole 11k while inserted through insertion through-hole 27a. This fixes first extension portion 27 to first engagement-target portion 311c1.

Second extension portion 28 is rod-shaped. Claw portion 28a that engages engagement-target portion 11e provided on second portion 311b of core metal 311 is formed on the leading end of second extension portion 28.

In a cross section of steering wheel 301a, claw portion 28a extends from one end of second insulator 322 toward second portion 311b so as to engage engagement-target portion 11e formed in second portion 311b. More specifically, second extension portion 28 passes through engagement-target portion 11e formed in first portion 311a, and passes through engagement-target portion 11e formed in second portion 311b. Claw portion 28a of second extension portion 28 engages engagement-target portion 11e formed in second portion 311b. In other words, claw portion 28a engages second portion 311b while straddling first portion 311a, which causes the claw portion of claw portion 28a to hook onto engagement-target portion 11e of second portion 311b.

Second insulator 322 includes engagement support portion 29 that engages core metal 311. Engagement support portion 29 extends along the surface of core metal 311 in a cross section of steering wheel 301a. Engagement support portion 29 is formed on the other end of second insulator 322 at which extension portion 26 is not formed. Engagement support portion 29 is formed in a position that corresponds to extension portion 26, and is arranged so as to sandwich core metal 311 with extension portion 26. A claw-shaped connector may be formed on engagement support portion 29. In such cases, a recessed portion that engages the claw-shaped connector may be formed in core metal 311.

Second insulator 322 of electrode structure 320a need not include engagement support portion 29. In other words, second insulator 322 may include extension portion 26 and claw portion 28a.

Next, in two adjacent electrode structures 320a, how two adjacent first electrodes 31 are connected with two adjacent second electrodes 32, how the plurality of first electrodes 31 are connected to harness 8a, and how the plurality of second electrodes 32 are connected to harness 8b will be described.

When a plurality of electrode structures 320a are provided on core metal 311, harness 8a may be individually electrically connected to each of the plurality of first electrodes 31, and harness 8b may be individually electrically connected to each of the plurality of second electrodes 32. Harness 8a may be electrically connected to one first electrode 31 among the plurality of first electrodes 31 connected so as to electrically function as a single electrode, and harness 8b may be electrically connected to one second electrode 32 among the plurality of second electrodes 32 connected so as to electrically function as a single electrode.

Figure 44:
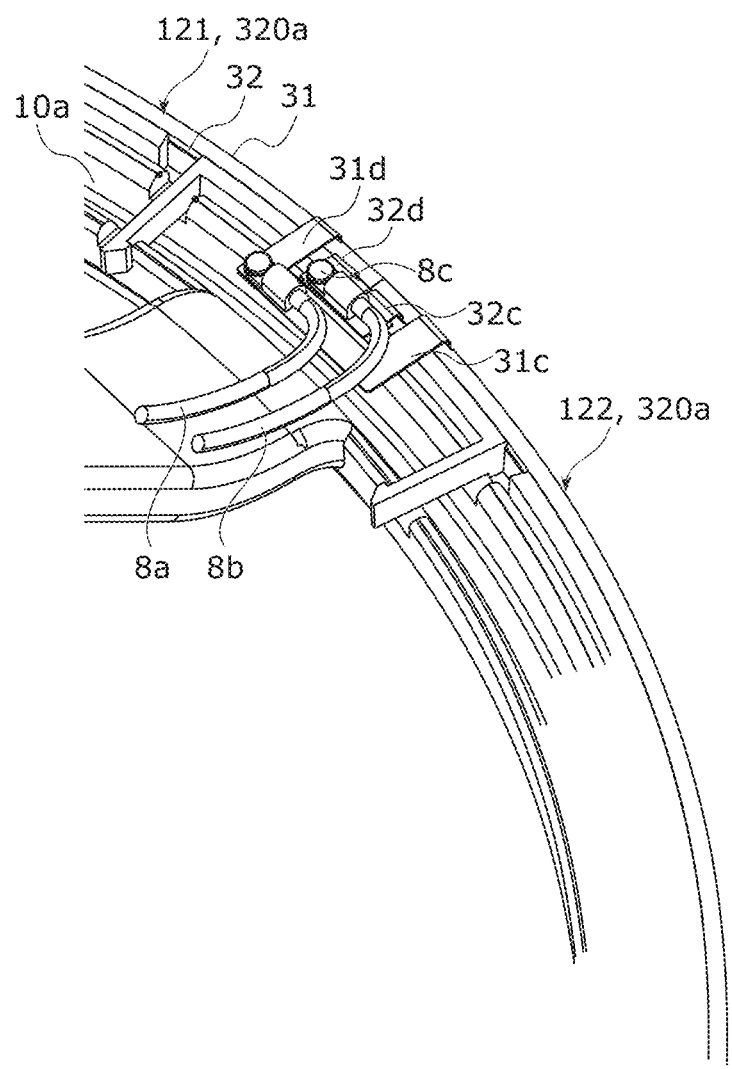
FIG. 44 is a partial enlarged perspective view of the electrical connection between harnesses and first and second electrodes in FIG. 40.

FIG. 44 is a partial enlarged perspective view of the electrical connection between harnesses 8a and 8b and first and second electrodes 31 and 32 in FIG. 40.

As illustrated in FIG. 41 and FIG. 44, each of the plurality of first electrodes 31 includes first connecting portions 31c and 31d for directly electrically connecting the plurality of first electrodes 31 together.

First connecting portion 31c is formed on one end in the circumferential direction of electrode structure 320a, and first connecting portion 31d is formed on the other end in the circumferential direction of electrode structure 320a. The plurality of first electrodes 31 may be electrically connected while arranged in a line along the circumferential direction of core metal 311 by overlapping first connecting portions 31c and 31d of two adjacent first electrodes 31 and fastening them with rivet 8c or the like. In such cases, harness 8a may be electrically connected to first connecting portions 31c and 31d via rivet 8c. In other words, harness 8a may be electrically connected to first connecting portions 31c and 31d at one location among the plurality of first electrodes 31 by being crimped via rivet 8c.

Each of the plurality of second electrodes 32 includes second connecting portions 32c and 32d for directly electrically connecting the plurality of second electrodes 32 together.

Second connecting portion 32c is formed on one end in the circumferential direction of electrode structure 320a, and second connecting portion 32d is formed on the other end in the circumferential direction of electrode structure 320a. The plurality of second electrodes 32 may be electrically connected while arranged in a line along the circumferential direction of core metal 311 by overlapping second connecting portions 32c and 32d of two adjacent second electrodes 32 and fastening them with rivet 8c or the like. In such cases, harness 8b may be electrically connected to second connecting portions 32c and 32d via rivet 8c. In other words, harness 8b may be electrically connected to second connecting portions 32c and 32d at one location among the plurality of second electrodes 32 by being crimped via rivet 8c.

First connecting portion 31c and first connecting portion 31d are disposed so as to extend from first insulator 321 along the opening of recessed portion 10a of core metal 311, and second connecting portions 32c and 32d are disposed so as to extend from second insulator 322 along the opening of recessed portion 10a of core metal 311. First connecting portion 31c and first connecting portion 31d are spaced apart from second connecting portions 32c and 32d so as not to contact second connecting portions 32c and 32d.

Variation 2 of Embodiment 3

The present variation differs from the electrode structure and the steering wheel according to Embodiment 3 and Variation 1 of Embodiment 3 in that electrode structure 320e and steering wheel 301c include first insulator 321A and first electrode 31 and do not include a second insulator or a second electrode. In the present variation, configurations and functions that are the same as the electrode structure and the steering wheel according to Embodiment 3 and Variation 1 of Embodiment 3 share the same reference signs, and detailed description related to these configurations and functions will be omitted.

Figure 45:
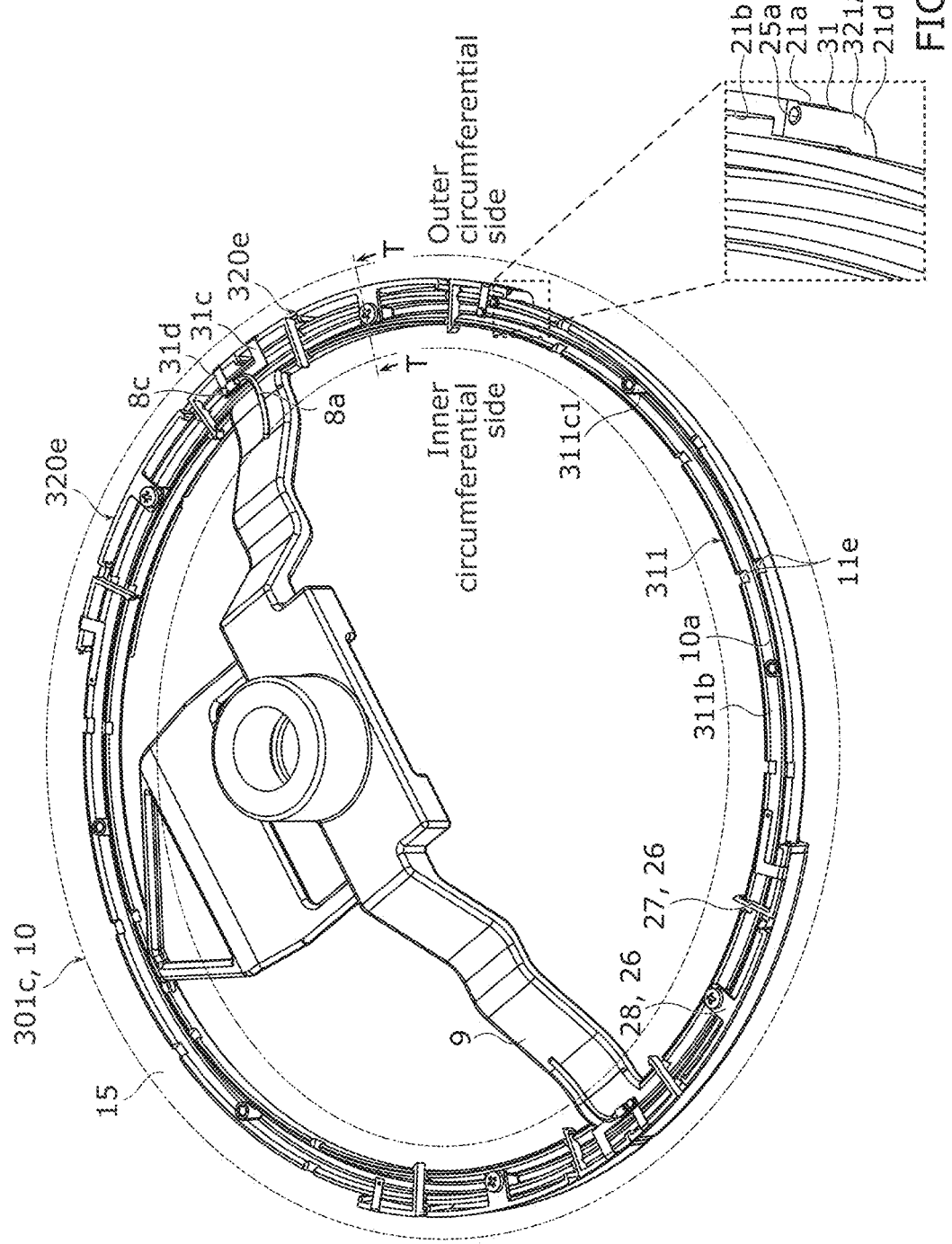
FIG. 45 includes a perspective view of a steering wheel according to Variation 2 of Embodiment 3.
Figure 46:
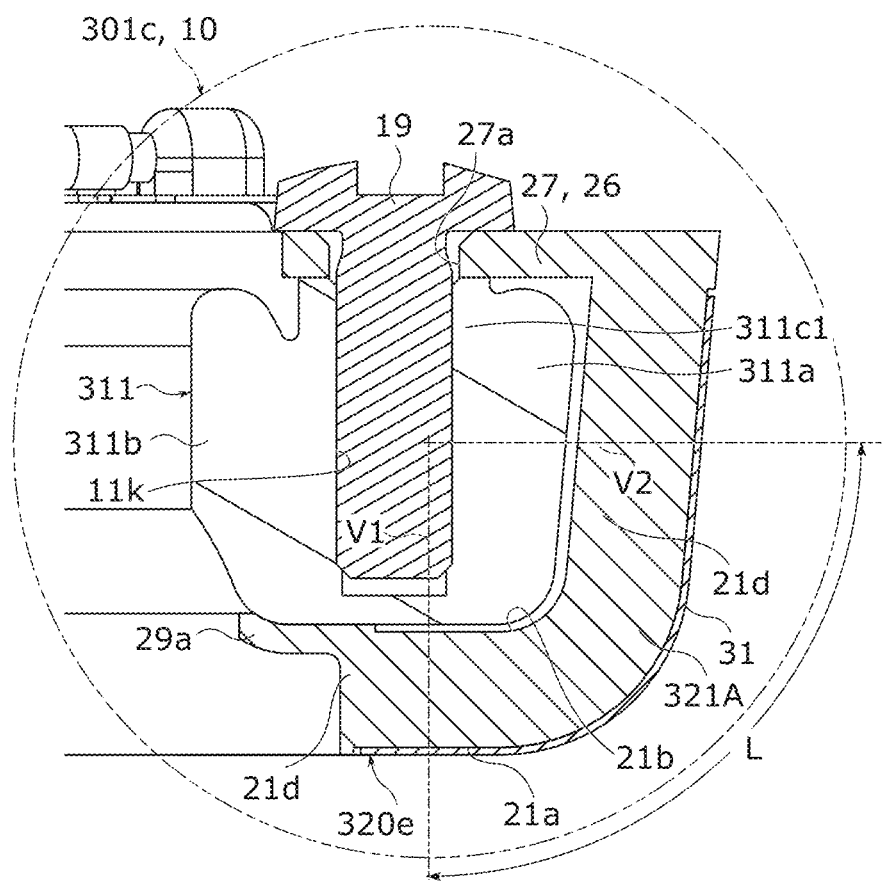
FIG. 46 is a cross-sectional view of a steering wheel taken at line T-T in FIG. 45.

FIG. 45 includes a perspective view of steering wheel 301c according to Variation 2 of Embodiment 3 and FIG. 45A shows a partial enlarged perspective view of electrode structure 320e according to Variation 2 of Embodiment 3. FIG. 46 is a cross-sectional view of electrode structure 320e and core metal 311 taken at line T-T in FIG. 45.

In the present variation, as illustrated in FIG. 45 and FIG. 46, two electrode structures 320e are provided on each of the left and right sides along the circumferential direction of core metal 311. More specifically, two electrode structures 320e are provided on the right side of steering wheel 301c, and two electrode structures 320e are also provided on the left side of steering wheel 301c.

Electrode structure 320e according to the present variation includes first insulator 321A, first electrode 31, and projecting portion 21d.

First insulator 321A is arranged along the outer circumferential side surface of core metal 311. First insulator 321A includes first surface 21a and second surface 21b on opposite sides. Second surface 21b is the surface facing core metal 311. First electrode 31 is disposed on first surface 21a. First electrode 31 is electrically connected to harness 8a. Second surface 21b is separated a predetermined distance from core metal 311. First insulator 321A can arrange first electrode 31 so as to be spaced apart from core metal 311 so that first electrode 31 and core metal 311 are not electrically connected. Foam 15 may be disposed between first insulator 321A and core metal 311. Second surface 21b of first insulator 321A may contact core metal 311.

First insulator 321A includes one or more extension portions 26.

Extension portion 26 extends in a direction that closes the opening of core metal 311, in a cross section of steering wheel 301c.

Extension portion 26 includes first extension portion 27 and second extension portion 28.

First extension portion 27 is plate-shaped. Insertion through-hole 27a is formed in first extension portion 27.

Second extension portion 28 is rod-shaped. Claw portion 28a that engages engagement-target portion 11e provided on core metal 311 is formed on the leading end of second extension portion 28.

First insulator 321A includes engagement support portion 29a that engages core metal 311. In a cross section of steering wheel 301c, engagement support portion 29a extends along the outer circumferential surface of core metal 311, and is disposed so as to sandwich core metal 311 with extension portion 26.

First electrode 31 is disposed spaced apart from core metal 311 by a predetermined distance by being supported by first insulator 321A.

Each of the two first electrodes 31 includes first connecting portions 31c and 31d for directly electrically connecting them together.

First connecting portion 31c is formed on one end in the circumferential direction of electrode structure 320e, and first connecting portion 31d is formed on the other end in the circumferential direction of electrode structure 320e. The plurality of first electrodes 31 may be electrically connected while arranged in a line along the circumferential direction of core metal 311 by fastening first connecting portions 31c and 31d of two adjacent first electrodes 31 with rivet 8c or the like. In such cases, harness 8a may be electrically connected to first connecting portions 31c and 31d at one location among the plurality of first electrodes 31 by being crimped via rivet 8c.

First electrode 31 and first insulator 321A may be integrally formed, and, alternatively, may be formed as individual separable elements.

Projecting portion 21*d* is disposed at a position facing core metal 311. Projecting portion 21*d* projects from first insulator 321A toward core metal 311. A portion of the tip of projecting portion 21*d* abuts core metal 311. In other words, projecting portion 21*d* is disposed between first insulator 321A and core metal 311. Accordingly, projecting portion 21*d* can ensure that first insulator 321A is distanced from core metal 311 and maintain the posture of first insulator 321A relative to core metal 311 so that first insulator 321A and first electrode 31 do not contact core metal 311.

Projecting portion 21*d* is integrally formed with first insulator 321A. Projecting portion 21*d* and first insulator 321A may be formed as individual separable elements.

A plurality of projecting portions 21*d* are disposed between core metal 311 and first insulator 321A. Projecting portions 21*d* may be disposed at approximately equal intervals on core metal 311 and first insulator 321A.

In electrode structure 320*e* according to the present variation, the insulator includes first insulator 321A, first electrode 31 is disposed on the first surface of first insulator 321A, and first insulator 321A includes a coupling portion that couples with another first insulator 321A disposed adjacent to first insulator 321A in the circumferential direction of steering wheel 301*c*.

With this, since the coupling portion of first insulator 321A can be coupled with another adjacent first insulator 321A, a plurality of electrode structures 320*e* can be easily assembled to core metal 311 while coupled together. This also makes it possible to easily change the region in which the driver's hand gripping steering wheel 301*c* is detected by fixing a plurality of electrode structures 320*e* along the circumferential direction of steering wheel 301*c*.

Variation 3 of Embodiment 3

The present variation differs from the electrode structure and the steering wheel according to Embodiment 3 and Variations 1 through 3 of Embodiment 3 in that first insulator 321B of electrode structure 123 includes third coupling portion 25*c*, second insulator 322B of electrode structure 123 includes fourth coupling-target portion 24*d*, first insulator 321C of electrode structure 124 includes third coupling-target portion 25*d*, and second insulator 322C of electrode structure 124 includes fourth coupling portion 24*c*. In the present variation, configurations and functions that are the same as the electrode structure and the steering wheel according to Embodiment 3 and Variations 1 through 3 of Embodiment 3 share the same reference signs, and detailed description related to these configurations and functions will be omitted.

Figure 47:
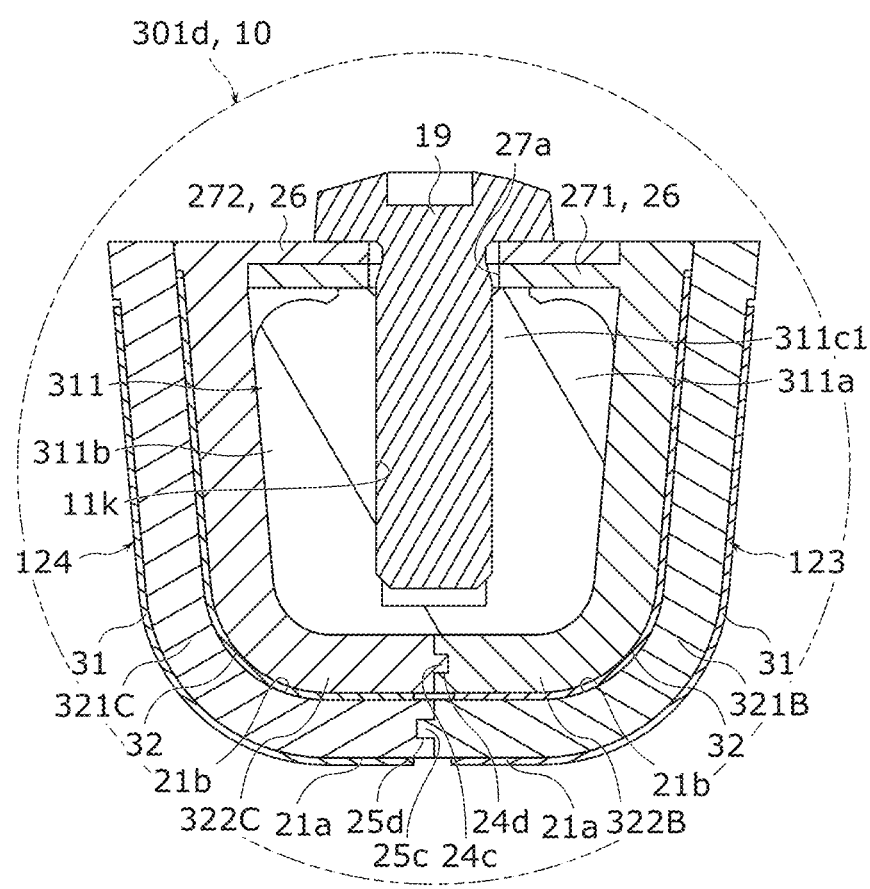
FIG. 47 is a cross-sectional view of a steering wheel taken in a plane perpendicular to the circumferential direction of a steering wheel.

FIG. 47 is a cross-sectional view of steering wheel 301*d* taken in a plane perpendicular to the circumferential direction of steering wheel 301*d*.

As illustrated in FIG. 47, third coupling portion 25*c* is formed on first insulator 321B of electrode structure 123. Fourth coupling-target portion 24*d* is formed on second insulator 322B of electrode structure 123. Third couple portion 25*d* is formed on first insulator 321C of another electrode structure 124 adjacent to electrode structure 123 in the circumferential direction in a cross section of steering wheel 301*d*. Fourth coupling portion 24*c* is formed on second insulator 322C of electrode structure 124. Third coupling portion 25*c* and fourth coupling portion 24*c* may be a recessed portion or a protruding portion. Third coupling-target portion 25*d* and fourth coupling-target portion 24*d* may be a recessed portion or a protruding portion.

As illustrated in FIG. 47, third coupling portion 25*c* of first insulator 321B of electrode structure 123 and third coupling-target portion 25*d* of first insulator 321C of electrode structure 124 can be coupled together, and fourth coupling-target portion 24*d* of second insulator 322B of electrode structure 123 and fourth coupling portion 24*c* of second insulator 322C of electrode structure 124 can be coupled together. Third coupling portion 25*c* and fourth coupling portion 24*c* are examples of the coupling portion. Third coupling-target portion 25*d* and fourth coupling-target portion 24*d* are examples of the coupling-target portion.

With this, a plurality of electrode structures can be coupled in the circumferential direction of a cross section of steering wheel 301*d* as well, which makes it possible to change the region in which the driver's hand gripping steering wheel 301*d* is detected.

Note that second insulator 322B of electrode structure 123 includes first extension portion 271 in which an insertion through-hole is formed, second insulator 322C of electrode structure 124 includes first extension portion 272 in which an insertion through-hole is formed, and fastener 19 can be fastened to fastener hole 11*k* while inserted through the insertion through-holes of first extension portion 271 and first extension portion 272. This fixes first extension portion 271 and first extension portion 272 to first engagement-target portion 311*c*1.

Each of the plurality of first electrodes 31 includes a first connecting portion for directly electrically connecting the plurality of first electrodes 31 together, and each of the plurality of second electrodes 32 includes a second connecting portion for directly electrically connecting the plurality of second electrodes 32 together. The first connecting portion and the second connecting portion may be provided in locations in which fastener 19 is not provided in the circumferential direction of steering wheel 301*d*, and the plurality of first electrodes 31 may be electrically connected by fastening a plurality of overlapping first connecting portions with a rivet or the like. Moreover, a plurality of second electrodes 32 may be electrically connected by fastening a plurality of overlapping second connecting portions with a rivet or the like.

In electrode structures 123 and 124 according to the present variation, third coupling portion 25*c* is formed on first insulator 321B. Third coupling-target portion 25*d* that couples with third coupling portion 25*c* is formed on another adjacent first insulator 321C. Fourth coupling-target portion 24*d* is formed on second insulator 322B. Fourth coupling portion 24*c* that couples with fourth coupling-target portion 24*d* is formed on another adjacent second insulator 322C.

With this, since third coupling portion 25*c* and fourth coupling-target portion 24*d* of one insulator can be coupled with third coupling-target portion 25*d* and fourth coupling portion 24*c* of another adjacent insulator in the circumferential direction in a cross section of steering wheel 301*d*, the plurality of electrode structures 123 and 124 can be easily assembled while coupled to core metal 11. This also makes it possible to easily change (increase or decrease the size of) the region in which the driver's hand gripping steering wheel 301*d* is detected by fixing a plurality of electrode structures 123 and 124 along the circumferential direction in a cross section of steering wheel 301*d*.

Other Variations

Although the electrode structure, the steering wheel, and the method for manufacturing the steering wheel according to the present disclosure have been described based on the above embodiments, the present disclosure is not limited to these embodiments. Embodiments achieved by applying various modifications to the above embodiments conceived by a person skilled in the art without departing from the spirit of the present disclosure are also included in the present disclosure.

Figure 48:
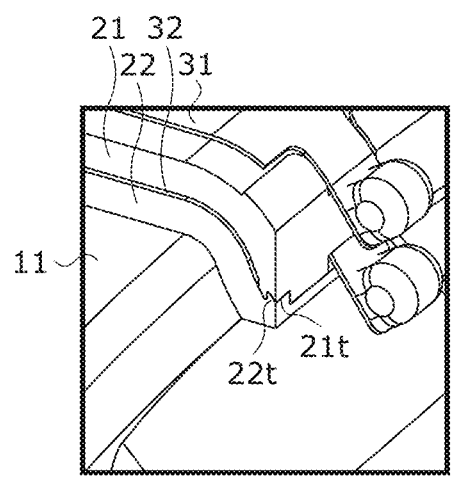
FIG. 48 is a partial enlarged view of a first positioning portion of a first insulator and a second positioning portion of a second insulator according to another variation.

For example, the configuration illustrated in FIG. 48 may be applied to the electrode structure, the steering wheel, and the method for manufacturing the steering wheel according to the embodiments. FIG. 48 is a partial enlarged view of first positioning portion 21t of first insulator 21 and second positioning portion 22t of second insulator 22 according to another variation. Illustration of harnesses have been omitted in the partial enlarged view of first positioning portion 21t of first insulator 21 and second positioning portion 22t of second insulator 22 illustrated in FIG. 48. As illustrated in FIG. 48, first insulator 21 includes first positioning portion 21t, and second insulator 22 includes second positioning portion 22t. First positioning portion 21t is formed at the corner portions of both end portions of first insulator 21 that extends in the circumferential direction of core metal 11. Second positioning portion 22t is formed at the corner portions of both end portions of second insulator 22 that extends in the circumferential direction of core metal 11. In the present embodiment, first positioning portion 21t is exemplified as a recessed portion that interlocks with second positioning portion 22t, but first positioning portion 21t may be a protruding portion that interlocks with second positioning portion 22t. Second positioning portion 22t is exemplified as a protruding portion that interlocks with first positioning portion 21t, but second positioning portion 22t may be a recessed portion that interlocks with first positioning portion 21t. When assembling first insulator 21 to second insulator 22 while sandwiching second electrode 32 between first insulator 21 and second insulator 22, first positioning portion 21t is interlocked with second positioning portion 22t. Since this positions first insulator 21 and second insulator 22, misalignment of first insulator 21 and second insulator 22 in the circumferential direction can be inhibited, making it possible to easily and properly assemble first insulator 21 and second insulator 22. Although first positioning portion 21t is exemplified as being formed at corner portions of first insulator 21, first positioning portion 21t may be formed at any location. Moreover, a plurality of first positioning portions 21t may be formed in first insulator 21. Although second positioning portion 22t is exemplified as being formed at corner portions of second insulator 22, second positioning portion 22t may be formed at any location. Moreover, a plurality of second positioning portions 22t may be formed in second insulator 22. For example, first positioning portions 21t may be formed at the four corner portions at both end portions of first insulator 21, and second positioning portions 22t may be formed at the four corner portions at both ends of second insulator 22. In such an electrode structure, first insulator 21 includes first positioning portion 21t. Second insulator 22 includes second positioning portion 22t that interlocks with first positioning portion 21t. With this, when assembling first insulator 21 to second insulator 22, first positioning portion 21t and second positioning portion 22t can be interlocked. Since this positions first insulator 21 and second insulator 22, misalignment of first insulator 21 and second insulator 22 in the circumferential direction can be inhibited, making it possible to easily and properly assemble first insulator 21 and second insulator 22.

In the electrode structure, the steering wheel, and the method for manufacturing the steering wheel according to the above embodiments, the steering wheel may further include a control circuit.

Embodiment 1, Variations 1 through 4 of Embodiment 1, Embodiment 2, Variations 1 through 7 of Embodiment 2, Embodiment 3, and Variations 1 through 3 of Embodiment 3 may be discretionarily combined in the electrode structure, the steering wheel, and the method for manufacturing the steering wheel according to Embodiments 1 through 3; the present disclosure is not limited to the aspects disclosed in Embodiment 1, Variations 1 through 4 of Embodiment 1, Embodiment 2, Variations 1 through 7 of Embodiment 2, Embodiment 3, and Variations 1 through 3 of Embodiment 3.

Those skilled in the art will readily appreciate that many modifications are possible in the above Embodiments 1 through 3 without materially departing from the novel teachings and technical advantages of the present disclosure. Accordingly, all such modifications are intended to be included within the scope of the present disclosure.

Further Information about Technical Background to this Application

The disclosures of the following patent applications including specification, drawings and claims are incorporated herein by reference in their entirety: Japanese Patent Application No. 2021-174669 filed on Oct. 26, 2021, Japanese Patent Application No. 2021-174694 filed on Oct. 26, 2021, Japanese Patent Application No. 2021-174727 filed on Oct. 26, 2021, Japanese Patent Application No. 2022-064195 filed on Apr. 8, 2022, and Japanese Patent Application No. 2022-121560 filed on Jul. 29, 2022.

INDUSTRIAL APPLICABILITY

The electrode structure, the steering wheel, and the method for manufacturing the steering wheel according to the present disclosure are applicable to, for example, vehicle steering wheels.

The invention claimed is:

1. An electrode structure disposed on an outer circumference of a core metal of a steering wheel provided in a vehicle, the electrode structure comprising:
   an insulator; and
   a first electrode disposed on a first surface of the insulator, the first surface being on an opposite side of the insulator relative to a surface of the insulator that faces the core metal of the steering wheel, wherein
      the insulator includes an engagement portion that engages an engagement-target portion included in the core metal,
      the insulator includes a first insulator and a second insulator,
      the first electrode is disposed on the first surface of the first insulator,
      the electrode structure further comprises:
         a second electrode disposed on a second surface of the first insulator, the second surface being on an opposite side of the first insulator relative to the first surface; and
         the second insulator being disposed between the second electrode and the core metal, and
      the second insulator includes the engagement portion that engages the engagement-target portion included in the core metal.

2. The electrode structure according to claim 1, wherein in a cross section of the steering wheel taken in a plane perpendicular to a circumferential direction of the steering wheel, the first insulator, the second insulator, the first electrode, and the second electrode are disposed at least in a range from an outer circumferential side of the steering wheel to an inner circumferential side of the steering wheel.

3. The electrode structure according to claim 2, wherein the first insulator includes a first positioning portion, and the second insulator includes a second positioning portion that interlocks with the first positioning portion.

4. The electrode structure according to claim 1, wherein the first electrode and the second electrode have a curved shape in a cross section of the steering wheel taken in a plane perpendicular to a circumferential direction of the steering wheel.

5. The electrode structure according to claim 4, wherein the first insulator comprises a plurality of first insulators,
the plurality of first insulators are disposed spaced apart in the circumferential direction of the steering wheel, between one first electrode and one second electrode, the one first electrode being included in the first electrode, the one second electrode being included in the second electrode,
the second insulator comprises a plurality of second insulators,
the plurality of second insulators are disposed spaced apart in the circumferential direction of the steering wheel, between one second electrode and the core metal, the one second electrode being included in the second electrode, and
each of the plurality of second insulators includes the engagement portion.

6. The electrode structure according to claim 1, wherein the first insulator comprises a resin material,
the second insulator comprises a resin material,
the first electrode includes metal plating, a metal sheet, or a metal plate, and
the second electrode includes metal plating, a metal sheet, or a metal plate.

7. The electrode structure according to claim 1, wherein an AC voltage is applied to the first electrode, the AC voltage having a same phase as a phase of an AC voltage applied to the second electrode.

8. The electrode structure according to claim 1, wherein the engagement portion includes a first engagement portion, and
the first engagement portion includes a fastener hole for fastening a first engagement-target portion included in the engagement-target portion.

9. A method for manufacturing a steering wheel, the method comprising:
fastening the engagement portion to the core metal by inserting a fastener into the fastener hole included in the electrode structure according to claim 8; and
covering the electrode structure using a foam while the engagement portion is fastened to the core metal.

10. The electrode structure according to claim 1, wherein the engagement portion includes a second engagement portion, and
the second engagement portion includes an engagement claw that engages a second engagement-target portion included in the engagement-target portion.

11. A method for manufacturing a steering wheel, the method comprising:
engaging the engagement claw included in the electrode structure according to claim 10 with the second engagement-target portion included in the core metal; and
covering the electrode structure using a foam while the engagement claw is engaged with the second engagement-target portion included in the core metal.

12. The electrode structure according to claim 1, wherein the core metal includes a curved portion having a curved shape in a cross section of the steering wheel taken in a plane perpendicular to a circumferential direction of the steering wheel, and
the engagement-target portion is formed on the curved portion.

13. A steering wheel comprising:
the electrode structure according to claim 1;
the core metal; and
a foam that covers the electrode structure.

14. The electrode structure according to claim 1, wherein the insulator includes an extension portion that extends in a direction that closes an opening of the core metal, in a cross section of the steering wheel taken in a plane perpendicular to a circumferential direction of the steering wheel, and
the extension portion is connected to the core metal.

15. The electrode structure according to claim 14, wherein an insertion through-hole is formed in the extension portion,
in a cross section of the steering wheel taken in a plane perpendicular to the circumferential direction of the steering wheel, the insertion through-hole is formed in a position that is coaxial with a fastener hole in the core metal, and
a fastener is inserted in the insertion through-hole in the extension portion and the fastener hole in the core metal.

16. The electrode structure according to claim 14, wherein a claw portion that engages an engagement-target portion included in the core metal is formed on the extension portion,
the core metal includes a curved portion, a first portion, and a second portion in a cross section of the steering wheel taken in a plane perpendicular to the circumferential direction of the steering wheel,
the first portion is formed shorter than the second portion,
the engagement-target portion is formed on the second portion,
in a cross section of the steering wheel taken in a plane perpendicular to the circumferential direction of the steering wheel, the extension portion extends toward the second portion in a direction perpendicular to a lengthwise direction of the first portion, and
the claw portion formed on the extension portion engages the engagement-target portion formed on the second portion.

17. The electrode structure according to claim 14, wherein the second insulator includes the extension portion that extends in the direction that closes an opening of the core metal, in a cross section of the steering wheel taken in a plane perpendicular to the circumferential direction of the steering wheel,
in a cross section of the steering wheel taken in a plane perpendicular to the circumferential direction of the steering wheel, the extension portion is formed so as to close an opening of the core metal and follow an outer circumferential surface of the core metal, a first engagement claw that engages a first engagement-target recessed portion included in the core metal is formed on the extension portion, and in a cross section of the steering wheel taken in a plane perpendicular to the circumferential direction of the steering wheel, a second engagement claw that engages a second engagement-target recessed portion included in the core metal is formed on an other end of the second insulator at which the extension portion is not formed.

18. The electrode structure according to claim 14, wherein the second insulator includes the extension portion that extends in the direction that closes an opening of the core metal, in a cross section of the steering wheel taken in a plane perpendicular to the circumferential direction of the steering wheel, in a cross section of the steering wheel taken in a plane perpendicular to the circumferential direction of the steering wheel, a projecting portion project in a direction orthogonal to the direction that closes an opening of the core metal is formed on the extension portion, and a claw portion that engages an engagement-target portion included in the core metal is formed on the projecting portion.

19. The electrode structure according to claim 1, wherein the insulator includes a coupling portion that couples with an other insulator disposed adjacent to the insulator in a circumferential direction of the steering wheel.

20. An electrode structure disposed on an outer circumference of a core metal of a steering wheel provided in a vehicle, the electrode structure comprising:

an insulator; and a first electrode disposed on a first surface of the insulator, the first surface being on an opposite side of the insulator relative to a surface of the insulator that faces the core metal of the steering wheel, wherein the insulator includes an extension portion that extends in a direction that closes an opening of the core metal, in a cross section of the steering wheel taken in a plane perpendicular to a circumferential direction of the steering wheel, and the extension portion is connected to the core metal.

21. An electrode structure disposed on an outer circumference of a core metal of a steering wheel provided in a vehicle, the electrode structure comprising:

an insulator; and a first electrode disposed on a first surface of the insulator, the first surface being on an opposite side of the insulator relative to a surface of the insulator that faces the core metal of the steering wheel, wherein the insulator includes a coupling portion that couples with an other insulator disposed adjacent to the insulator in a circumferential direction of the steering wheel.

\* \* \* \* \*